United States Patent
Liu et al.

(10) Patent No.: US 11,468,318 B2
(45) Date of Patent: Oct. 11, 2022

(54) FRAME INTERPOLATION VIA ADAPTIVE CONVOLUTION AND ADAPTIVE SEPARABLE CONVOLUTION

(71) Applicant: Portland State University, Portland, OR (US)

(72) Inventors: Feng Liu, Portland, OR (US); Simon Niklaus, Portland, OR (US); Long Mai, Portland, OR (US)

(73) Assignee: PORTLAND STATE UNIVERSITY, Portland, OR (US)

( * ) Notice: Subject to any disclaimer, the term of this patent is extended or adjusted under 35 U.S.C. 154(b) by 259 days.

(21) Appl. No.: 16/495,029

(22) PCT Filed: Mar. 16, 2018

(86) PCT No.: PCT/US2018/022858
§ 371 (c)(1),
(2) Date: Sep. 17, 2019

(87) PCT Pub. No.: WO2018/170393
PCT Pub. Date: Sep. 20, 2018

(65) Prior Publication Data
US 2020/0012940 A1 Jan. 9, 2020

Related U.S. Application Data

(60) Provisional application No. 62/485,794, filed on Apr. 14, 2017, provisional application No. 62/473,234, filed on Mar. 17, 2017.

(51) Int. Cl.
*G06N 3/08* (2006.01)
*G06N 20/10* (2019.01)
*G06T 3/40* (2006.01)

(52) U.S. Cl.
CPC ............... *G06N 3/08* (2013.01); *G06N 20/10* (2019.01); *G06T 3/4007* (2013.01); *G06T 3/4046* (2013.01)

(58) Field of Classification Search
CPC ........ G06N 3/08; G06N 20/10; G06T 3/4007; G06T 3/4046
See application file for complete search history.

(56) References Cited

U.S. PATENT DOCUMENTS 5,337,154 A * 8/1994 Dorricott ............. G11B 27/028
348/E7.015
2003/0189579 A1* 10/2003 Pope ..................... G06T 3/403
345/660
(Continued)

FOREIGN PATENT DOCUMENTS

WO 2016-132146 8/2016

OTHER PUBLICATIONS

Haitam Ben Yahia; "Frame Interpolation using Convolution Neural Networks on 2D Animation", Universiteit van Amsterdam, Bachelor Thesis, Credits: 18 EC, Jun. 24, 2016.
(Continued)

*Primary Examiner* — Qun Shen
(74) *Attorney, Agent, or Firm* — Schwabe Williamson & Wyatt, P.C.

(57) ABSTRACT

Systems, methods, and computer-readable media for context-aware synthesis for video frame interpolation are provided. A convolutional neural network (ConvNet) may, given two input video or image frames, interpolate a frame temporarily in the middle of the two input frames by combining motion estimation and pixel synthesis into a single step and formulating pixel interpolation as a local convolution over patches in the input images. The ConvNet may estimate a convolution kernel based on a first receptive field patch of a first input image frame and a second
(Continued)

receptive field patch of a second input image frame. The ConvNet may then convolve the convolutional kernel over a first pixel patch of the first input image frame and a second pixel patch of the second input image frame to obtain color data of an output pixel of the interpolation frame. Other embodiments may be described and/or claimed.

28 Claims, 30 Drawing Sheets

(56) References Cited

U.S. PATENT DOCUMENTS

| | | | | |
|---|---|---|---|---|
| 2013/0029293 | A1* | 1/2013 | Mukdadi | G06T 7/0012 433/215 |
| 2016/0196672 | A1* | 7/2016 | Chertok | G06K 9/4628 382/156 |
| 2017/0046616 | A1* | 2/2017 | Socher | G06V 10/82 |
| 2017/0116495 | A1* | 4/2017 | Nomura | G06F 17/153 |
| 2019/0012774 | A1* | 1/2019 | Arai | G06V 10/94 |
| 2019/0147283 | A1* | 5/2019 | Giering | G06K 9/4604 382/103 |

OTHER PUBLICATIONS

Gucan Long et al., "Learning Image Matching by Simply Watching Video", Springer International Publishing AG 2016, B. Lerbe et al., (Eds.): ECCV 2016, Part VI, LNCS 9910, pp. 434-450, 2016. DOI: 10.1007/978-3-379-46466-4.26.

Baker, et al., "A database and evaluation methodology for optical flow", International Journal of Computer Vision, vol. 92, No. 1, pp. 1-31 (Mar. 2011, published online Nov. 30, 2010), https://link.springer.com/content/pdf/10.1007/s11263-010-0390-2.pdf.

Brox et al., "High accuracy optical flow estimation based on a theory for warping", European Conference on Computer Vision, vol. 3024, pp. 25-36 (May 11, 2004), https://link.springer.com/content/pdf/10.1007/978-3-540-24673-2_3.pdf.

Burger et al., "Image denoising: Can plain neural networks compete with BM3D?", IEEE Conference on Computer Vision and Pattern Recognition, pp. 2392-2399 (2012), https://hcburger.com/files/neuraldenoising.pdf.

Butler et al., "A naturalistic open source movie for optical flow evaluation", European Conference on Computer Vision, vol. 7577, pp. 611-625 (Oct. 7, 2012), https://link.springer.com/content/pdf/10.1007/978-3-642-33783-3_44.pdf.

Collobert et al., "Torch7: A matlab-like environment for machine learning", BigLearn NIPS Workshop (2011), https://infoscience.epfl.ch/record/192376/files/Collobert_NIPSWORKSHOP_2011.pdf.

Didyk et al., "Joint view expansion and filtering for automultiscopic 3D displays", ACM Transactions on Graphics (TOG), vol. 32, No. 6, pp. 221:1-221:8 (Nov. 1, 2013), https://dspace.mit.edu/bitstream/handle/1721.1/86390/Durand_Joint%20view.pdf?sequence=1&isAllowed=y.

Dong et al., "Compression artifacts reduction by a deep convolutional network", Proceedings of the IEEE international conference on computer vision (ICCV), pp. 576-584 (2015), https://openaccess.thecvf.com/content_iccv_2015/papers/Dong_Compression_Artifacts_Reduction_ICCV_2015_paper.pdf.

Dong et al., "Image super-resolution using deep convolutional networks", IEEE Transactions on Pattern Analysis and Machine Intelligence, vol. 38, No. 2, pp. 295-307 (Jun. 1, 2015), https://arxiv.org/pdf/1501.00092.pdf.

Dosovitskiy et al., "FlowNet: Learning optical flow with convolutional networks", Proceedings of the IEEE international conference on computer vision (ICCV), pp. 2758-2766 (2015), https://openaccess.thecvf.com/content_iccv_2015/papers/Dosovitskiy_FlowNet_Learning_Optical_ICCV_2015_paper.pdf.

Dosovitskiy et al., "Learning to generate chairs with convolutional neural networks", IEEE Conference on Computer Vision and Pattern Recognition, pp. 1538-1546 (2015), https://www.cv-foundation.org/openaccess/content_cvpr_2015/papers/Dosovitskiy_Learning_to_Generate_2015_CVPR_paper.pdf.

Dumoulin et al., "A learned representation for artistic style", arXiv:1610.07629v1 [cs.CV] (Oct. 24, 2016), https://arxiv.org/pdf/1610.07629v1.pdf.

Finn et al., "Unsupervised learning for physical interaction through video prediction", Advances in Neural Information Processing Systems (NIPS), vol. 29, pp. 64-72 (2016), https://proceedings.neurips.cc/paper/2016/file/d9d4f495e875a2e075a1a4a6e1b9770f-Paper.pdf.

J. Flynn et al., "Deep-Stereo: Learning to predict new views from the world's imagery", IEEE Conference on Computer Vision and Pattern Recognition, pp. 5515-5524 (2016), https://www.cv-foundation.org/openaccess/content_cvpr_2016/papers/Flynn_DeepStereo_Learning_to_CVPR_2016_paper.pdf.

Gadot et al., "PatchBatch: A batch augmented loss for optical flow", IEEE Conference on Computer Vision and Pattern Recognition, pp. 4236-4245 (2016), https://openaccess.thecvf.com/content_cvpr_2016/papers/Gadot_PatchBatch_A_Batch_CVPR_2016_paper.pdf.

Gatys et al., "Image style transfer using convolutional neural networks", IEEE Conference on Computer Vision and Pattern Recognition, pp. 2414-2423 (2016), https://openaccess.thecvf.com/content_cvpr_2016/papers/Gatys_Image_Style_Transfer_CVPR_2016_paper.pdf.

Girshick et al., "Rich feature hierarchies for accurate object detection and semantic segmentation", IEEE Conference on Computer Vision and Pattern Recognition, pp. 580-587 (2014), https://openaccess.thecvf.com/content_cvpr_2014/papers/Girshick_Rich_Feature_Hierarchies_2014_CVPR_paper.pdf.

Giusti et al., "Fast image scanning with deep max-pooling convolutional neural networks", 2013 IEEE International Conference on Image Processing (ICIP), pp. 4034-4038 (2013); IDSIA Technical Report No. IDSIA-01-13 (Feb. 7, 2013), https://arxiv.org/pdf/1302.1700.pdf.

Glorot et al., "Understanding the difficulty of training deep feedforward neural networks", International Conference on Artificial Intelligence and Statistics, vol. 9, pp. 249-256 (Mar. 31, 2010), http://proceedings.mlr.press/v9/glorot10a/glorot10a.pdf.

He et al., "Deep residual learning for image recognition", IEEE Conference on Computer Vision and Pattern Recognition, pp. 770-778 (2016), https://openaccess.thecvf.com/content_cvpr_2016/papers/He_Deep_Residual_Learning_CVPR_2016_paper.pdf.

Seitz et al., "Filter flow", 2009 IEEE 12th International Conference on Computer Vision, pp. 143-150 (Sep. 1, 2009), https://www.microsoft.com/en-us/research/wp-content/uploads/2009/09/paper.pdf.

* cited by examiner

Figure 3

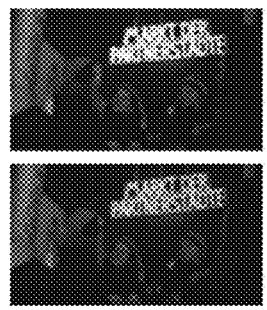 Input Frames
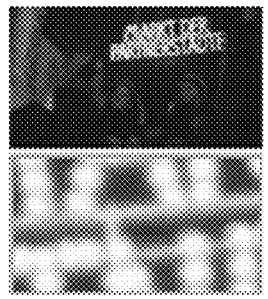 CAS
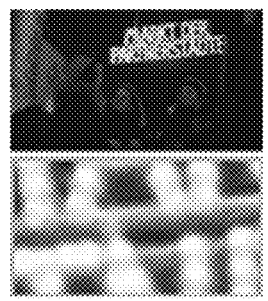 Meyer *et al.*
 DeepFlow2
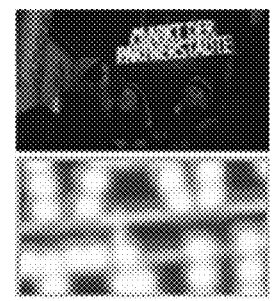 FlowNetS
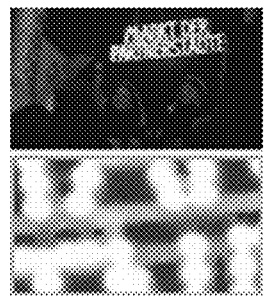 MDP-Flow2
 Brox *et al.*
Figure 6

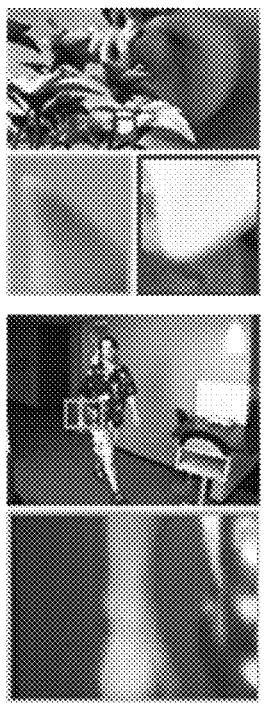
Input Frame 1
CAS
Meyer *et al.*
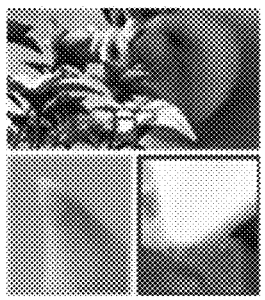
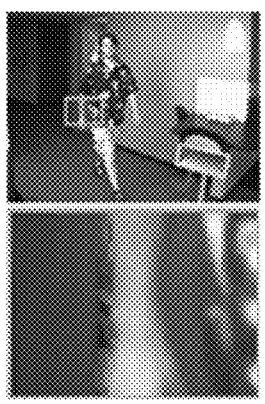
DeepFlow2
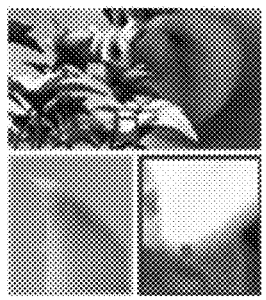
FlowNetS
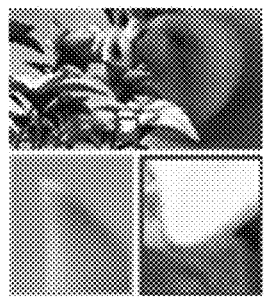
MDP-Flow2
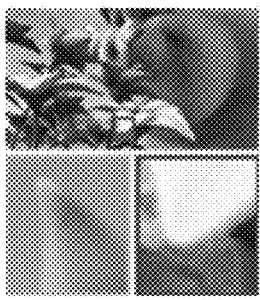
Brox *et al.*
Figure 7

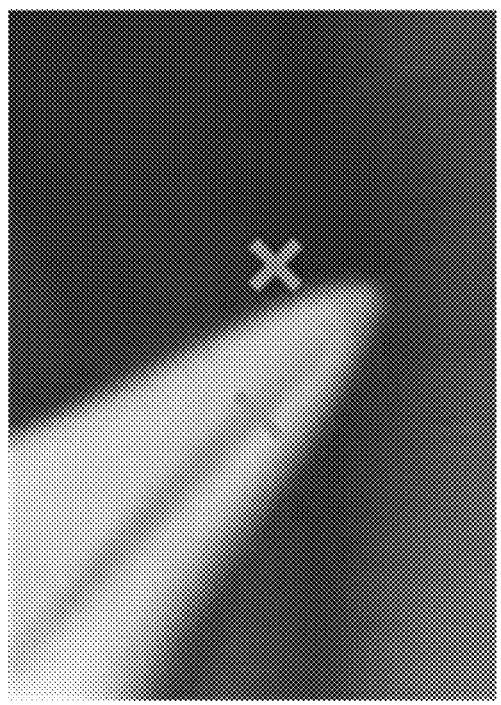
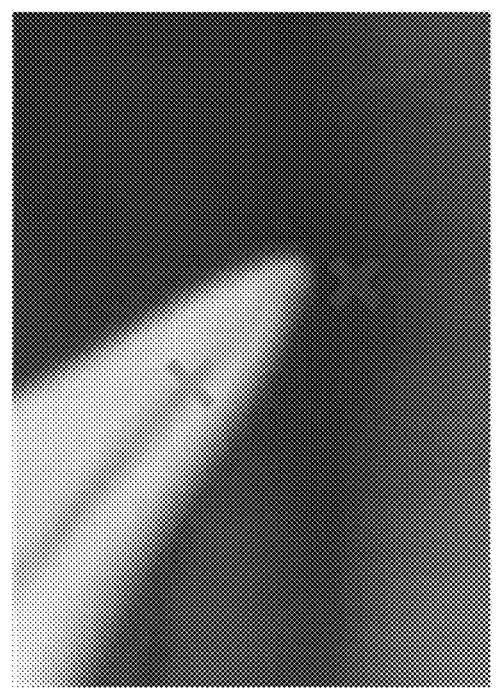
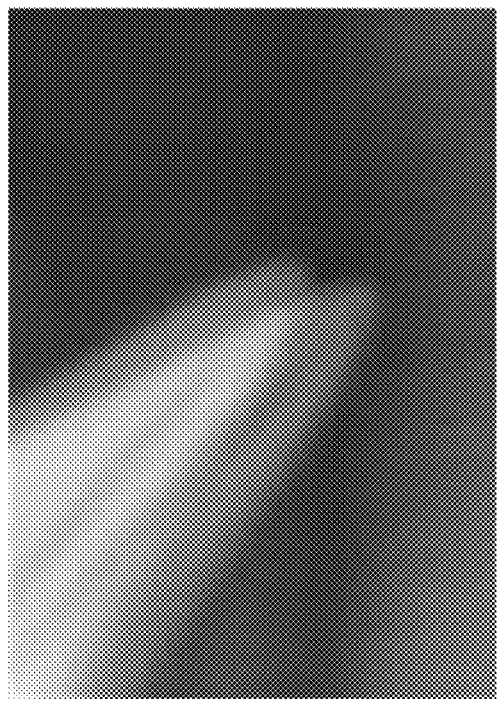
Figure 8

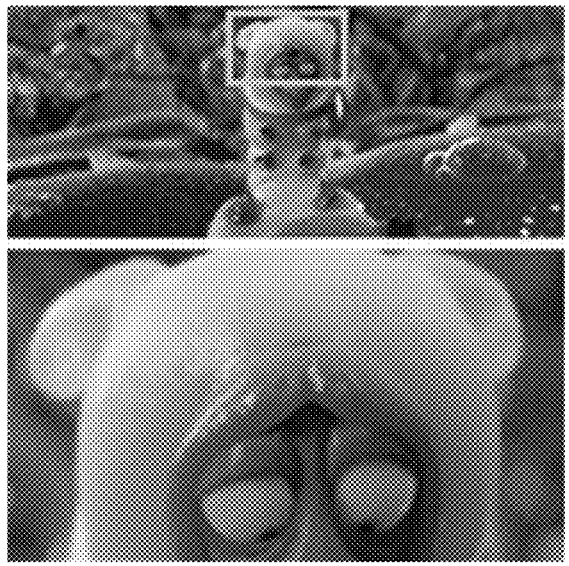
Ground Truth
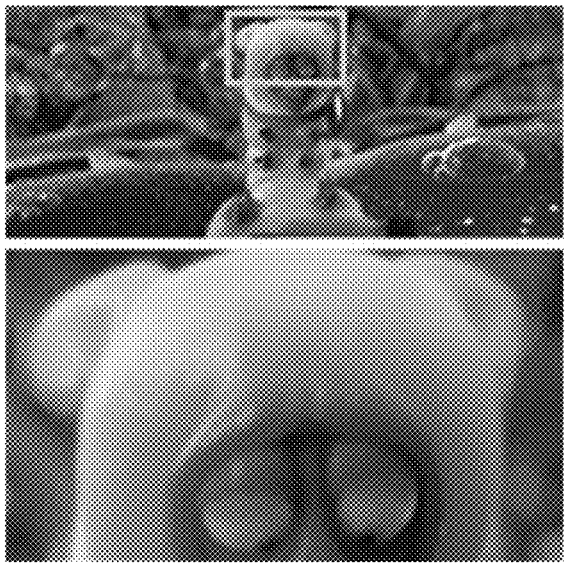
Niklaus et al.
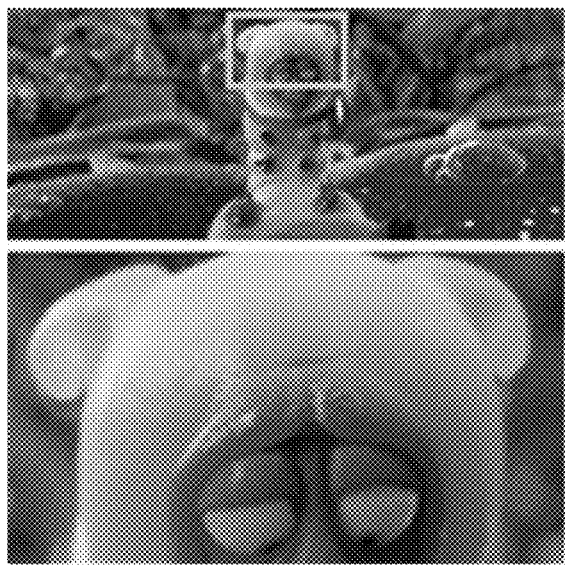
CAS - $\mathcal{L}_1$
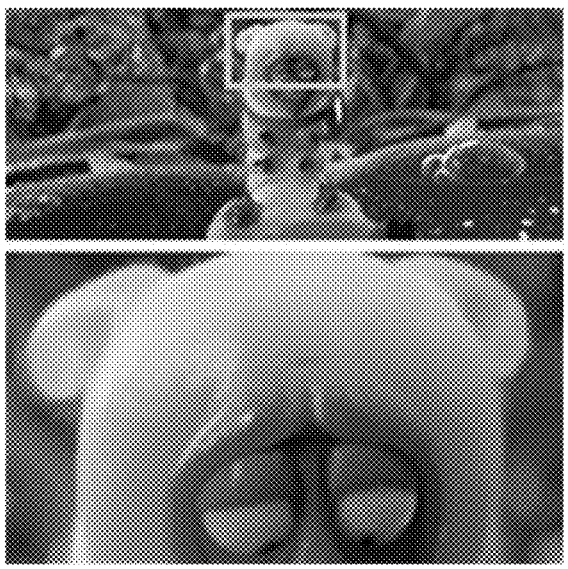
CAS - $\mathcal{L}_F$
Figure 12

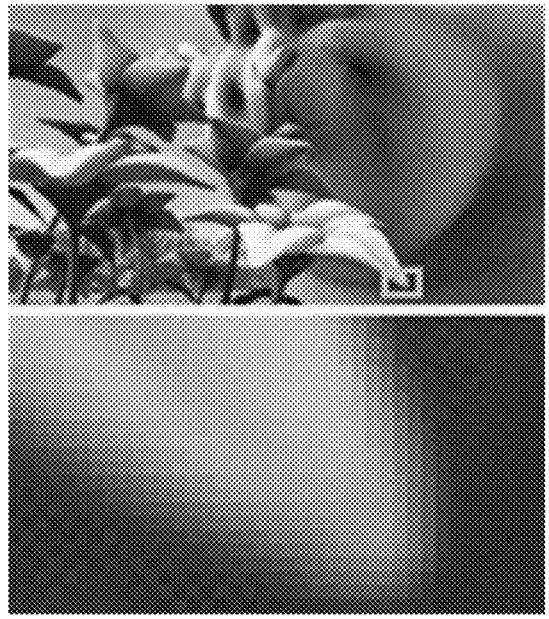
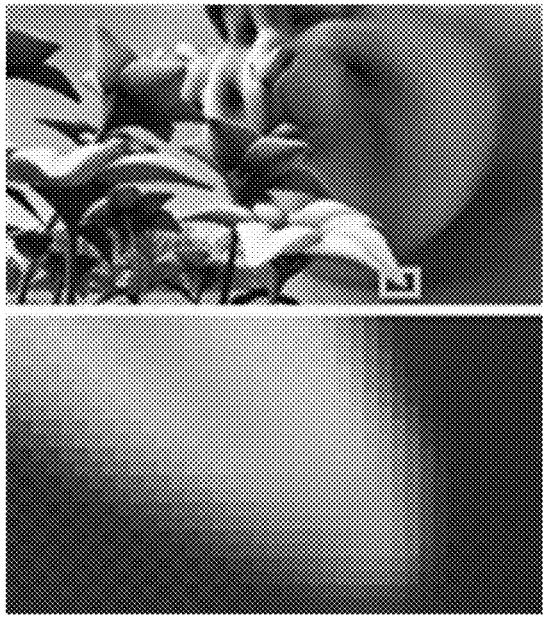
Transposed        Sub-pixel
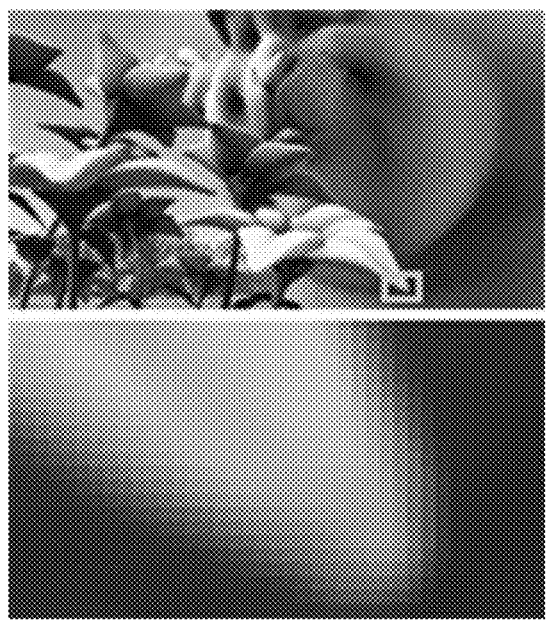
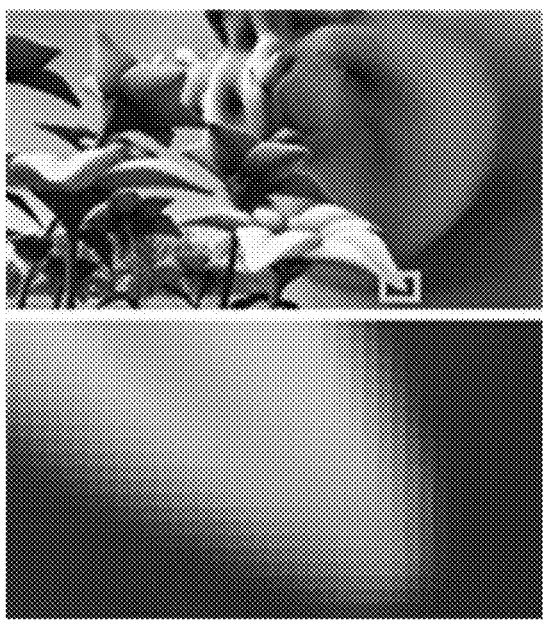
Nearest        Bilinear
Figure 14

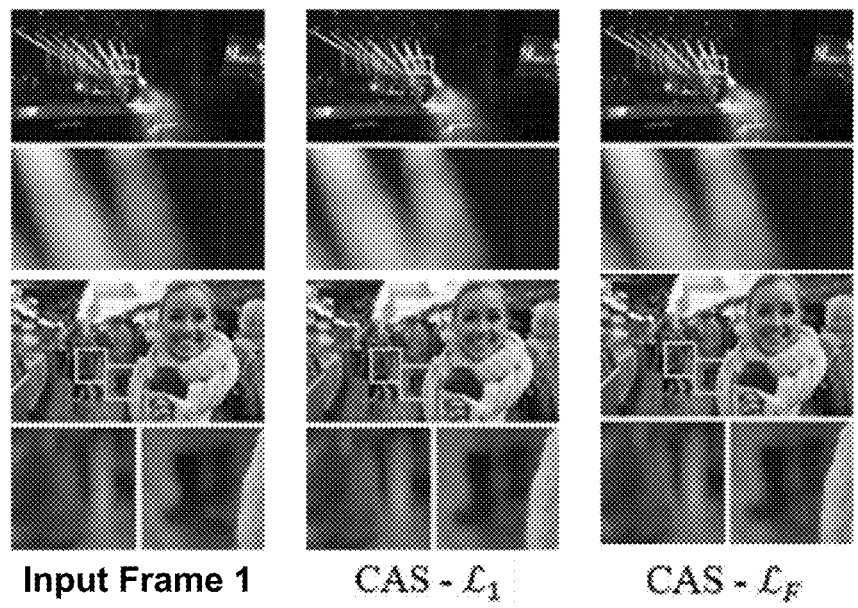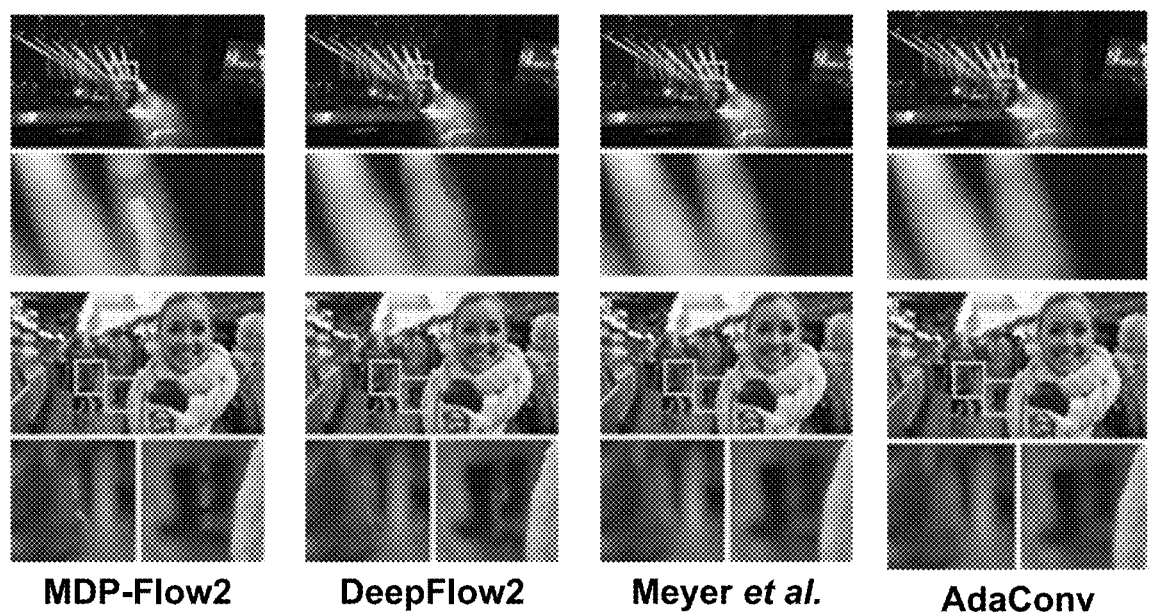
Figure 16B

|  | Mequon | | Schefflera | | Urban | | Teddy | | Backyard | | Basketball | | Dumptruck | | Evergreen | |
|---|---|---|---|---|---|---|---|---|---|---|---|---|---|---|---|---|
|  | all | disc. unt. | all | disc. unt. | all | disc. unt. | all | disc. unt. | all | disc. unt. | all | disc. unt. | all | disc. unt. | all | disc. unt. |
| Ours - $\mathcal{L}_3$ | 2.52 | 4.83 1.11 | 3.56 | 5.04 1.90 | 4.17 | 4.15 2.86 | 5.41 | 6.81 3.88 | 10.2 | 12.8 3.37 | 5.47 | 10.4 2.21 | 6.88 | 15.6 1.72 | 6.63 | 10.3 1.62 |
| MDP-Flow2 | 2.99 | 5.38 1.19 | 3.47 | 5.07 1.26 | 3.86 | 6.10 2.48 | 5.20 | 7.48 3.14 | 10.2 | 12.8 3.61 | 6.13 | 11.8 2.31 | 7.36 | 16.8 1.49 | 7.75 | 12.1 1.69 |
| DeepFlow2 | 2.99 | 5.65 1.22 | 3.88 | 5.79 1.48 | 3.62 | 6.03 1.34 | 5.38 | 7.44 3.22 | 11.0 | 13.5 3.67 | 5.83 | 11.2 2.25 | 7.60 | 17.4 1.50 | 7.82 | 12.2 1.77 |
| AdaConv | 3.57 | 6.88 1.41 | 4.34 | 5.67 2.52 | 5.00 | 5.86 2.98 | 8.99 | 8.89 4.89 | 10.2 | 12.8 3.21 | 5.33 | 10.1 2.27 | 7.30 | 16.6 1.92 | 6.94 | 10.8 1.67 |

Table 1: Evaluation on the Middlebury testing set. *disc.*: regions with discontinuous motion. *unt.*: textureless regions.

Figure 19T

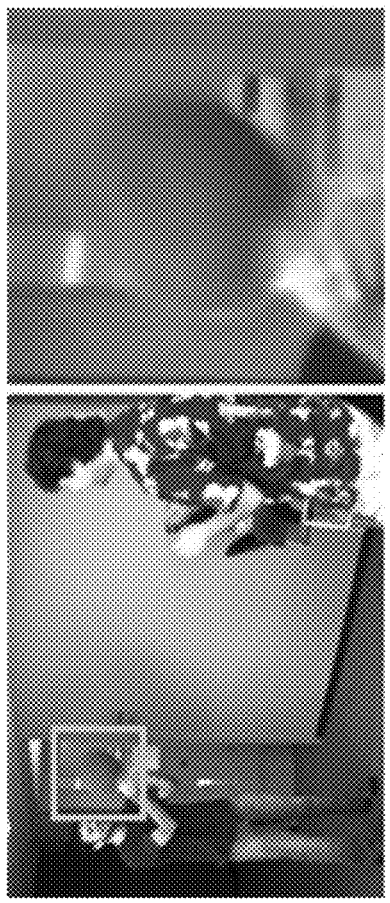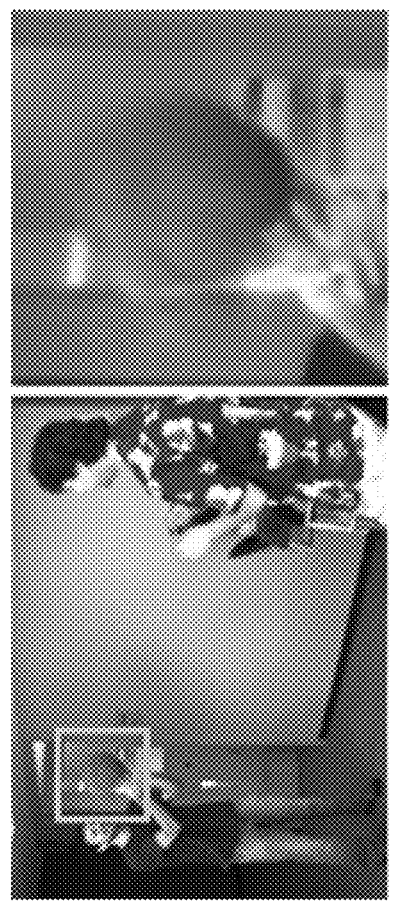
Figure 21

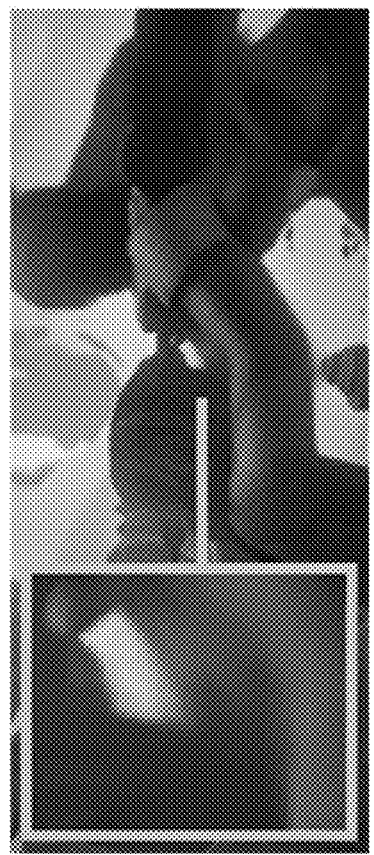
Figure 23

FRAME INTERPOLATION VIA ADAPTIVE CONVOLUTION AND ADAPTIVE SEPARABLE CONVOLUTION

RELATED APPLICATIONS

The present application is a National Stage application of Int'l Application No. PCT/US2018/022858 filed on Mar. 16, 2018, which claims priority under 35 U.S.C. § 119 to U.S. Provisional Application No. 62/473,234 filed on Mar. 17, 2017 and U.S. Provisional Application No. 62/485,794 filed on Apr. 14, 2017, the contents of each of which are hereby incorporated by reference in their entireties.

STATEMENT REGARDING FEDERALLY SPONSORED RESEARCH

This invention was made with government support under award number 1321119 awarded by the Nation Science Foundation (NSF) Division of Information and Intelligent Systems (IIS). The government has certain rights in the invention.

FIELD

Various embodiments generally may relate to the fields of signal processing and computer vision, and in particular, may relate to video frame interpolation via adaptive convolution.

BACKGROUND

Video frame interpolation is a basic video processing technique that is used to generate intermediate frames between any two consecutive original frames. Video frame interpolation algorithms typically estimate optical flow or its variations and use them to warp and blend original frames to produce interpolation results.

The background description provided herein is for the purpose of generally presenting the context of the disclosure. Unless otherwise indicated herein, the materials described in this section are not prior art to the claims in this application and are not admitted to be prior art by inclusion in this section.

BRIEF DESCRIPTION OF THE FIGURES

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 3 depicts example results showing the effects of using an additional gradient loss, in accordance with some embodiments.

FIG. 6 depicts an example qualitative evaluation of video with abrupt brightness change, in accordance with various embodiments.

FIG. 7 depicts an example qualitative evaluation with respect to occlusion, in accordance with various embodiments.

FIG. 8 depicts an example of occlusion handling, in accordance with various embodiments.

FIG. 12 depicts an example process of pixel interpolation, in accordance with various embodiments.

FIG. 14 depicts an example of images produced using various mechanisms, the first two may include checkerboard artifacts.

FIGS. 16A and 16B depict a visual comparison among frame interpolation methods according to various embodiments.

FIG. 19T shows a table showing an evaluation of the Middlebury testing set.

FIG. 21 shows an example where users of the user study of FIG. 20 preferred images produced using embodiments herein over other embodiments herein.

FIG. 23 shows example images produced using embodiments herein compared with images produced using other mechanisms.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. Further, various operations are described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in various embodiments," "in some embodiments," and the like are used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

I. Video Frame Interpolation Via Adaptive Convolution (ADACONV)

Figure 1:
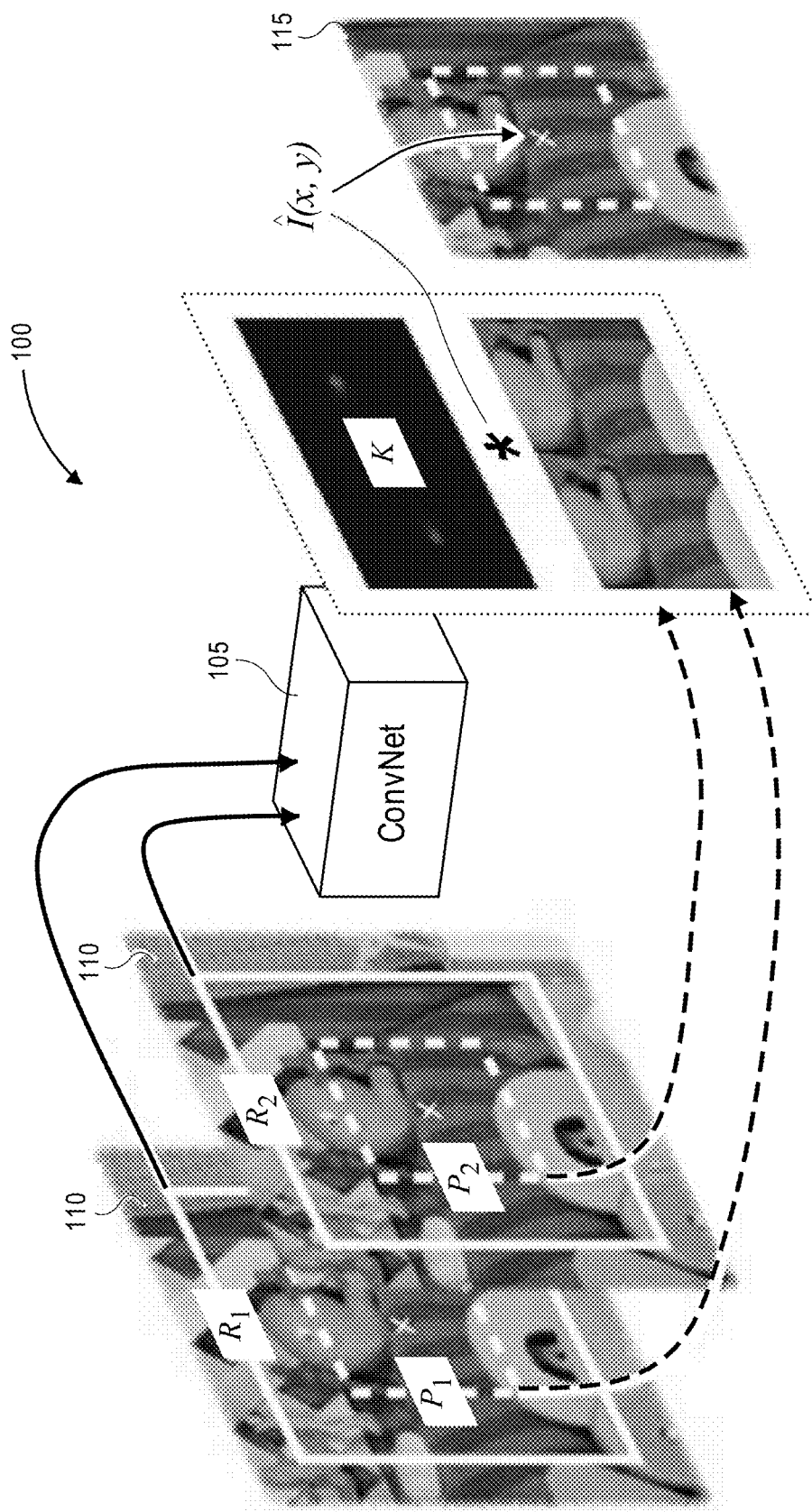
FIG. 1 depicts an example arrangement in which pixel interpolation by convolution may be practiced, in accordance with various embodiments.

Embodiments described herein include robust video frame interpolation that may achieve frame interpolation, which may use a deep convolutional neural network without explicitly dividing frame interpolation into separate steps. Embodiments may consider pixel interpolation as local convolution over corresponding image patches in two input video frames, and may estimate a spatially-adaptive convolutional kernel using a deep fully convolutional neural network. An example is shown by FIG. 1, which depicts an example arrangement 100 in which pixel interpolation by convolution may be practiced according to various embodiments.

Arrangement 100 may comprise a convolutional neural network (CNN or ConvNet) 105, which may be a deep neural network that transforms a three dimensional (3D) input volume into a 3D output volume. The ConvNet 105 may be an architecture for image classification tasks. A computer system/device implementing the ConvNet 105 may apply a series of filters to raw pixel data of an image to extract and learn higher-level features, which may then be used for classification. The ConvNet 105 may comprise an input layer, an output layer, and one or more hidden layers. The one or more hidden layers may include one or more convolutional layers, transposed convolution layers, one or more pooling layers, dense layers, upsampling layers, activation layers, and/or regularization and/or normalization layers.

The input layer may comprise the raw pixel data of an image and the output layer may comprise a single vector of class scores of the image along the depth dimension. In this example, the input layer may hold pixels data of the input image frames 110. The three dimensions of the 3D input volume of the input layer may include height, width, and depth. The depth dimension of the input layer may be a color of one or more image frames 110 (e.g., Red, Green, Blue (RGB) channels for each frame).

The convolutional layers may apply a specified number of convolutional operations to input data. This may include performing a set of operations to produce a single value in an output feature map. Each convolutional layer may include a set of learnable filters (also referred to as "kernels" or "weights"), which may be a small matrix that extends through the entire input volume, and may be used for blurring, sharpening, embossing, edge detection, and the like. Each convolutional layer may apply a convolution operation to (or "convolve") a corresponding kernel with the input volume, and may pass a result to a next layer. The data processed by individual convolutional layers may correspond to a receptive field of an image or image frame (e.g., receptive patches R1 and R2 in FIG. 1), where receptive fields of different convolutional layers may overlap with one another. Additionally, the convolutional layers may apply an activation function (e.g., ReLUs) of an activation layer to increase nonlinearlity.

The pooling layer(s) may be used to combine the outputs of various groupings or clusters of convolutional layers. The pooling layers may implement a form of downsampling to reduce the size of the feature map. In some implementations, the pooling layer(s) may implement max pooling, which extracts subregions of the feature map, keeps their maximum value, and discards the other values.

For a pixel (x, y) in an interpolated frame, the deep neural network (e.g., ConvNet 105) may take two receptive field (input) patches R1 and R2 centered at the output pixel as an input, and may estimate a convolution kernel K. The convolution kernel K may be used to convolve with the input patches P1 and P2 to synthesize the output pixel 115. In FIG. 1, for each output pixel (x, y), a convolution kernel K may be estimated and used to convolve with patches P1 and P2 centered at (x, y) in the input frames 110 to produce color Î(x, y) of the output frame 115.

One aspect of some embodiments is the formulation of pixel interpolation as convolution over pixel patches, instead of relying on optical flow estimation. This convolution formulation may unify the motion estimation and pixel synthesis into a single operation. A deep fully convolutional neural network may provide video frame interpolation without dividing interpolation into separate steps. This formulation is also more flexible than those based on optical flow and can better handle challenging scenarios for frame interpolation. Furthermore, such a neural network may be able to estimate edge-aware convolution kernels that may lead to sharp interpolation results.

Some embodiments may include robust video frame interpolation that employs a fully deep convolutional neural network to produce high-quality video interpolation results. These embodiments may provide several advantages. First, since video interpolation may be modeled as a single process, embodiments may make proper trade-offs among competing constraints and thus can provide a robust frame interpolation approach. Second, the frame interpolation deep convolutional neural network can be directly trained end-to-end using widely available video data, without any difficult-to-obtain ground truth data like optical flow. Third, as may be demonstrated in experiments, embodiments can generate high-quality frame interpolation results for challenging videos such as those with occlusion, blurring artifacts, and abrupt brightness change.

Frame interpolation for video is one of the basic computer vision and video processing technologies. It is a special case of image-based rendering where middle frames are interpolated from temporally neighboring frames. This section focuses on research that is specific to video frame interpolation.

Some existing frame interpolation methods estimate dense motion between two consecutive input frames using stereo matching or optical flow algorithms and then interpolate one or more middle frames according to the estimated dense correspondences. Different from these methods, other solutions have developed a moving gradient method that estimates paths in input images, copies proper gradients to each pixel in the frame to be interpolated and then synthesizes the interpolated frame via Poisson reconstruction. The performance of all the above methods depends on the quality of dense correspondence estimation and special care needs to be taken to handle issues like occlusion during the late image synthesis step.

As an alternative to explicit motion estimation-based methods, some phase-based methods have recently been used for video processing. These methods may encode motion in the phase difference between input frames and manipulate the phase information for applications like motion magnification and view expansion. Others have further extended these approaches to accommodate large motion by propagating phase information across oriented multi-scale pyramid levels using a bounded shift correction strategy. This phase-based interpolation method can generate video interpolation results and handle some challenging scenarios; however, further improvement is still required to better preserve high-frequency details in videos with large inter-frame changes.

Deep learning has been applied in solving not only difficult visual understanding problems, but also other computer vision problems like optical flow estimation, style transfer, and image enhancement. Deep learning operations may relate to view synthesis. Some deep learning technologies have been developed that can render unseen views from input images. These operations may work on objects, such as chairs and faces, and are not designed for frame interpolation for videos of general scenes.

Recently, some other solutions include a deep convolutional neural network operation that has been developed for synthesizing novel natural images from posed real-world input images. Their operation may project input images onto multiple depth planes and combine colors at these depth planes to create a novel view. Some previous solutions provide a deep learning-based view synthesis operation for view expansion for light field imaging. These solutions break novel synthesis into two components: disparity and color estimation, and may use two sequential convolutional neural networks to model these two components. These two neural networks may be trained simultaneously. Others have observed that the visual appearance of different views of the same instance may be highly correlated, and designed a deep learning operation to predict appearance flows that are used to select proper pixels in the input views to synthesize a novel view. Given multiple input views, their operation can interpolate a novel view by warping individual input views using the corresponding appearance flows and then properly combining them together. Embodiments of deep learning operations described herein can be trained end-to-end using videos directly. Compared to these methods, embodiments herein may be applied to video frame interpolation. Some embodiments may estimate convolution kernels that may capture both the motion and interpolation coefficients, and may use these kernels to directly convolve with input images to synthesize a middle video frame. Some embodiments may not need to project input images onto multiple depth planes or explicitly estimate disparities or appearance flows to warp input images and then combine them together. Experiments may show that some embodiments of frame interpolation as a single convolution step may robustly handle challenging cases.

I.1. Video Frame Interpolation

Figure 2A:
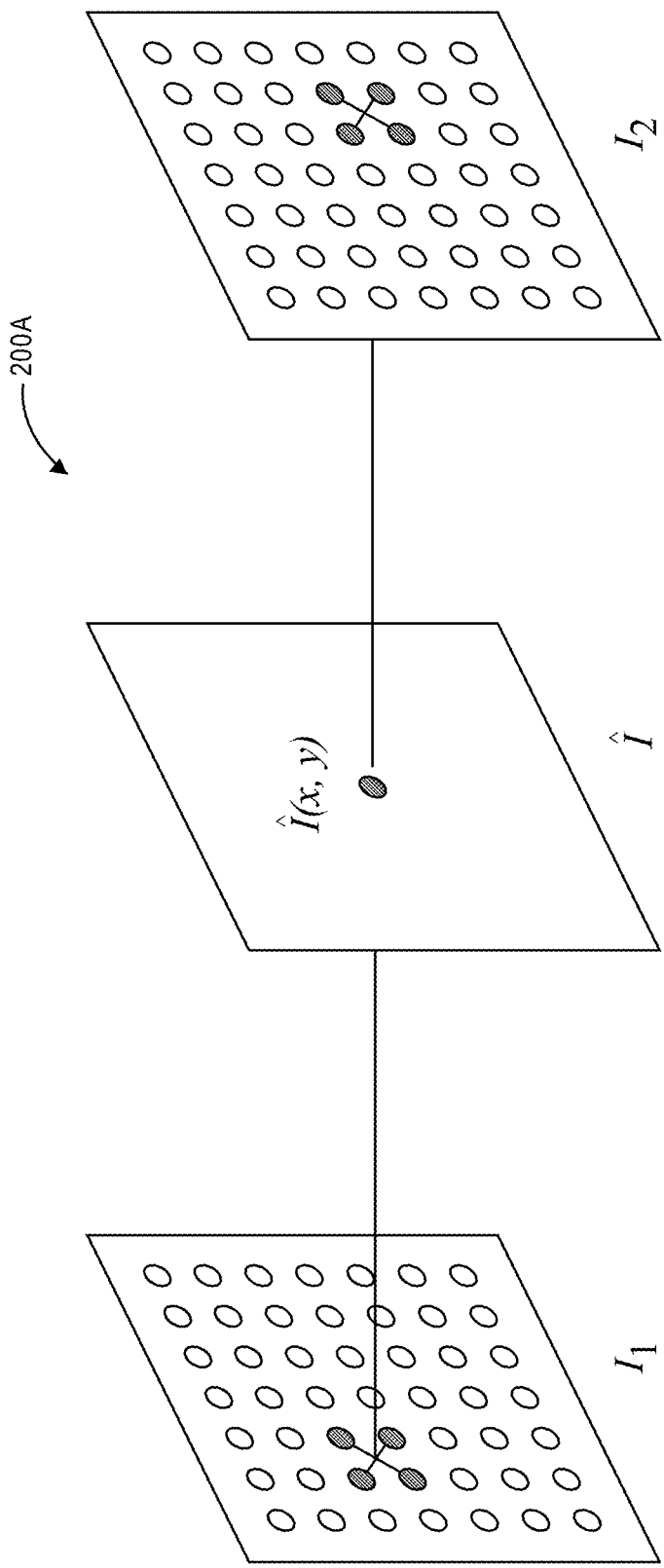
FIG. 2A depicts an example procedure of interpolation by motion estimation and color interpolation.

Given two video frames I1 and I2, embodiments may interpolate a frame Î temporally in the middle of the two input frames. FIG. 2A depicts an example procedure 200A of interpolation by motion estimation and color interpolation. Procedure 200A comprises a two-step approach, including estimating motion between two frames and then interpolating the pixel color based on the motion. Procedure 200A interpolation method may estimate the color of a pixel Î(x, y) in the interpolated frame in two steps: dense motion estimation, typically through optical flow, and pixel interpolation. For instance, for pixel (x, y) its corresponding pixels (x1, y1) in I1 and (x2, y2) may be found in I2 and then the color from these corresponding pixels may be interpolated. This step may also involve re-sampling images I1 and I2 to obtain the corresponding values I1 (x1, y1) and I2 (x2, y2) to produce a high-quality interpolation result, such as when (x1, y1) and (x2, y2) are not integer locations, as illustrated in FIG. 2(a). This two-step approach can be compromised when optical flow is not reliable due to occlusion, motion blur, and lack of texture. Also, rounding the coordinates to find the color for I1 (x1, y1) and I2 (x2, y2) may be prone to aliasing while re-sampling with a fixed kernel sometimes cannot preserve sharp edges well. Advanced re-sampling methods can be used for edge-preserving re-sampling, which, may require high-quality optical flow estimation.

Figure 2B:
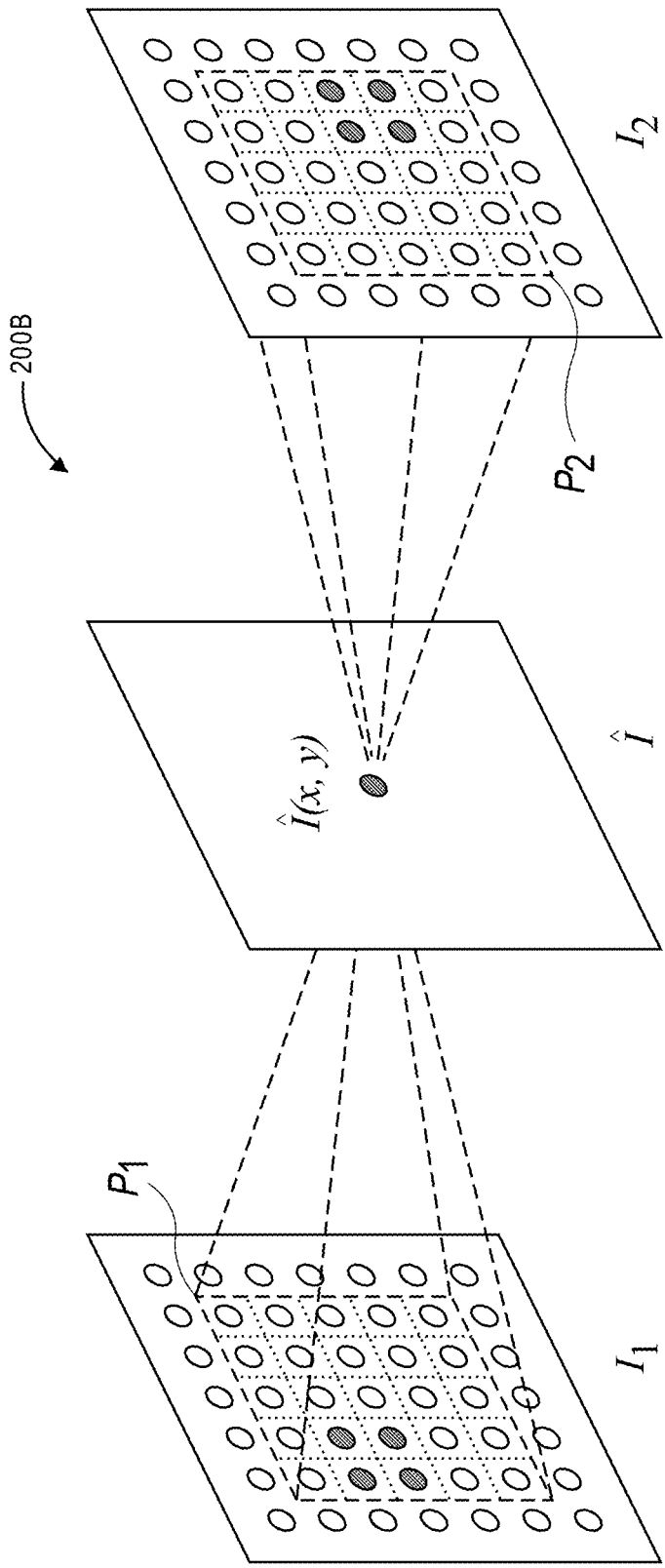
FIG. 2B depicts an example procedure of interpolation by convolution according to various embodiments.

Embodiments herein may combine motion estimation and pixel synthesis into a single step and may formulate pixel interpolation as a local convolution over patches in the input images I1 and I2. FIG. 2B depicts an example procedure 200B of interpolation by convolution, according to various embodiments. Procedure 200B may directly estimate a convolution kernel and use the kernel to convolve the two frames to interpolate the pixel color.

As shown in FIG. 2B, the color of pixel (x, y) in the target image to be interpolated can be obtained by convolving a proper kernel K over input patches P1(x, y) and P2(x, y), which may also be centered at (x, y) in the respective input images. The convolutional kernel K may capture both motion and re-sampling coefficients for pixel synthesis. This formulation of pixel interpolation as convolution may have advantages. First, the combination of motion estimation and pixel synthesis into a single step may provide a more robust solution than the two-step procedure. Second, the convolution kernel may provide flexibility to account for and address difficult cases like occlusion. For example, optical flow estimation in an occluded region may be a difficult problem, which may make it difficult for a typical two-step approach to proceed. Extra steps based on heuristics, such as flow interpolation, may need to be taken. Embodiments described herein may provide a data-driven approach to directly estimate the convolution kernel that can produce visually plausible interpolation results for an occluded region. Third, if properly estimated, this convolution formulation can seamlessly integrate advanced re-sampling techniques like edge-aware filtering to provide sharp interpolation results.

Embodiments herein may include estimating proper convolution kernels. Encouraged by use of deep learning for optical flow estimation and image synthesis, a deep convolutional neural network operation may estimate a proper convolutional kernel to synthesize each output pixel in interpolated images. The convolutional kernels for individual pixels may vary according to the local motion and image structure to provide high-quality interpolation results. A deep neural network for kernel estimation is described below.

I.1.1. Convolution Kernel Estimation

Embodiments may include a fully convolutional neural network to estimate the convolution kernels for individual output pixels. An architecture of the neural network is illustrated by Table 1.

TABLE 1 example convolution neural network architecture

| Type | BN | ReLU | Size | Stride | Output |
|---|---|---|---|---|---|
| input | — | — | — | — | 6 × 79 × 79 |
| conv | ✓ | ✓ | 7 × 7 | 1 × 1 | 32 × 73 × 73 |
| down-conv | — | ✓ | 2 × 2 | 2 × 2 | 32 × 36 × 36 |
| conv | ✓ | ✓ | 5 × 5 | 1 × 1 | 64 × 32 × 32 |
| down-conv | — | ✓ | 2 × 2 | 2 × 2 | 64 × 16 × 16 |
| conv | ✓ | ✓ | 5 × 5 | 1 × 1 | 128 × 12 × 12 |
| down-conv | — | ✓ | 2 × 2 | 2 × 2 | 128 × 6 × 6 |
| conv | ✓ | ✓ | 3 × 3 | 1 × 1 | 256 × 4 × 4 |
| conv | — | ✓ | 4 × 4 | 1 × 1 | 2048 × 1 × 1 |
| conv | — | — | 1 × 1 | 1 × 1 | 3362 × 1 × 1 |
| spatial softmax | — | — | — | — | 3362 × 1 × 1 |
| output | — | — | — | — | 41 × 82 × 1 × 1 |

Table 1 makes use of Batch Normalization (BN) as well as Rectified Linear Units (ReLU). Note that the output only reshapes the result without altering its value. The ReLUs (or "rectifiers") may be activation functions that compute the function $f(x)=\max(0,x)$. The activation of a ReLU may be zero when $x<0$ and then linear with slope 1 when $x>0$ (e.g., the activation is thresholded at zero). BN may be a method to reduce internal covariate shift in neural networks.

To estimate a convolutional kernel K for the output pixel (x, y), the neural network may take receptive field patches R1(x, y) and R2(x, y) as input. R1(x, y) and R2(x, y) may both be centered at (x, y) in the respective input images. The patches P1 and P2 that the output kernel may convolve in order to produce the color for the output pixel (x, y) may be co-centered at the same locations as these receptive fields, but with a smaller size, as illustrated in FIG. 1. A receptive field may be larger than the patch to better handle the aperture problem in motion estimation. In some embodiments, the default receptive field size may be 79×79 pixels. The convolution patch size may be 41×41 and the kernel size may be 41×82 as it is used to convolve with two patches. The same convolution kernel may be applied to each of the three color channels.

As shown in Table 1, the convolutional neural network may include several convolutional layers as well as down-convolutions as alternatives to max-pooling layers. Rectified Linear Units may be used as activation functions and Batch Normalization may be used for regularization. No further techniques may be used for regularization since the neural network can be trained end to end using widely available video data, which may provide a sufficiently large training dataset. Data augmentation may be used extensively, by horizontally and vertically flipping the training samples as well as reversing their order. The neural network may be fully convolutional. Therefore, it may not be restricted to a fixed-size input and, as detailed in Section 3.3, embodiments may use a shift-and-stitch technique to produce kernels for multiple pixels simultaneously to speedup operations.

A constraint may be that the coefficients of the output convolution kernel should be non-negative and sum up to one. Therefore, some embodiments may connect the final convolutional layer to a spatial softmax layer to output the convolution kernel, which may implicitly meet this constraint.

I.1.1.1 Loss Function

For clarity, the following notations may be used; the ith training example may include two input receptive field patches Ri,1 and Ri,2 centered at (xi, yi), the corresponding input patches Pi,1 and Pi,2 may be smaller than the receptive field patches and also may be centered at the same location, the ground-truth color $\tilde{C}_i$ and the ground-truth gradient $\tilde{G}_i$ at (xi, yi) in the interpolated frame. For simplicity, the (xi, yi) in the definition of the loss functions may be omitted.

One possible loss function of the deep convolutional neural network can be the difference between the interpolated pixel color and the ground-truth color as defined by equation 1.

$$E_c = \Sigma_i \|[P_{i,1} P_{i,2}] * K_i - \tilde{C}_i\|_2 \tag{1}$$

Where subscript i may indicate the ith training example and Ki may be the convolution kernel output by the neural network. Experiments may show that this color loss alone, even using l1 norm, can lead to blurry results, as shown in FIG. 3. This blurriness problem was also reported in some other work. Some solutions have shown that this blurriness problem can be alleviated by incorporating image gradients in the loss function. This may be difficult within a pixel-wise interpolation approach, since the image gradient cannot be directly calculated from a single pixel. Since differentiation is also a convolution, this problem may be addressed by using the associative property of convolution: first compute the gradient of input patches and then perform convolution with the estimated kernel, which will result in the gradient of the interpolated image at the pixel of interest. As a pixel (x, y) has eight immediate neighboring pixels, eight versions of gradients may be computed using finite difference, and all of them may be incorporated into the gradient loss function.

$$E_g = \Sigma_i \Sigma_{k=1}^{8} \|[G_{i,1}^k G_{i,2}^k] * K_i - \tilde{G}_i^k\|_1 \tag{2}$$

where the superscript k denotes one of the eight ways to compute the gradient. $G^k{}_{i,1}$ and $G^k{}_{i,2}$ may be the gradients of the input patches Pi,1 and Pi,2, and $\tilde{G}^k{}_i$ may be the ground-truth gradient. The above color and gradient loss may be combined as a final loss $E_c + E_g$. As shown in FIG. 3, this color plus gradient loss may enable embodiments to produce sharper interpolation results.

I.1.2. Training

A training dataset may be derived from an online video collection, as described later in this section. To train the neural network, parameters may be initialized using a Xavier initialization approach and then optimized using AdaMax with $\beta1=0.9$, $\beta2=0.999$, a learning rate of 0.001 and 128 samples per mini-batch to minimize the loss function. "AdaMax" is an adaptive stochastic gradient descent method that is a variant of Adam based on the infinity norm. "Adam" is an algorithm for first-order gradient-based optimization of stochastic objective functions, based on adaptive estimates of lower-order moments.

I.1.2.1 Training Dataset

A loss function may be based on the ground truth video frame and does not need any other ground truth information like optical flow. Therefore, videos that are widely available online may be used to train the neural network. To make it easy to reproduce results, publicly available videos from Flickr with a Creative Commons license may be used. As an example, 3,000 videos may be downloaded using keywords, such as "driving", "dancing", "surfing", "riding", and "skiing", which may yield a diverse selection. The downloaded videos may be scaled to a fixed size of 1280×720 pixels. Interlaced videos, which sometimes may have a lower quality than the videos with the progressive-scan format, may be removed.

To generate the training samples, all the frames in each of the remaining videos may be grouped into triple-frame groups, each containing three consecutive frames in a video. A pixel may be randomly picked in each triple-frame group, and a triple-patch group centered at that pixel may be extracted from the video frames. To facilitate data augmentation, the patches may be selected to be larger than the receptive-field patches used by the neural network. The patch size in a training dataset may be 150×150 pixels. To avoid including a large number of samples with no or little motion, the optical flow between patches may be estimated from the first and last frame in the triple-frame group, and the mean flow magnitude may be computed. As an example, 500,000 triple-patch groups may be sampled without replacement according to flow magnitude: a patch group with larger motion is more likely to be chosen than one with smaller motion. In this way, a training set may include samples with a wide range of motion while avoiding being dominated by patches with little motion. Since some videos may include many shots, the color histogram between patches may be computed to detect shot boundaries, and groups across the shot boundaries may be removed. Furthermore, samples with little texture may also not be very useful to train the neural network. The entropy of patches in each sample may be computed and, for example, 250,000 triple-patch groups with the largest entropy may be selected to form the training dataset. In this training dataset, about 10 percent of the pixels may have an estimated flow magnitude of at least 20 pixels. The average magnitude of the largest five percent is approximately 25 pixels and the largest magnitude is 38 pixels.

Data augmentation may be performed on the fly during training. The receptive-field size for the neural network may be 79×79, which may be smaller than the patch size in the training samples. Therefore, during the training, the receptive field patch may be randomly cropped from each training sample. In some embodiments, random samples may be flipped horizontally, as well as vertically, and their temporal order may be randomly swapped. This may cause the optical flow within the samples to be distributed symmetrically so that the neural network is not biased towards a certain direction.

I.1.3. Example Implementations

Various example implementations that may make the embodiments discussed herein robust and efficient, as well as a selection of hyper-parameters of the neural network, are discussed infra.

I.1.3.1 Shift-and-Stitch Implementation

A straightforward way to apply the neural network to frame interpolation is to estimate the convolution kernel and synthesize the interpolated pixel one by one. This pixel-wise application of the neural network may unnecessarily perform redundant computations when passing two neighboring pairs of patches through the neural network to estimate the convolution kernels for two corresponding pixels. Some implementations employ a shift-and-stitch approach to address this problem to speed-up the system.

For example, as the neural network may be fully convolutional and may not require a fixed-size input, it can compute kernels for more than one output pixel at once by supplying a larger input than what is required to produce one kernel. This can mitigate the issue of redundant computations. The output pixels that are obtained in this way may however not be adjacent and may instead be sparsely distributed. A shift-and-stitch approach may be employed, in which slightly shifted versions of the same input may be used. This approach returns sparse results that can be combined to form dense representation of the interpolated frame. Considering a frame with size 1280×720, a pixel-wise implementation of the neural network may require 921,600 forward passes through the neural network. The shift-and-stitch implementation of the neural network only require 64 forward passes for the 64 differently shifted versions of the input to cope with the downscaling by the three down-convolutions. Compared to the pixel-wise implementation that takes 104 seconds per frame on an Nvidia Titan X, the shift-and-stitch implementation may only takes 9 seconds.

I.1.3.2 Boundary Handling

Due to the receptive field of the network as well as the size of the convolution kernel, the input frames may be padded to synthesize boundary pixels for the interpolated frame. Some implementations may adopt zero-padding. Experiments may show that this approach usually works well and may not introduce noticeable artifacts.

I.1.3.3 Hyper Parameter Selection

The convolution kernel size and the receptive field size may be two hyper-parameters of the deep neural network. In theory, the convolution kernel, as shown in FIG. 2, must be larger than the pixel motion between two frames in order to capture the motion (implicitly) to produce a good interpolation result. To make the neural network robust against large motion, a large kernel may be chosen. On the other hand, a large kernel involves a large number of values to be estimated, which increases the complexity of the neural network. In embodiments, a convolution kernel that is large enough to capture the largest motion in the training dataset, which is 38 pixels, may be chosen. Particularly, the convolution kernel size in embodiments may be 41×82 ad may be applied to two 41×41 patches as illustrated in FIG. 1. This kernel may be made a few pixels larger than 38 pixels to provide pixel support for re-sampling, which may be captured in the kernel, if not explicitly performed.

As discussed earlier, the receptive field may be larger than the convolution kernel to handle an aperture problem well. However, a larger receptive field may require more computation and may be less sensitive to motion. In embodiments, the receptive field may be chosen using a validation dataset so that 79×79 may achieve a good balance.

I.2. Experiments

Embodiments described herein may be compared to other video frame interpolation methods, including a phase-based interpolation method and a few optical flow-based methods. The optical flow algorithms in some experiments include MDP-Flow2, which may produce low interpolation error according to the Middlebury benchmark, a method from another solution, as well as two recent deep learning based approaches, namely DeepFlow2 and FlowNetS. The interpolation method from the Middlebury benchmark may be used to synthesize the interpolated frame using the optical flow results. For the two deep learning-based optical flow methods, the trained models from the author websites may be used directly.

I.2.1. Comparisons

Figure 4:
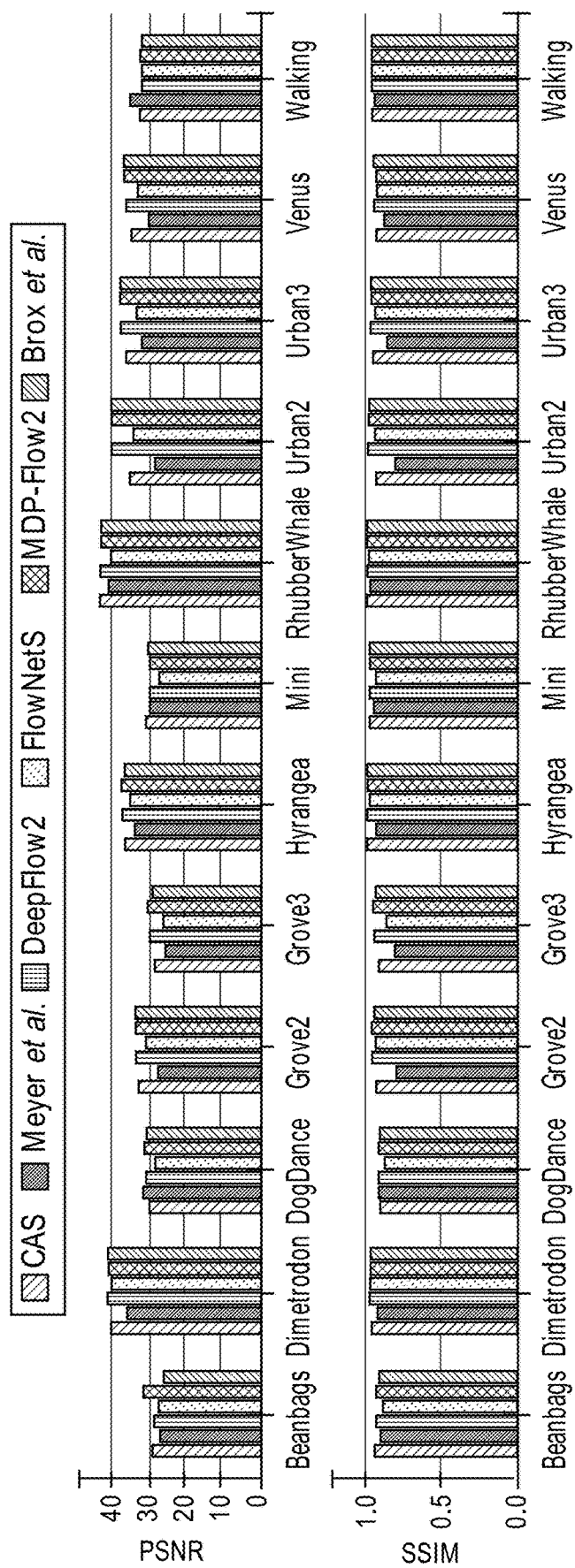
FIG. 4 depicts an example quantitative evaluation of Middlebury examples in accordance with some embodiments.

FIG. 4 depicts a quantitative evaluation of samples from the Middlebury optical flow benchmark that provide ground truth interpolation results, in accordance with various embodiments. As shown by FIG. 4, embodiments described herein are comparable to other methods according to both Peak Signal-to-Noise Ratio (PSNR) and Structural Similarity (SSIM). Qualitatively, embodiments described herein can often produce results in challenging regions that are visually more appealing than other methods.

Figure 5:
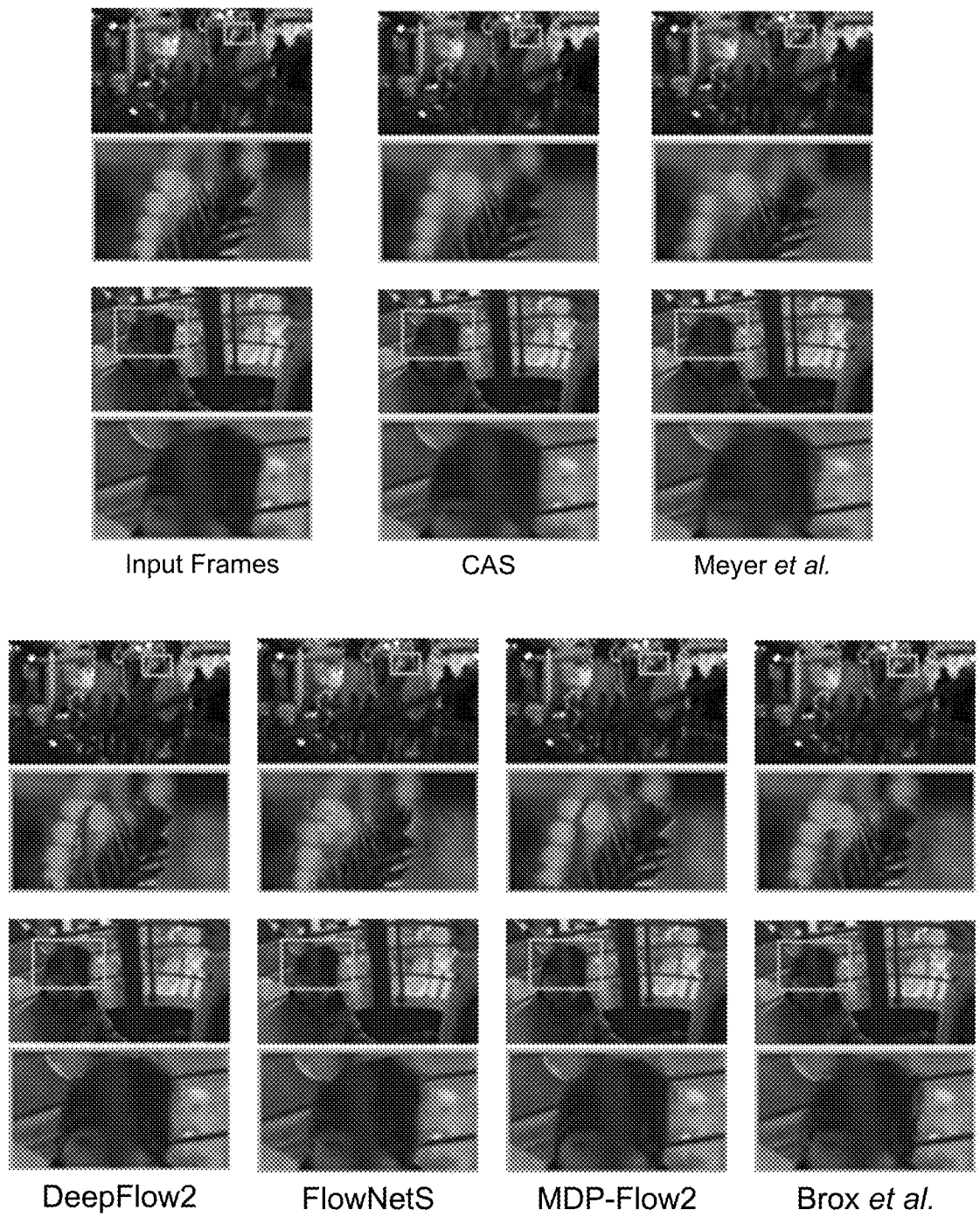
FIG. 5 depicts an example quantitative evaluation of blurry videos in accordance with some embodiments.

FIG. 5 shows two examples where the input videos suffer from out-of-focus blur (top) and motion blur (bottom). Blurry regions are often challenging for optical flow estimation; thus these regions in the interpolated results suffer from noticeable artifacts. Embodiments described herein and the phase-based method can handle blurry regions better, while embodiments described herein produce sharper images, especially in regions with large motion, such as the right side of the hat in the bottom example.

FIG. 6 depicts an example qualitative evaluation of video with abrupt brightness change, in accordance with various embodiments. As shown in FIG. 6, abrupt brightness change violates the brightness consistency assumption and compromises optical flow estimation, causing artifacts in frame interpolation. For this example, embodiments described herein and the phase-based method generate more visually appealing interpolation results than flow-based methods.

One of the biggest challenges for optical flow estimation is occlusion. When optical flow is not reliable or unavailable in occluded regions, frame interpolation methods may need to fill in holes, such as by interpolating flow from neighboring pixels. Embodiments described herein may adopt a learning approach to obtain proper convolution kernels that lead to visually appealing pixel synthesis results for occluded regions, as shown in FIG. 7.

To better understand how embodiments described herein handle occlusion, the convolution kernels of pixels in the occluded regions may be examined. As shown in FIG. 1, a convolution kernel can be divided into two sub-kernels, each of which may be used to convolve with one of the two input patches. For the ease of illustration, the centroid of each sub-kernel may be computed and marked using x in the corresponding input patch to indicate where the output pixel gets its color from.

Figure 20:
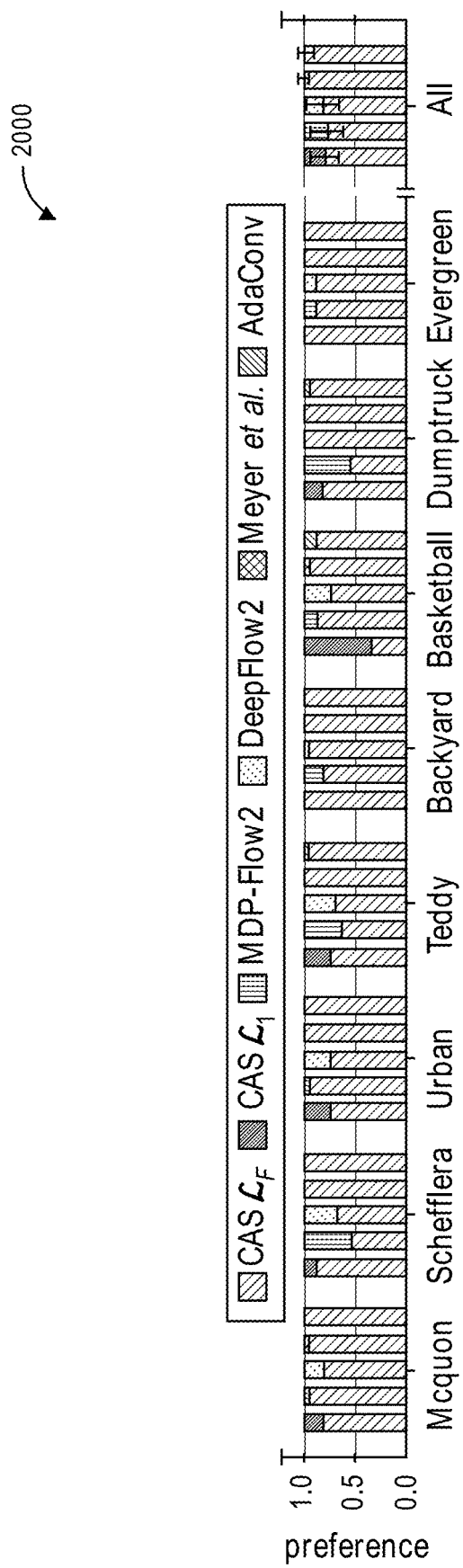
FIG. 20 shows results of a user study according to various embodiments.

FIG. 20 shows the results of a user study, where error bars denote the standard deviation. FIG. 8 shows an example where the white leaf moves up from Frame 1 to Frame 2. The occlusion can be seen in the left image that overlays two input frames. For this example, the pixel indicated by the green x is visible in both frames and the kernel of embodiments described herein shows that the color of this pixel is interpolated from both frames. In contrast, the pixel indicated by the red x is visible only in Frame 2. The sum of all the coefficients in the sub-kernel for Frame 1 may be almost zero, which may indicate that Frame 1 may not contribute to this pixel and this pixel gets its color only from Frame 2. Similarly, the pixel indicated by the cyan x is only visible in Frame 1. The kernel of embodiments described herein may correctly account for this occlusion and gets its color from Frame 1 only.

I.2.2. Edge-Aware Pixel Interpolation

Figure 9:
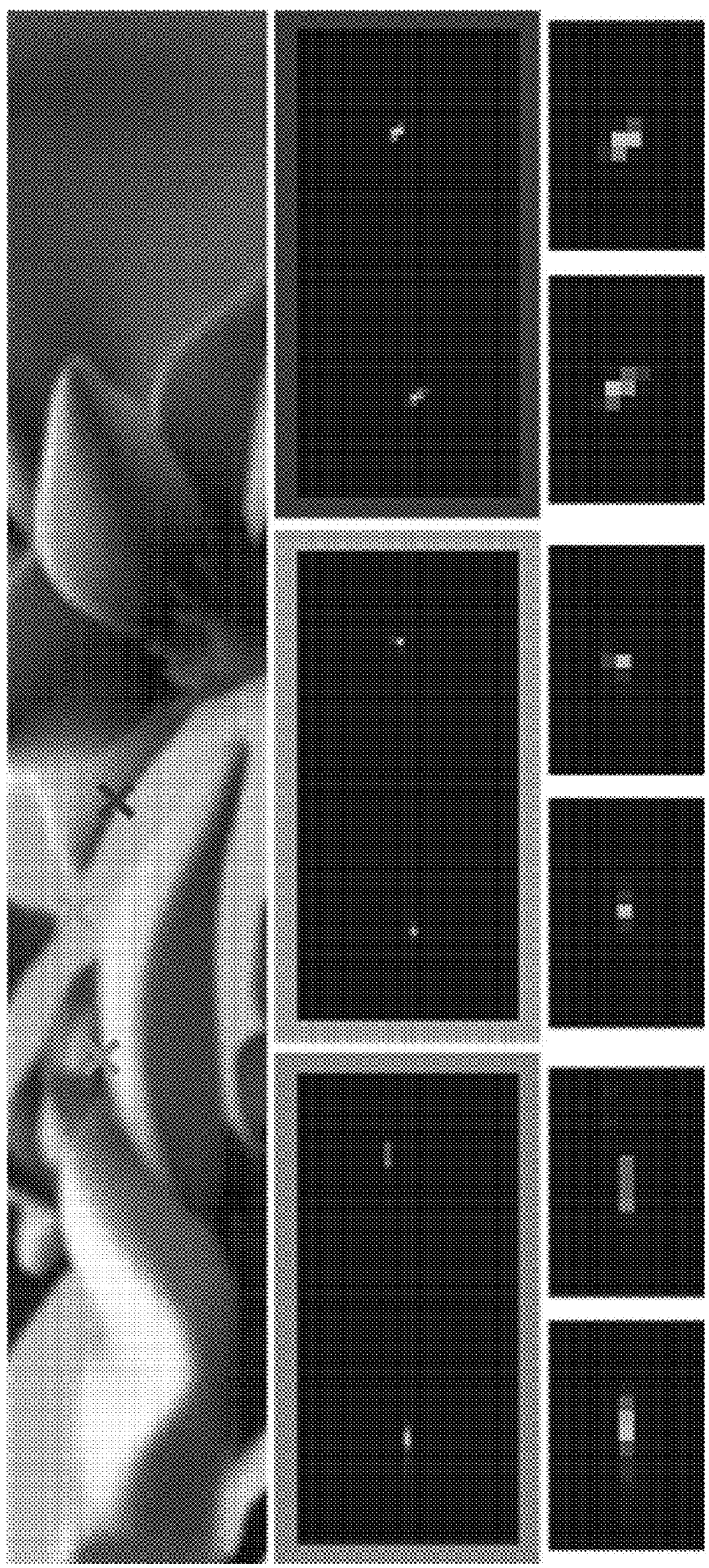
FIG. 9 depicts an example of convolution kernels, in accordance with various embodiments.

The previous examples discussed how estimated convolution kernels of embodiments described herein appropriately handle occlusion for frame interpolation. How these kernels adapt to image features is now examined FIG. 9 depicts an example of convolution kernels, in accordance with various embodiments. In FIG. 9, three pixels in the interpolated image may be sampled. Their kernels are shown at the bottom. The correspondence between a pixel and its convolution kernel is established by color. First, for all these kernels, only a very small number of kernel elements have non-zero values. (The use of a spatial softmax layer in the neural network may provide that the kernel element values are non-negative and sum up to one.) Furthermore, these non-zero elements may be spatially grouped together. This corresponds well with a typical flow-based interpolation method that may find corresponding pixels or their neighborhood in two frames and then interpolate. Second, for a pixel in a flat region such as the one indicated by the green x, its kernel may have only two elements with significant values. Each of these two kernel elements corresponds to a relevant pixel in the corresponding input frame. This is also consistent with the flow-based interpolation methods although the neural network may not explicitly model the frame interpolation procedure. Third, for pixels along image edges, such as the ones indicated by the red and cyan x, the kernels may be anisotropic and their orientations may align well with the edge directions. This shows that the neural network of embodiments described herein may learn to estimate convolution kernels that enable edge-aware pixel interpolation, which may produce sharp interpolation results.

I.2.3. Discussion

Embodiments described herein may be scalable to large images due to their pixel-wise nature. Furthermore, the shift-and-stitch implementation of the neural network allows parallel processing of multiple pixels and reducing the redundancy in computing the convolution kernels for these pixels. On a single Nvidia Titan X, for example, this implementation takes about 2.8 seconds with 3.5 gigabytes of memory for a 640×480 image, and 9.1 seconds with 4.7 gigabytes for 1280×720, and 21.6 seconds with 6.8 gigabytes for 1920×1080.

Figure 10:
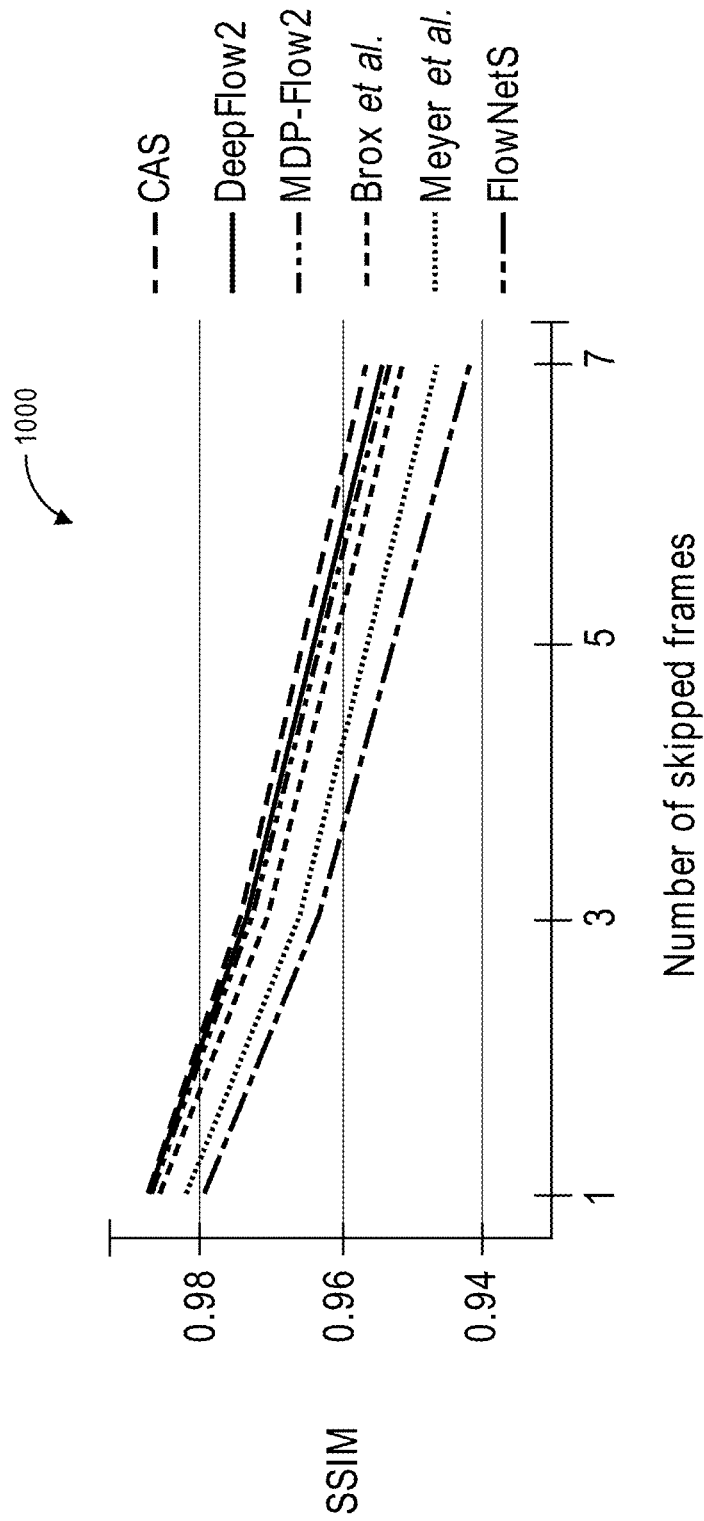
FIG. 10 depicts a graph showing the effect of increasing motion on frame interpolation methods.

FIG. 10 depicts a graph 1000 showing the effect of increasing motion on frame interpolation methods. FIG. 10 shows an example how embodiments described herein may work for increased motion between two input frames. In this test, the number of frames skipped in a 240 fps testing video may be gradually increased, and then the SSIM values between the interpolation result and the ground truth may be measured. FIG. 10 shows that embodiments described herein may be slightly more robust than the other comparing methods when more and more frames are skipped. Meanwhile, the amount of motion that embodiments described herein can handle is necessarily limited by the convolution kernel size in the neural network, which may be 41×82. Any large motion beyond 41 pixels may not be handled.

Unlike optical flow- or phase-based methods, embodiments described herein may interpolate a single frame between two given frames as the neural network is trained to interpolate the middle frame. Other embodiments may extend the neural network such that it can take a variable as input to control the temporal step of the interpolation in order to interpolate an arbitrary number of frames like flow- or phase-based methods.

I.3. Example Embodiments

Figure 11:
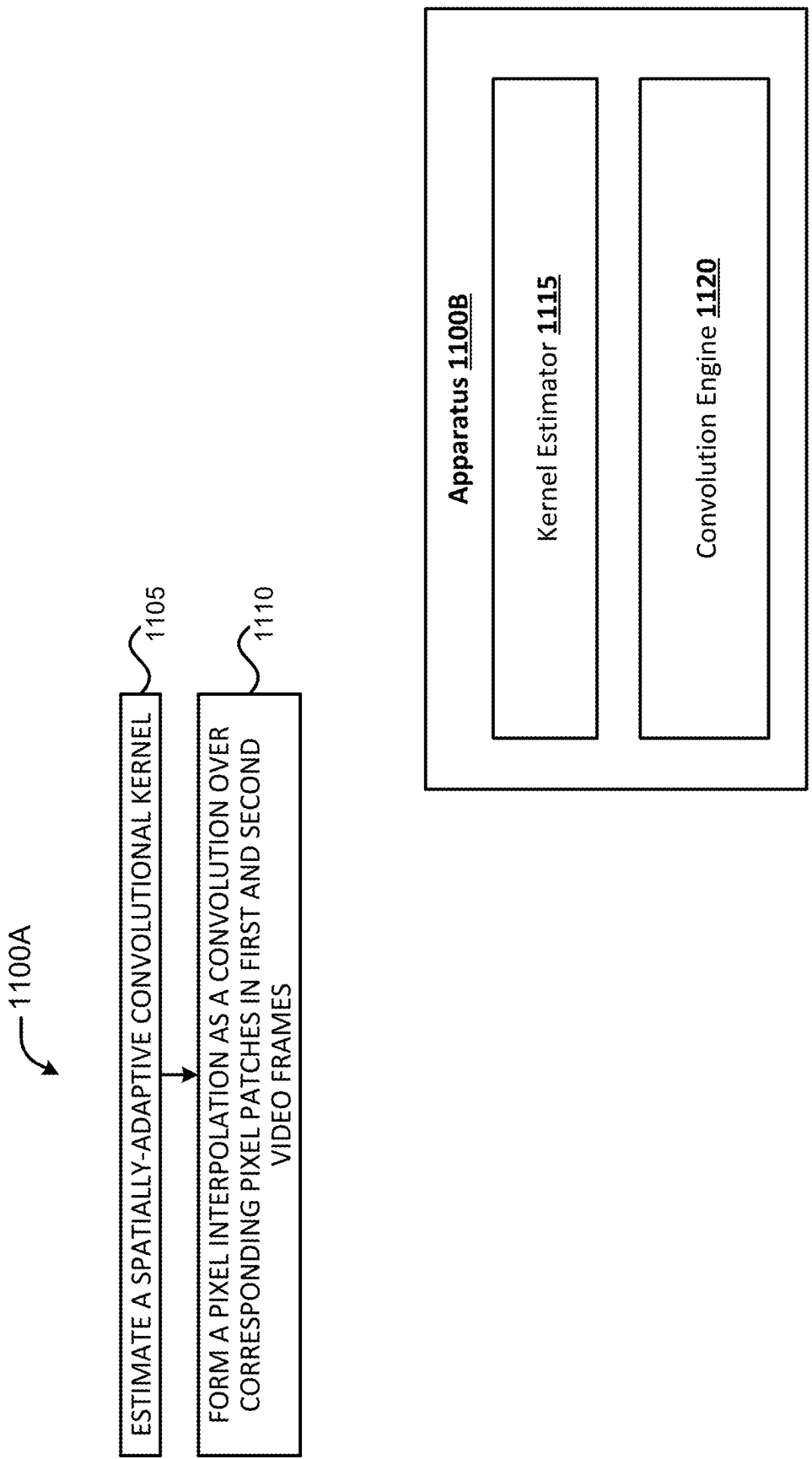
FIG. 11 shows and example process in accordance with various embodiments and an example apparatus for practicing various embodiments herein.

Embodiments may include combinations of any or all features, operations, etc., described herein. As one example, FIG. 11 illustrates a process 1100A for performing pixel interpolation according to various embodiments herein. Process 1100A may begin at operation 1105 where processor circuitry of a computer system may estimate a spatially-adaptive convolutional kernel. At operation 1110, the processor circuitry may form a pixel interpolation as a convolution over corresponding pixel patches in first and second video frames.

FIG. 11 illustrates an example apparatus 1100B that may be used to practice various embodiments herein, such as the process 1100A. In embodiments, apparatus 1100B may comprise a kernel estimator 1115 and a convolution engine 1120. In such embodiments, the kernel estimator 1115 may estimate a spatially-adaptive convolutional kernel, and the convolution engine 1120 may form a pixel interpolation as a local convolution over corresponding pixel patches in first and second video frames. In some embodiments, the convolution engine 1120 may be implemented as a or operate a convolution network (e.g., ConvNet 105 of FIG. 1, CNNA 1300 of FIG. 13 infra, or the like).

The kernel estimator 1115 and the convolution engine 1120 of apparatus 1100B may be implemented by computer hardware, software, firmware, middleware, microcode, hardware description languages, or any combination thereof. When implemented in software, firmware, middleware or microcode, the program code or code segments to perform the necessary tasks of the kernel estimator 1115 and the convolution engine 1120 may be stored in a machine or computer readable medium. In embodiments, a computer device may include and/or have access to the computer-readable media having instructions stored thereon, that, when executed, cause the computer device to perform some or all of the operations of the process 1100A. In other embodiments, a special-purpose processor may be configured to operate some or all of the operations of procedure process 1100A. In some embodiments, any number of general purpose processors may be transformed into a special purpose processor to perform any of operations of process 1100A responsive to accessing instructions stored in an electronic memory or computer-readable media.

I.4. Conclusion

Embodiments described herein include video frame interpolation that combines the two steps of frame interpolation, motion estimation and pixel interpolation, into a single step of local convolution with two input frames. The convolution kernel may capture both the motion information and re-sampling coefficients for proper pixel interpolation. A deep fully convolutional neural network may be able to estimate spatially-adaptive convolution kernels that allow for edge-aware pixel synthesis to produce sharp interpolation results. This neural network can be trained directly from widely available video data. Experiments may show that embodiments described herein may enable high-quality frame interpolation and may handle well challenging cases like occlusion, blur, and abrupt brightness change.

II. Video Frame Interpolation Via Adaptive Separable Convolution (SEPCONV)

Based on the observation that a goal of frame interpolation is to produce high-quality video frames and optical flow estimation is only an intermediate step, some recent methods may formulate frame interpolation or extrapolation as a convolution process. For example, they may estimate spatially-adaptive convolution kernels for output pixels and use the kernels to convolve input frames to generate a new frame. The convolution kernels may account for the two separated steps of motion estimation and re-sampling involved in the traditional frame interpolation methods. In order to handle large motion, large kernels may be required. For example, one embodiment may employ a deep convolutional neural network to output two 41×41 kernels for each output pixel (e.g., one kernel for each of the two input frames). To generate the kernels for all pixels in a 1080p video frame, the output kernels alone may require 26 GB of memory. The memory demand may increase quadratically with the kernel size (or the maximal motion magnitude to be handled). Given this limitation, embodiments may train a deep convolutional neural network to output the kernels pixel by pixel.

Embodiments described herein may include spatially-adaptive separable convolution for video frame interpolation. Embodiments may relate to using separable filters to approximate 2D full filters for other computer vision tasks, like image structure extraction. For frame synthesis, some embodiments may estimate a pair of 1D horizontal and vertical convolution kernel to approximate each of the two 2D convolution kernels required to generate an output pixel. In this way, a n×n convolution kernel can be encoded using only 2n variables. As a result, a fully convolutional neural network is able to take two original video frames as input and produce the separable kernels for all the pixels simultaneously. For a 1080p video frame, all the separable kernels together only require 1.27 GB of memory. Since embodiments may generate the full-frame output, perceptual loss functions may be incorporated to further improve the visual quality of the interpolation results, as shown in FIG. 12. FIG. 12 depicts an example process of pixel interpolation, in accordance with various embodiments. Portion (a) of FIG. 12 shows a ground truth frame, and portion (b) shows an example frame produced using 2D kernels. Compared to the recent convolution approach that directly estimates and uses 2D kernels in portion (b), the separable convolution (SepConv) mechanisms of the embodiments herein, as shown by portions (c) and (d) of FIG. 12, allow for full-frame interpolation and produce higher-quality results Embodiments may employ a deep neural network that may be fully convolutional and may be trained end to end using widely available video data without meta data like optical flow, which can be difficult to obtain. Experiments may show that such embodiments may compare favorably to representative state-of-the-art interpolation methods both qualitatively and quantitatively on representative challenging scenarios and may provide a practical solution to high-quality video frame interpolation.

II.1. Relevant Work

Video frame interpolation is a classic topic in computer vision and video processing. Standard frame interpolation approaches may estimate dense motion, typically optical flow, between two input frames and then may interpolate one or more intermediate frames guided by the dense motion. The performance of these operations often depends on optical flow and special care, such as flow interpolation, may be applied to handle problems with optical flow. Generic image-based rendering algorithms may also be used to improve frame synthesis results. Other embodiments may employ phase-based interpolation that represents motion in the phase shift of individual pixels and generates intermediate frames by per-pixel phase modification. These phase-based operations may produce impressive interpolation results, but sometimes may not preserve high-frequency details in videos with large temporal changes.

Embodiments described herein may relate to applying deep learning algorithms to optical flow estimation, style transfer, and image enhancement. Embodiments may employ deep neural networks for view synthesis. Some embodiments may render unseen views from input images for objects like faces and chairs, instead of complex real-world scenes. The DeepStereo method, for example, may generate a novel natural image by projecting input images onto multiple depth planes and combining colors at these depth planes to create the novel view. A view expansion operation for light field imaging may use two sequential convolutional neural networks to model disparity and color estimation operations of view interpolation, and these two networks may be trained simultaneously. A deep neural network may synthesize an extra view from a monocular video to convert it to a stereo video.

An appearance flow operation may employ a deep convolutional neural network to estimate flows and then may use them to warp input pixels to create a novel view. This operation can warp individual input frames and blend them together to produce a frame between the input ones. A deep voxel flow approach may develop a deep neural network to output dense voxel flows that may be optimized for frame interpolation. A deep convolutional neural network may interpolate a frame in between two input ones, but may generate the interpolated frame as an intermediary to estimate optical flow.

Embodiments described herein may relate to frame interpolation or extrapolation operations that may combine motion estimation and frame synthesis into a single convolution operation. These embodiments may estimate spatially-varying kernels for each output pixel and may convolve them with input frames to generate a new frame. Since these convolution operations may employ large kernels to handle large motion, they may not synthesize all the pixels for a high-resolution video at once, due to limitations in available memory. For example, some legacy embodiments may interpolate frames pixel by pixel. Although they may employ a shift-and-stitch strategy to generate multiple pixels each pass, the number of pixels that can be synthesized simultaneously is still limited. Other legacy embodiments may only generate a relatively small-size image. Embodiments described herein may extend beyond such legacy embodiments by estimating separable one-dimensional (1D) kernels to approximate two-dimensional (2D) kernels and thus may significantly reduce the amount of memory that may be needed or used. For example, embodiments herein may interpolate a 1080p frame in one pass. Moreover, some embodiments described herein may also support incorporation of perceptual loss function(s), which may need to be constrained on a continuous image region, and may improve the visual quality of interpolated frames.

II.2 Video Frame Interpolation

Some embodiments may relate to and/or include adaptive convolution for video frame interpolation, which is summarized below and is followed by a description of SepConv-based frame interpolation operations.

A goal may be to interpolate a frame $\hat{I}$ temporally in the between two input video frames $I_1$ and $I_2$. For each output pixel $\hat{I}(x, y)$, a convolution-based interpolation operation may estimate a pair of 2D convolution kernels $K_1(x, y)$ and $K_2(x, y)$ and may use them to convolve with $I_1$ and $I_2$ to compute the color of an output pixel according to equation 3.

$$\hat{I}(x,y)=K_1(x,y)*P_1(x,y)+K_2(x,y)*P_2(x,y) \tag{3}$$

In equation 3, $P_1(x, y)$ and $P_2(x, y)$ are patches that may be centered at $(x, y)$ in $I_1$ and $I_2$. The pixel-dependent kernels $K_1$ and $K_2$ may capture both motion and re-sampling information that may be used for interpolation. To capture large motion, large-size kernels may be required. Some legacy embodiments may use 41×41 kernels, and it may be difficult to estimate them at once for all the pixels of a high-resolution frame simultaneously, due to the large number of parameters and limited memory resources. Such legacy embodiments may thus estimate this pair of kernels pixel by pixel using a deep convolutional neural network.

Embodiments herein may estimate a pair of 1D kernels to approximate 2D kernels. For example, 1D kernels $<k_{1,v}, k_{1,h}>$ and $<k_{2,v}, k_{2,h}>$ may be estimated to approximate 2D kernels $K_1$ as $k_{1,v}*k_{1,h}$ and $K_2$ as $k_{2,v}*k_{2,h}$. Thus, embodiments herein may reduce the number of kernel parameters from $n^2$ to 2n, for each kernel. This may enable the synthesis of a high-resolution video frame in one pass, and also may enable the incorporation of perceptual loss to further improve the visual quality of the interpolation results, as described in the following subsections.

II.2.1. Separable Kernel Estimation

Figure 13:
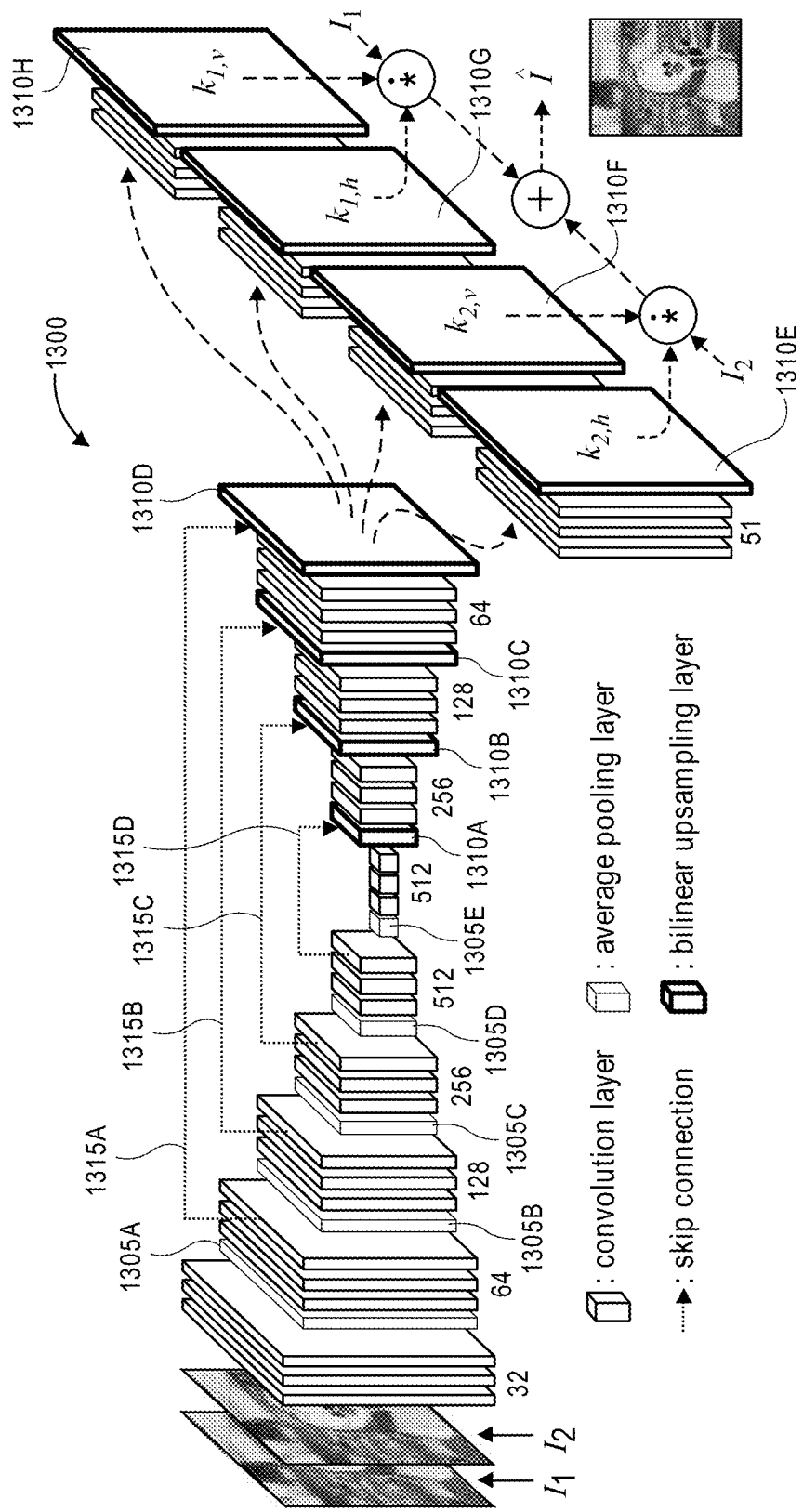
FIG. 13 depicts an example of a convolutional neural network architecture in accordance with various embodiments.

FIG. 13 depicts an example of a fully convolutional neural network architecture (CNNA) 1300 in accordance with various embodiments. In implementations, the CNNA 1300 may be or may be referred to as an "encoder-decoder network" 1300 or the like. In various embodiments, the CNNA 1300 may be implemented or operated by a convolution engine (e.g., convolution engine 1100B of FIG. 11B, convolution engine 2500 of FIG. 25, or the like). In embodiments, a computer device/system may include and/or have access to the computer-readable media having instructions stored thereon, that, when executed, cause the computer device to perform some or all of the operations of the CNNA 1300 of FIG. 13. In other embodiments, a special-purpose processor may be configured to operate some or all of the operations of CNNA 1300 of FIG. 13. In embodiments, any number of general purpose processors may be transformed into a special purpose processor to perform any of operations of CNNA 1300 of FIG. 13 responsive to accessing instructions stored in an electronic memory or computer-readable media.

The CNNA 1300 may comprise a plurality of convolutional layers, which are represented by the rectangular cuboids in FIG. 13; the convolutional layers are not labeled in FIG. 13 for clarity. The CNNA 1300 also comprises average pooling layers (APLs) 1305A-E (collectively referred to as "APLs 1305," "APL 1305," or the like), and bilinear upsampling layers (BULs) 1310A-H (collectively referred to as "BULs 1310," "BUL 1310," or the like).

The CNNA 1300 may, given input frames $I_1$ and $I_2$, estimate two pairs of one dimensional (1D) kernels <$k_{1,v}$, $k_{1,h}$> and <$k_{2,v}$, $k_{2,h}$> for each pixel in the interpolation (output) frame Î. Given the input frames $I_1$ and $I_2$, the CNNA 1300 may extract features that are given to four subnetworks that each estimate one of the four 1D kernels for each output pixel in a dense pixel-wise manner. The estimated pixel-dependent kernels are then convolved with the input frames to produce the interpolated frame I. In FIG. 13, the symbol, *, may denote a local convolution operation, and the "+" symbol may represent an addition or combination operation. In embodiments, each color channel may be treated equally, and the same 1D kernels may be applied to each of the Red-Green-Blue (RGB) channels to synthesize the output pixel. Note that applying the estimated kernels to input images may be a local convolution, which may be implemented as a network layer of a neural network, as may be similar to a position-varying convolution layer. Therefore the neural network of embodiments herein may be end-to-end trainable.

The CNNA 1300 may include a contracting component to extract features, and an expanding component to incorporate upsampling layers (e.g., BULs 1310) to perform a dense prediction. For example, the CNNA 1300 includes stacks or clusters of convolution layers that perform feature extraction, where some clusters are followed by an APL 1305. Each convolution layer may apply a specified or defined number of kernels to input data, which is then passed to a next convolution layer in turn. When data arrives at an APL 1305, that APL 1305 may downsample the image data extracted by the convolutional layers in a corresponding cluster. When data arrives at a BUL 1310, that BUL 1310 may reintroduce spatial information previously discarded by the average pooling layers. The skipconnections 1315A-D may be used to let the expanding layers incorporate features from the contracting component of the CNNA 1300. To estimate the four sets of 1D kernels, for example, the information flow in the last expansion layer may be directed into four sub-networks, wherein each sub-network may estimate one of the kernels. In alternative embodiments, a combined representation of the four kernels may be modeled jointly; however, using four sub-networks may provide a faster convergence during training.

In embodiments, stacks of 3×3 convolution layers with Rectified Linear Units (ReLUs) used as activation functions may be effective. The average pooling (e.g., APLs 1305) may perform well compared to some common pooling embodiments in the context of pixel-wise predictions, and average pooling (e.g., APLs 1305) may be used in some embodiments herein. Upsampling layers (e.g., BULs 1310) can likewise be implemented in various ways, which may include transposed convolution, sub-pixel convolution, nearest-neighbor, and bilinear interpolation (see e.g., FIG. 14). In some solutions, checker-board artifacts can occur for image generation tasks if upsampling layers are not well-selected. While embodiments herein may generate images by first estimating convolution kernels, such artifacts can still occur, as is shown in FIG. 14. In some embodiments, these artifacts may be handled and/or addressed by using bilinear interpolation to perform the upsampling in a network decoder.

II.2.1.1 Loss Function

Two types of loss functions that measure the difference between an interpolated frame and its corresponding ground truth $I_{gt}$ may be considered. The first one is $l_1$ loss based on per-pixel color difference, which may be defined by equation 4.

$$\mathcal{L}_1 = \|\hat{I} - I_{gt}\|_1 \tag{4}$$

Alternatively the $l_2$ norm can be used; however, such embodiments may lead to blurry results, as also reported in other image generation tasks.

The second type of loss functions that may be explored is perceptual loss, which has sometimes been found effective in producing visually pleasing images. Perceptual loss is usually based on high-level features of images and may be defined by equation 5.

$$\mathcal{L}_F = \|\emptyset(\hat{I}) - \emptyset(I_{gt})\|_2^2 \tag{5}$$

where Ø may extract features from an image. Various loss functions based on different feature extractors, such as the SSIM loss and feature reconstruction loss may be employed. Embodiments herein may employ the feature reconstruction loss based on the relu4_4 layer of the VGG-19 network, and may produce good results for frame interpolation.

II.2.2. Training

Neural network parameters may be initialized using convolution aware initialization, and may include training using AdaMax with $\beta_1 = 0.9$, $\beta_2 = 0.999$, a learning rate of 0.001 and a mini-batch size of 16 samples. A relatively small mini-batch size may be used. A degradation in the quality of the trained model may occur when using more samples per mini-batch. Furthermore, patches of size 128×128 may be used for training, instead of entire frames. This allows avoidance of patches that contain little or no useful information and may lead to more diverse mini-batches, which may improve training.

Training Dataset.

Training samples may be extracted from widely available videos, where each training sample may include three consecutive frames with the middle frame serving as the ground truth. Since the video quality may have an influence on the quality of the trained model, video material may be acquired from selected channels that consistently provide high-quality videos. Videos with a resolution of 1920×1080 may be used, but may be scaled to 1280×720 in order to reduce the influence of video compression. In embodiments, videos with the progressive scanning format may be used.

Some embodiments did not use the three-frame samples across a video shot boundary and discarded samples with a lack of texture. To increase the diversity of training datasets, samples that are temporally close to each other may be avoided. Instead of using full frames, 150×150 patches may be randomly cropped, and the patches with sufficiently large motion may be selected. To compute the motion between patches in each sample, the mean optical flow between the first and the last patch may be estimated. In some embodiments, such estimation may use SimpleFlow.

A dataset may be composed from the extracted samples by randomly selecting 250,000 of them (e.g., without replacement). The random selection may be guided by the estimated mean optical flow. In some embodiments, samples with a large flow magnitude may be more likely to be included. Overall, 10% of the pixels in the resulting dataset may have a flow magnitude of at least 17 pixels, and 5% of them may have a magnitude of at least 23 pixels. In some embodiments, the largest motion may be 39 pixels.

Data Augmentation.

Data augmentation may be performed on the fly during training. While each sample in the training dataset may be of size 150×150 pixels, patches of size 128×128 pixels may be used for training. This may allow data augmentation to be performed by random cropping, preventing the network from learning spatial priors that potentially exist in the training dataset. The training dataset may be further augmented by shifting the cropped windows in the first and last frames while leaving the cropped window of the ground truth unchanged. By doing this systematically, and shifting the cropped windows of the first and last frames in opposite directions, the ground truth may still be sound. This may help to increase the flow magnitudes of the training dataset. Some embodiments may employ shifts of up to 6 pixels, which may augment the flow magnitude by approximately 8.5 pixels. In other embodiments, the cropped patches may be randomly flipped horizontally or vertically, and their temporal order may be randomly swapped. This may make the motion within the training dataset symmetric and may prevent bias on motion direction.

II.2.3. Example Implementations

Implementation aspects with respect to speed, boundary handling, and hyper-parameter selection may be described.

Computational Efficiency.

Torch may be used to implement a deep convolutional neural network, according to some embodiments. In an embodiment to achieve a high computational efficiency, a layer may be written in CUDA, for example, to apply the estimated 1D kernels, which may allow the network to directly render the interpolated frame at once. For other layers, implementations may be based on cuDNN to further improve the speed. With an Nvidia Titan X GPU, for example, a system may be able to interpolate a 1280×720 frame in 0.5 seconds, as well as a 1920×1080 frame in 0.9 seconds. In embodiments, it may take about 20 hours to train a neural network using four Nvidia Titan X GPUs.

Boundary Handling.

Some embodiments of formulating frame interpolation as local convolution may pad the input to process boundary pixels. Embodiments may employ zero padding, reflective padding, and/or padding by repetition. Embodiments that employ padding by repetition may be used in some embodiments herein.

Hyper-Parameter Selection.

A validation dataset may be used in order to select reasonable hyper-parameters for a network, as well as for the training. This validation dataset may be disjoint from the training dataset, but may be created in a similar manner.

Besides common parameters, such as the number of layers, the weights of the loss functions, or the learning rate, embodiments herein may include a domain-specific hyper-parameter, which may include and/or indicate the size of the 1D kernels to be estimated. In some embodiments, kernels of size 51 pixels work well, which may relate to a largest flow magnitude in the training dataset of 39 pixels, and about 8.5-pixel extra motion from augmentation. While it may be desirable to increase the kernel size in order to handle even larger motion, in some embodiments, restricted by flow magnitudes in some training datasets, larger kernels may not provide improvements.

The number of pooling layers may also be a hyper-parameter for some embodiments. Pooling layers may influence the receptive field of a convolutional neural network, which may be related to an aperture problem in motion estimation. A larger number of pooling layers may increase the receptive field to potentially handle large motion. On the other hand, the largest flow magnitude in the training dataset may provide an upper bound for the number of useful pooling layers. In some embodiments, using five pooling layers may produce good interpolation results.

I.I.3. Experiments

Embodiments described herein may be compared with representative legacy embodiments, and they may be evaluated both qualitatively and quantitatively. For optical flow-based operations, legacy embodiments selected for comparison may be MDP-Flow2, which currently achieves the lowest interpolation error on the Middlebury benchmark, and DeepFlow2, which is a neural network based approach with a lowest interpolation error. Comparisons may use the interpolation algorithm used in the Middlebury benchmark to synthesize frames from an estimated optical flow. Embodiments herein may also be compared with some legacy phase-based frame interpolation method as well as a method based on adaptive convolution (AdaConv), which may represent alternatives to optical flow based methods. For all these comparisons, the code or trained models from the original legacy embodiments may be used.

II.3.1. Loss Functions

Figure 15:
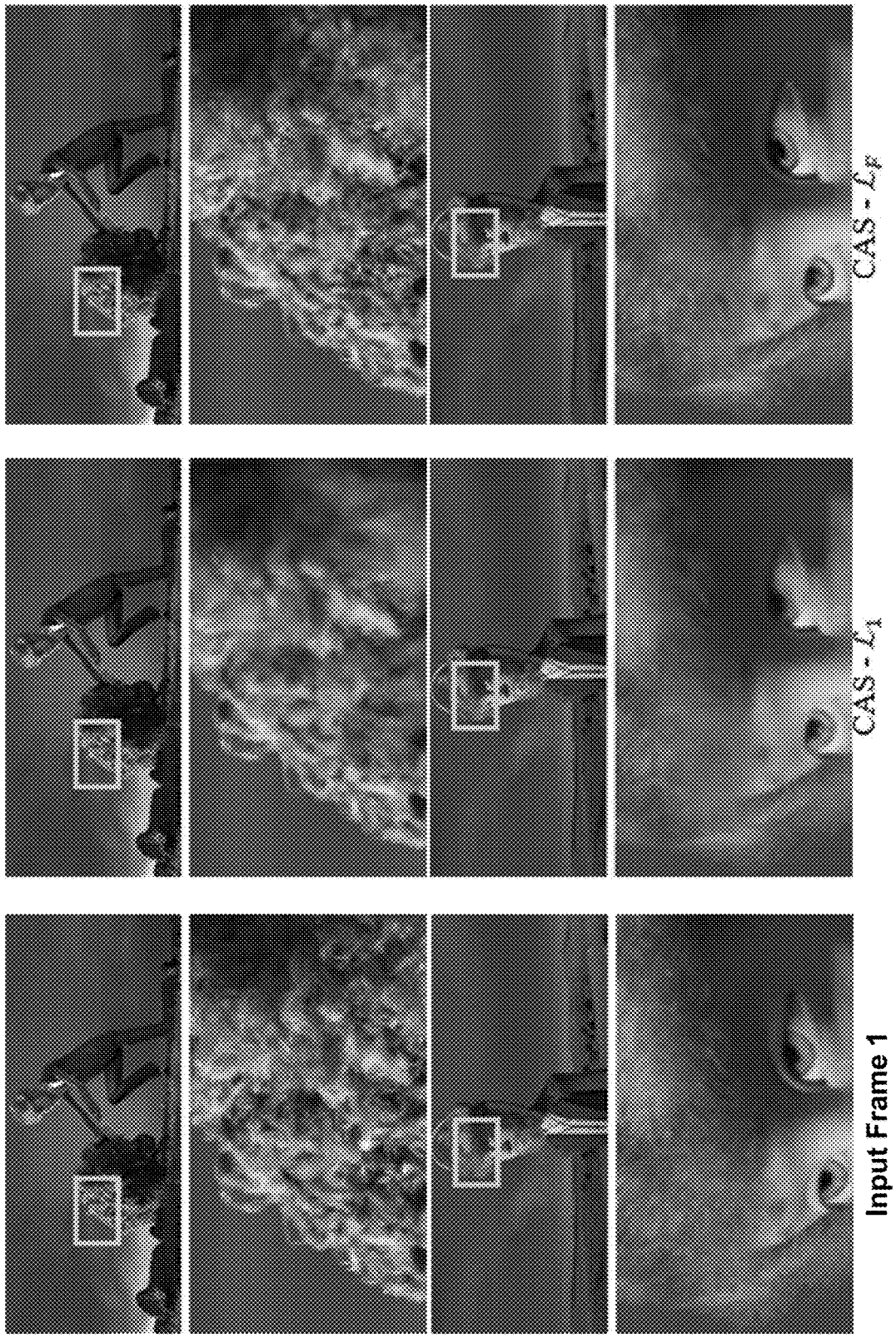
FIG. 15 depicts example images showing the effect of loss functions according to various embodiments.

Embodiments herein may incorporate two types of loss functions: $\mathcal{L}_1$ loss and feature reconstruction loss $\mathcal{L}_F$. To examine their effect, two versions of the neural network may be trained. For the first one, only $\mathcal{L}_1$ loss may be used and it may be referred to as "$\mathcal{L}_1$" for simplicity. For the second one, both $\mathcal{L}_1$ loss and $\mathcal{L}_F$ loss may be used and it may be referred to as "$\mathcal{L}_F$" for simplicity. Several different training schemes may be employed, including using linear combinations of $\mathcal{L}_1$ and $\mathcal{L}_F$ with different weights, and first training the network with $\mathcal{L}_1$ loss and then fine tuning it using $\mathcal{L}_F$ loss. The latter leads to a better visual quality and therefore may be used in comparisons. Use of $\mathcal{L}_F$ loss alone was found to be insufficient, in some embodiments. As shown by FIG. 15, incorporating $\mathcal{L}_F$ loss leads to sharper images with more high frequency details. This is in line with the findings in recent work on image generation and super resolution.

II.3.2. Visual Comparison

Figure 16A:
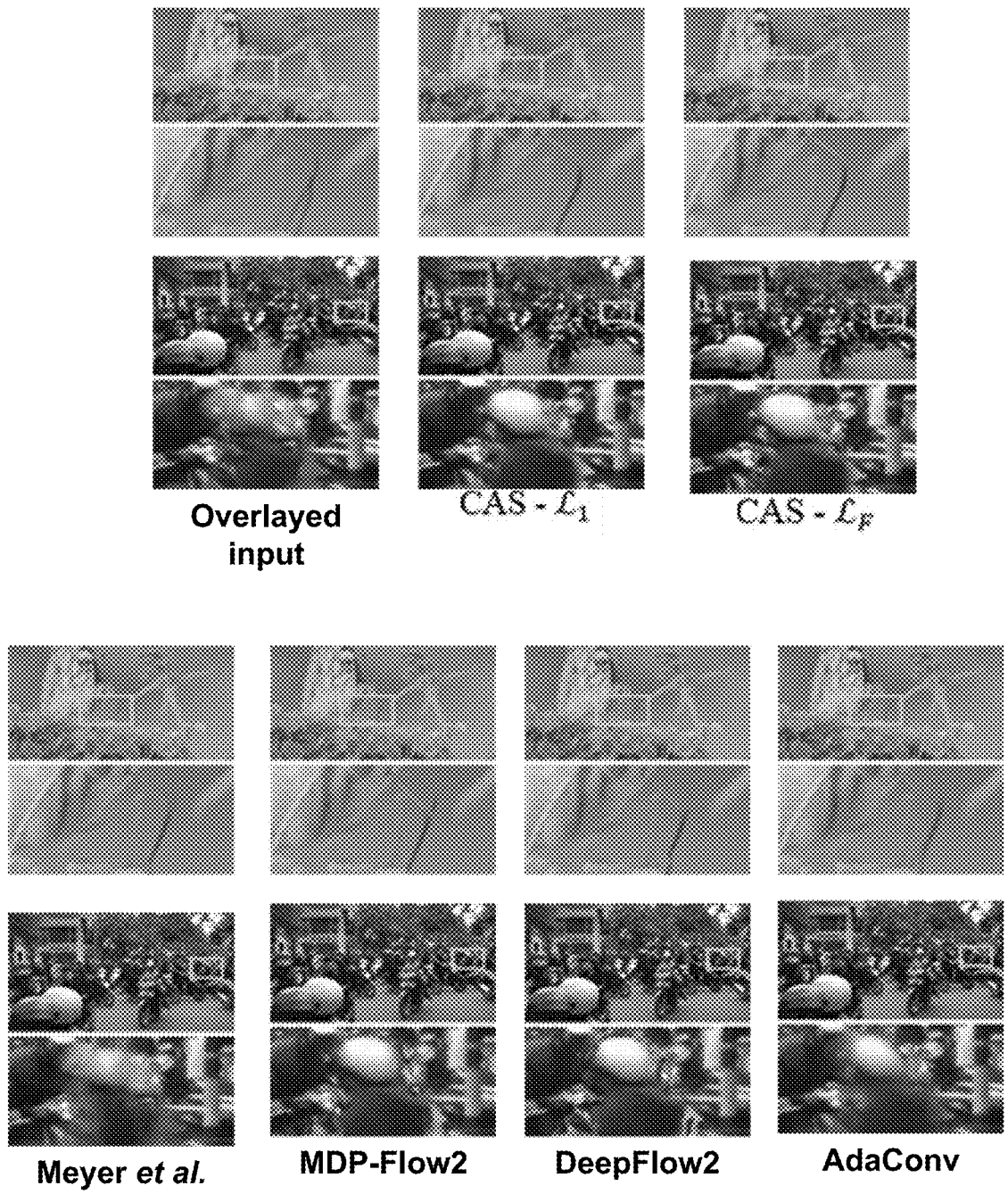

SepConv embodiments as described herein are examined with regard to challenging cases of video frame interpolation. FIG. 16A shows an example where the delicate butterfly leg makes it difficult to estimate optical flow accurately, causing artifacts in the flow-based results. Since the leg motion is also large, the phase-based approach cannot handle it well either and results in ghosting artifacts. The result from AdaConv also appear blurry. Both results of embodiments herein are sharp and free from ghosting artifacts.

FIG. 16B shows an example of a busy street. As people are moving across each other, there is significant occlusion. Both examples of embodiments herein handle occlusion better than the others. This may relate to the convolution approach and the use of 1D kernels with fewer parameters than 2D kernels.

In the third row, an example is shown in which a fire-fighter turns on a flashlight. This violates the brightness constancy assumption of optical flow methods, which can lead to visible artifacts in corresponding frame interpolation results. The last row shows an example with shallow depth of field, which is common in professional videos. The blurry background may also make flow estimation difficult and may thus compromise the frame interpolation results from the flow-based methods. For these examples, the other methods, and embodiments described herein, work well.

Kernels.

Figure 17:
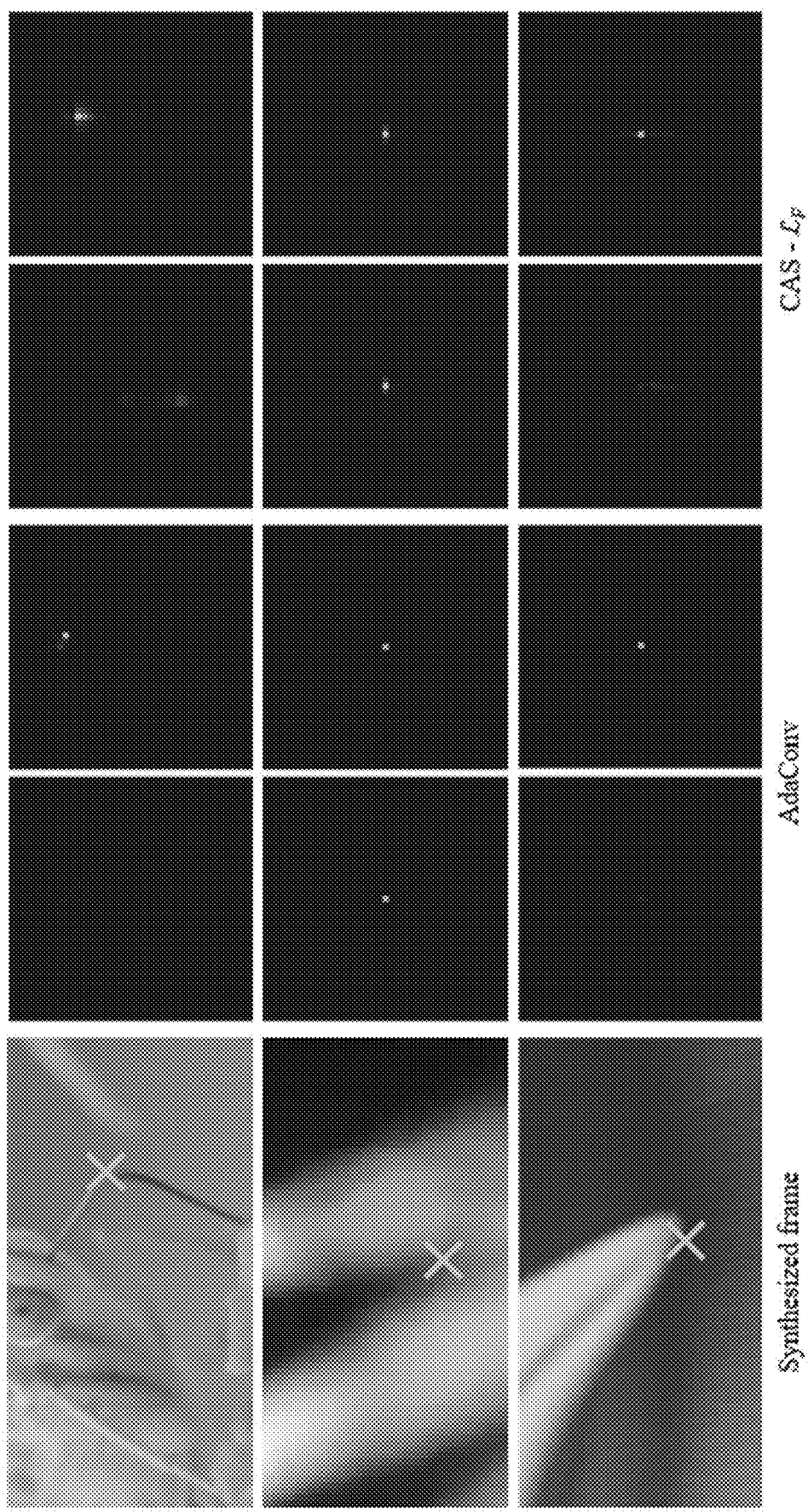
FIGS. 17 and 18 depict a comparison of the estimated kernels according to various embodiments.
Figure 18:
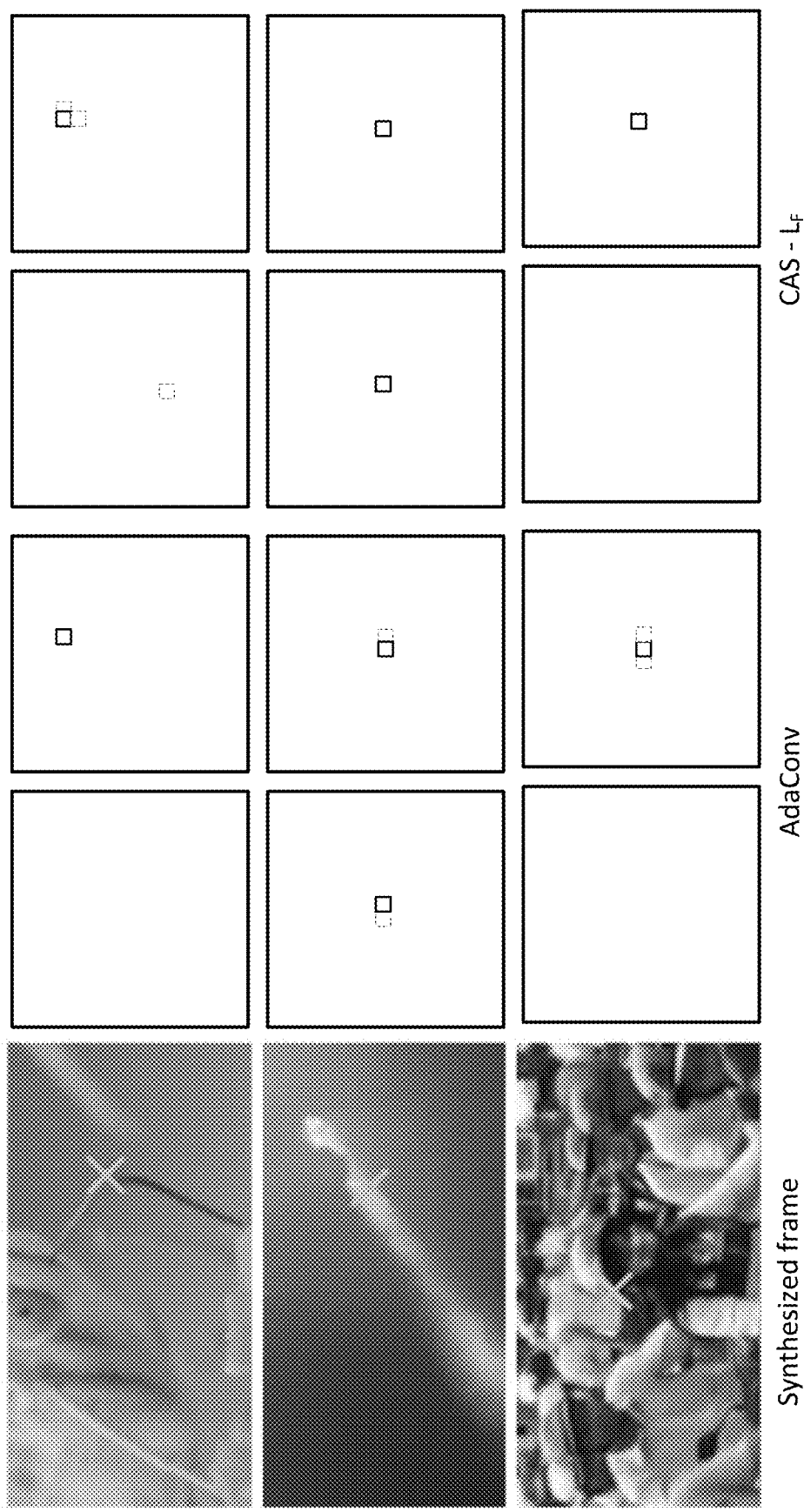

Kernels estimated by $\mathcal{L}_F$ embodiments described herein may be compared to those from AdaConv. Some representative kernels are shown by FIG. 17, and enlarged representations of the kernels of FIG. 17 are shown in FIG. 18. Note that each pair of 1D kernels from embodiments herein may be convolved to produce its equivalent 2D kernel for comparison. As kernels of embodiments herein are larger than those from AdaConv, the boundary values may be cropped off for better visualization, as they are all zeros. In the butterfly example, the kernels for a pixel on the leg are shown. AdaConv only takes color from the corresponding pixel in the second input frame. While embodiments herein may take color mainly from the same pixel in the second input frame, as AdaConv does, embodiments herein may also take color from the corresponding pixel from the first input frame. Since the color of that pixel remains the same in the two input frames, both methods produce proper results. Moreover, both methods may capture that pixel's motion, which may be revealed as the offset between the non-zero kernel values to the kernel center.

The second example in FIG. 17 shows kernels for a pixel in the flashlight area where the brightness changes quickly across two input frames. Both methods output the same kernels that only have non-zero values in the center, as there is no motion. These kernels may indicate that the output color is estimated as the average color of the corresponding pixels in the input frames. The last example shows a pixel in an occluded area. Both methods produce kernels that may correctly choose to only sample one input frame instead of blending two frames and thus may produce good interpolation results.

II.3.3. Quantitative Evaluation

Embodiments described herein may be quantitatively evaluated on the Middlebury optical flow benchmark, which provides a training set with ground truth and a testing set with no public ground truth. For methods that do not have results on the testing set, comparison is made on the training set only. Other methods may be compared on the both the testing set and the training set. the Middlebury training or testing examples were not used to train embodiments described herein.

Figure 19:
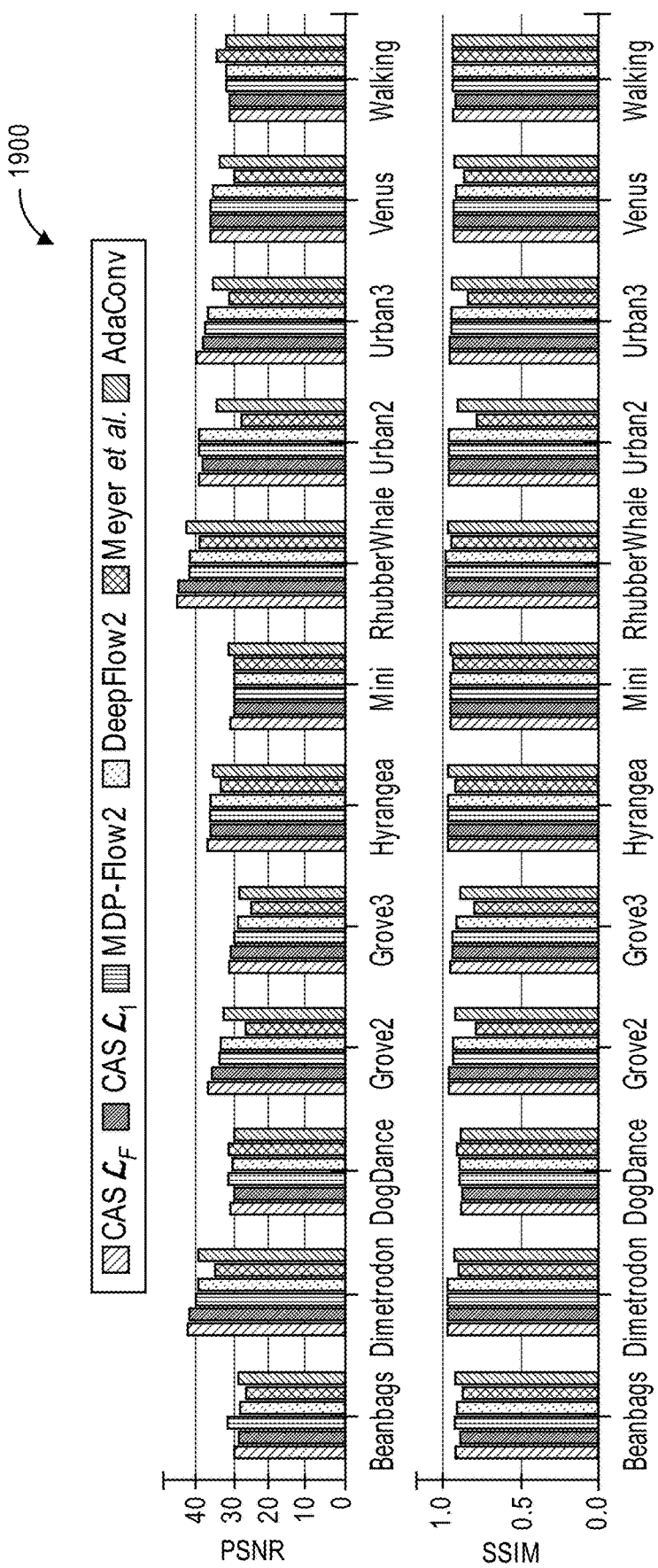
FIG. 19 shows an evaluation of the Middlebury optical flow training set.

FIG. 19 depicts graph 1900, which shows the evaluation on the Middlebury training set. First, $\mathcal{L}$ network and $\mathcal{L}_F$ network of embodiments described herein compare well with the other methods in terms of both PSNR and SSIM. Second, $\mathcal{L}_1$ network of the embodiments described herein produces slightly better PSNR results than $\mathcal{L}_F$ of the embodiments described herein. This may relate to $\mathcal{L}_1$ being closely related to PSNR, in some embodiments, although, as shown in FIG. 4 for example, $\mathcal{L}_F$ of embodiments described herein may often lead to visually more pleasing results.

FIG. 19T shows Table 1900T reports the results on the Middlebury testing set. Embodiments described herein ("ours") perform best in the discontinuous/occlusion regions (disc. column) on all the examples, except Basketball, on which "our" method is the second. Overall, "our" method performs best on Mequon, Dumptruck, and Evergreen, 2nd best on Basketball, and 3rd on Backyard not only among the methods report by table 1900T, but also among all the over 100 methods reported in the Middlebury benchmark.

II.3.4. User Study

FIG. 20 depicts a graph 2000, which shows the results of a user study. The user study was conducted to further compare the visual quality of frame interpolation results between $\mathcal{L}_F$ and $\mathcal{L}_1$ embodiments described herein and the other four methods. Fifteen participants were recruited, who were graduate or under-graduate students in Computer Science and Statistics. This study used all the eight examples of the Middlebury testing set. On each example, $\mathcal{L}_F$ embodiments were compared to the other five results, one by one. In this way, each participant compared forty pairs of results. A web-based system was developed for the study. In each trial, the website only shows one result and allows participants to switch between two results, back and forth, using the left and right arrow keys on the keyboard so they can easily examine the difference between the results. The participants needed to select which result is better for each trial. The temporal order in which the pairs appear was randomized, while the order in which the two results in each pair appear was also randomly swapped.

For each hypothesis that users prefer the frames interpolated by $\mathcal{L}_F$ embodiments over those produced by one of the baselines, a p-value <0.01 is obtained and can thus confirm them. Note that the participants preferred the $\mathcal{L}_1$ result over the $\mathcal{L}_F$ result on the "Basketball" example, shown by FIG. 21. This may relate to the introduced discontinuity in the basketball.

II.3.5. Comparison with AdaConv

Figure 22:
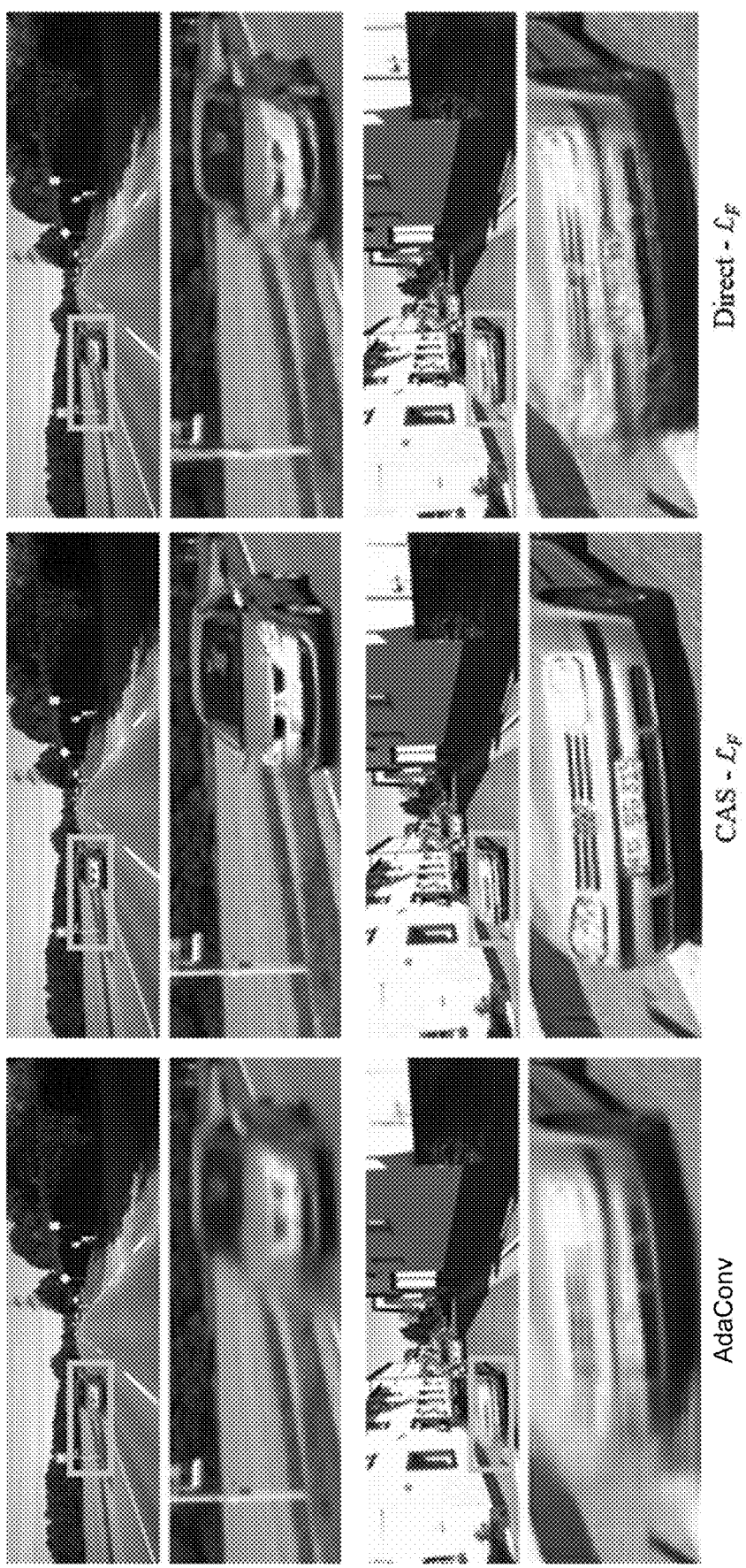
FIG. 22 shows example images produced using embodiments herein compared with images produced using adaptive convolution (AdaConv) and direct synthesis.

The SepConv embodiments described herein differ from AdaConv by, among other things, estimating 1D kernels instead of 2D kernels and developing a dedicated encoder-decoder neural network (e.g., CNNA 1300 of FIG. 13) that may estimate the kernels for all the pixels in a frame simultaneously. Compared to AdaConv, embodiments described herein may have several advantages. First, SepConv may be over 20 times faster than AdaConv when interpolating a 1080p video. Second, as shown in the previous quantitative comparisons (FIG. 19 and Table 1900T of FIG. 19T), SepConv may produce numerically better results. Third, embodiments described herein, such as $\mathcal{L}_F$, for example, may generate visually more appealing results than AdaConv as shown by FIGS. 16 and 23, for example. Such advantages may relate to the SepConv embodiments discussed herein. First, SepConv allows the full frame to be synthesized simultaneously and to incorporate perceptual loss that may be effective in producing visually pleasing results. Second, 1D kernels require significantly fewer parameters, which enforces a useful constraint to obtain relatively good kernels. Third, SepConv is able to use a larger kernel than AdaConv and thus can handle larger motion. As shown by FIG. 22, AdaConv cannot capture the large motion of the cars and may generate blurry results.

II.3.6. Discussion

Interpolation via SepConv may be compared to directly interpolating frames using a deep neural network. Comparison may be made to a baseline by modifying a network according to embodiments described herein. For example, one sub-network may be used after the encoder-decoder and it may be used to directly estimate the interpolated frame. Also, Batch Normalization layers may be added after each block of convolution layers, which may improve the quality of this direct synthesis network. This model may be trained in the same way as the $\mathcal{L}_F$ embodiment may be trained. As shown in FIG. 10, this approach may lead to blurry results. Comparisons also may be made with another direct interpolation method that uses interpolation as an intermediate step for optical flow estimation. As shown in FIG. 11, results of the SepConv embodiments are sharper than existing interpolation techniques. This is consistent with the findings in some legacy solutions, which indicate that synthesizing images from scratch is difficult and they instead synthesize novel views via appearance flow.

The amount of motion that SepConv can handle is limited by the kernel size, which may be 51 pixels, in some embodiments. While this is larger than the AdaConv embodiments, SepConv may further employ a multi-scale approach (e.g., similar to optical flow) to handle even larger motion.

The various SepConv embodiments described herein may interpolate a frame in the middle of the two input frames. Some embodiments may not produce a frame in an arbitrary time between the input ones. To address this, other embodiments may recursively continue synthesizing frames at t=0.25 and t=0.75, or a new model may be trained from scratch that returns frames at a different temporal offset. These may not be as flexible as optical flow base interpolation. In still other embodiments, the neural network may explicitly model the temporal offset for interpolation as a control variable.

II.4 Example Embodiments

Figure 24:
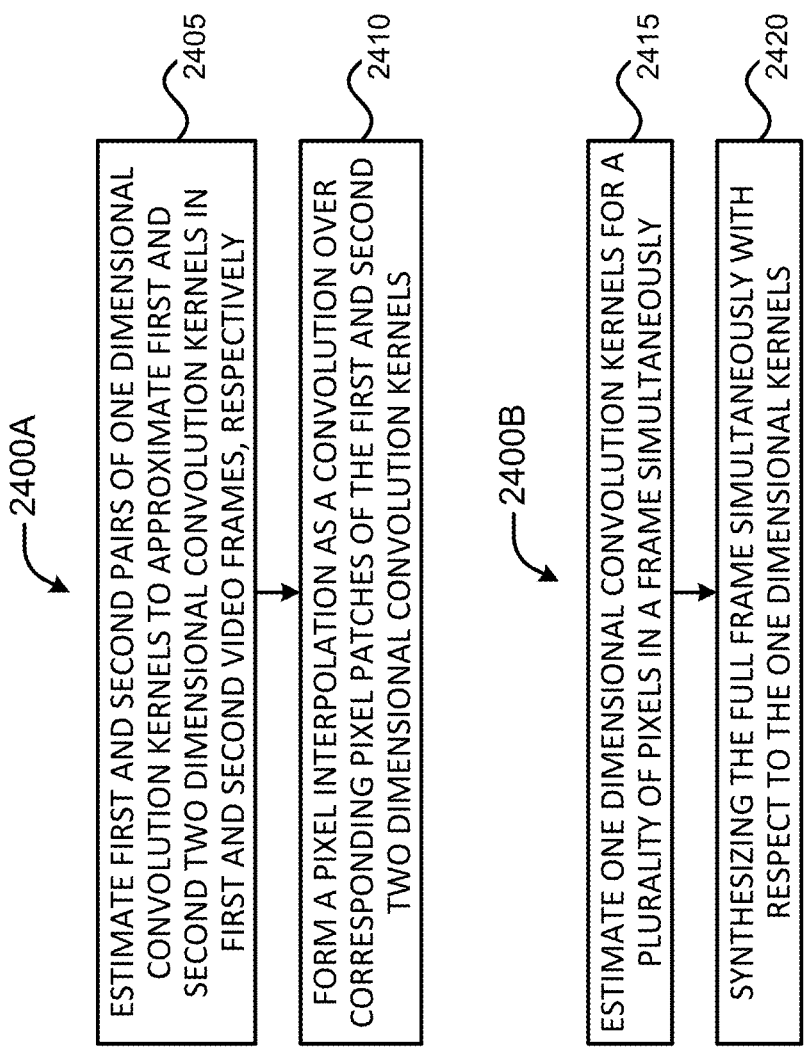
FIG. 24 depicts various example procedures for frame interpolation according to various embodiments herein.

The various SepConv embodiments described herein may provide high-quality video frame interpolation. Embodiments may include combinations of any or all features, operations, etc., described herein. As one example, FIG. 24 illustrates a process 2400A for frame interpolation according to various embodiments. Process 2400A may begin at operation 2405 where processor circuitry of a computer system may estimate first and second pairs of one dimensional (1D) convolution kernels to approximate first and second two dimensional (2D) convolution kernels in first and second video frames, respectively. At operation 2410, the processor circuitry may form a pixel interpolation as a convolution over corresponding pixel patches.

FIG. 24 also illustrates a process 2400B for frame interpolation according various other embodiments. Process 2400A may begin at operation 2415 where processor circuitry of a computer system may estimate 1D convolution kernels for a plurality of pixels in a frame simultaneously. At operation 2420, the processor circuitry may synthesize the full frame simultaneously with respect to the 1D convolution kernels.

In embodiments, a computer device may include and/or have access to one or more computer-readable media having instructions stored thereon, that, when executed, cause the computer device to perform some or all of the operations of the processes 2400A or 2400B. In other embodiments, a special-purpose processor may be configured to operate some or all of the operations of processes 2400A or 2400B. In embodiments, any number of general purpose processors may be transformed into a special purpose processor to perform any of operations of processes 2400A or 2400B responsive to accessing instructions stored in an electronic memory or computer-readable media.

Figure 25:
FIG. 25 depicts an example apparatus for practicing various embodiments discussed herein.

FIG. 25 illustrates an example apparatus 2500 that may be used to practice various embodiments herein, such as the processes 2400A and 2400B of FIG. 24. In embodiments, apparatus 2500 may comprise a kernel estimator 2515 and a convolution engine 2520. In some embodiments, the convolution engine 2520 may be implemented or operate a convolution network (e.g., ConvNet 105 of FIG. 1, CNNA 1300 of FIG. 13 infra, or the like).

In embodiments, the kernel estimator 2515 may simultaneously estimate first and second pairs of 1D convolution kernels to approximate first and second 2D convolution kernels in first and second video frames, respectively. In these embodiments, the convolution engine 2520 may form a pixel interpolation as a local convolution over corresponding pixel patches of the first and second 2D convolution kernels. In other embodiments, the kernel estimator 2515 may estimate a plurality of 1D convolution kernels for each of plural pixels in a frame simultaneously. In these embodiments, the convolution engine 2520 may synthesize the full frame simultaneously with respect to the 1D convolution kernels for the plural pixels in the frame.

II.5. Conclusion

The various SepConv embodiments described herein may provide high-quality video frame interpolation. Some embodiments may combine motion estimation and frame synthesis into a single convolution process by estimating spatially-adaptive separable kernels for each output pixel and convolving input frames with them to render the intermediate frame. Embodiments may use pairs of 1D kernels to approximate full 2D ones. The use of 1D kernels may significantly reduce the number of kernel parameters and may allow for full-frame synthesis, which in turn may support the use of perceptual loss to further improve the visual quality of interpolation results. Experiments may show that embodiments described herein compare favorably to legacy interpolation results, both quantitatively and qualitatively, and may produce high-quality frame interpolation results.

III. Example Systems and Platforms

Figure 26:
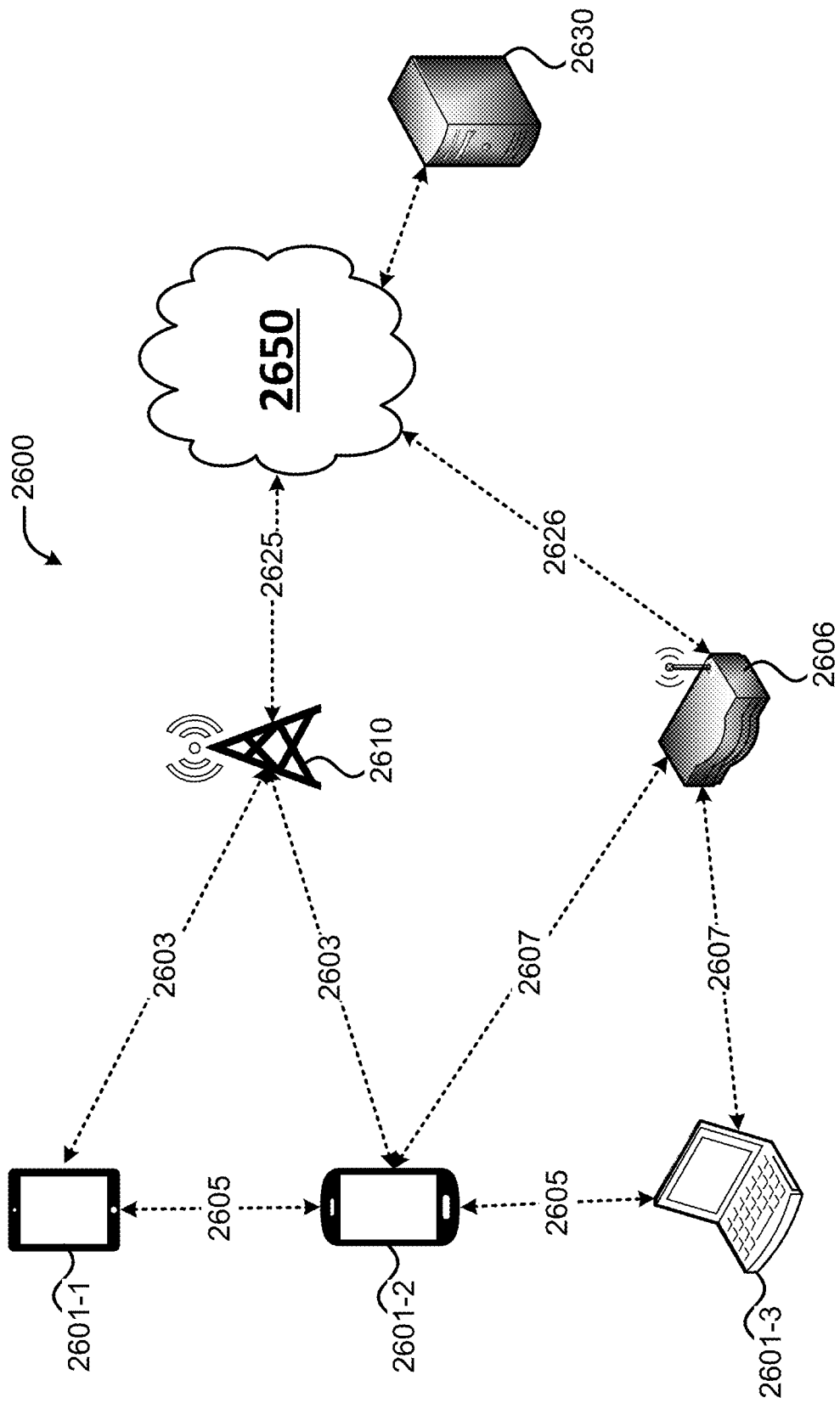
FIG. 26 depicts an example system in accordance with various embodiments.

FIG. 26 illustrates a system 2600 in which various embodiments may be practiced. System 2600 includes computer systems 2601-1, 2601-2, and 2601-3 (collectively referred to as "computer system 2601" or "computer systems 2601"), an access node (AN) 2610, an access point (AP) 2606, network 2650, and an application server 2630.

The system 2600 is shown to include a computer systems 2601, which may include one or more processors (having one or more processor cores and optionally, one or more hardware accelerators, or the like), memory devices, communication devices, etc. that may be configured to carry out various functions according to the various embodiments discussed herein. As used herein, the term "computer device" may describe any physical hardware device capable of sequentially and automatically carrying out a sequence of arithmetic or logical operations, equipped to record/store data on a machine readable medium, and transmit and receive data from one or more other devices in a communications network. A computer device may be considered synonymous to, and may hereafter be occasionally referred to, as a computer, computing platform, computing device, etc. The term "computer system" may include any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources. Examples of "computer devices", "computer systems", etc. may include cellular phones or smart phones, feature phones, tablet personal computers, wearable computing devices, an autonomous sensors, laptop computers, desktop personal computers, video game consoles, digital media players, handheld messaging devices, personal data assistants, an electronic book readers, augmented reality devices, server computer devices (e.g., stand-alone, rack-mounted, blade, etc.), cloud computing services/systems, network elements, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or any other like electronic devices. Moreover, the term "vehicle-embedded computer device" may refer to any computer device and/or computer system physically mounted on, built in, or otherwise embedded in a vehicle. In this example, the computer systems 2601-1 and 2601-2 are illustrated as a tablet computer and a smartphone, respectively (e.g., handheld touchscreen mobile computing devices connectable to one or more cellular networks), and computer system 2601-3 is illustrated as a laptop computer. However, the computer systems 2601 may also comprise any mobile or non-mobile computing device.

The computer systems 2601 may obtain and/or process data from various sources, and the processed data may be displayed by respective display devices employed by each computer system 2601 according to the various embodiments discussed herein. The computer systems 2601 may obtain data (e.g., data packets and/or data streams) from the application server 2630 via the network 2650, AN 2610, and AP 2606, from network 2650 and/or network infrastructure (e.g., core network elements of a cellular communications network, servers of a cloud computing service, etc.), navigation signaling/data from on-board navigations systems (e.g., global navigation satellite system (GNSS), global positioning system (GPS), etc.), and/or the like. In embodiments, the VECD may also include, or operate in conjunction with communications circuitry, and/or input/output (I/O) interface circuitry in order to obtain the data from various sources.

In embodiments, the communications circuitry of the computer systems 2601 may enable the computer systems 2601 to directly exchange data via links 2605. Links 2605 may be a short range radio link for direct intra-mobile device communications, which may operate in accordance with a suitable wireless communication protocol, such as Zigbee®, Bluetooth® or Bluetooth Low Energy (BLE), IEEE 802.15.4 (6LoWPAN), WiFi-direct, ANT or ANT+; 3GPP device-to-device (D2D) or Proximity Services (ProSe); Z-Wave (also known as "Zig-Wave"); Linear; SigFox; etc.

The UEs 2601-2 and 2601-3 are shown to be configured to access AP 2606 via respective connections 2607. The connections 2607 can comprise a local wireless connection, such as a connection consistent with any IEEE 802.11 protocol, wherein the AP 106 would comprise a wireless fidelity (WiFi®) router. The AP 106 may be connected to the network 2650 via connection 2626 without connecting to a core network of the wireless system. In some embodiments, the AP 2606 may be a gateway (GW) device that may include one or more processors, communications systems (e.g., including network interface controllers, one or more transmitters/receivers connected to one or more antennas, and the like), and computer-readable media. In such embodiments, the AP 2606 may be a wireless access point (WAP), a home/business server (with or without radio frequency (RF) communications circuitry), a router, a switch, a hub, a radio beacon, and/or any other like network device/element.

The AN 2610 may terminate an air interface of the links 2603. The AN 2610 may be network infrastructure or network equipment that provides the radio baseband functions for data and/or voice connectivity between a network and one or more users (e.g., computer systems 2601). For example, the computer systems 2601-1 and 2601-2 may be configured to communicate with the AN 2610 according to LTE, NR, or some other suitable cellular communications protocol. The AN 2610 may be a base station associated with a cellular network (e.g., an evolved NodeB (eNB) in an LTE network, a next generation NodeB (gNB) in a new radio access technology (NR) or fifth generation (5G) network, a WiMAX base station, etc.), a Road Side Unit (RSU), a remote radio head, a relay radio device, a smallcell base station (e.g., a femtocell, picocell, Home eNB (HeNB), and the like), or other like network element, and may provide a macrocell, or a femtocell or picocell (e.g., cells having smaller coverage areas, smaller user capacity, or higher bandwidth compared to macrocells). Although the term "access node" or "AN" may be used to refer to base stations, the terms "access node" or "AN" may be used interchangeably with the terms "access point" or "AP."

The AN 2610 may each include transmitter(s)/receiver(s) (or alternatively, transceiver(s)) connected to one or more antennas elements, one or more memory devices, one or more processors, one or more network interface controllers, and/or other like components. The transmitters/receivers may be configured to transmit/receive data signals to/from one or more computer systems 2601 via a link (e.g., links 2603). Furthermore, the network interface controllers may be configured to transmit/receive data to/from various network elements (e.g., one or more servers within a core network, network 2650, etc.) over another backhaul connection (e.g., link 2625).

In embodiments, each computer system 2601 may generate and transmit data to the AN 2610 over respective links 2603, and the AN 2610 may provide the data to the network 2650 over backhaul link 2625. Additionally, during operation of the computer systems 2601, the AN 2610 may obtain data intended for the computer systems 2601 from the network 2650 over link 2625, and may provide that data to the computer systems 2601 over respective links 2603.

The application server(s) 2630 may be one or more hardware computing devices that may include one or more systems and/or applications for providing one or more services to users (e.g., computer systems 2601) over a network (e.g., network 2650). The application server(s) 2630 may include one or more processors, one or more memory devices, one or more network interfaces, etc. Additionally, application server(s) 2630 may be a single physical hardware device, or may be physically or logically connected with other network devices, and may be connected to, or otherwise associated with one or more data storage devices (not shown). The server(s) 145 may include an operating system (OS) that may provide executable program instructions for the general administration and operation of servers, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art.

In embodiments, the network 2650 may comprise computers, network connections among the computers, and software routines to enable communication between the computers over network connections. In this regard, the network 2650 may each comprise one or more network elements that may include one or more processors, communications systems (e.g., including network interface controllers, one or more transmitters/receivers connected to one or more antennas, etc.), and computer readable media. Examples of such network elements may include wireless access points (WAPs), a home/business server (with or without radio frequency (RF) communications circuitry), a router, a switch, a hub, a radio beacon, base stations, picocell or small cell base stations, and/or any other like network device. Connection to the network 2650 may be via a wired or a wireless connection using the various communication protocols discussed infra. As used herein, a wired or wireless communication protocol may refer to a set of standardized rules or instructions implemented by a communication device/system to communicate with other devices, including instructions for packetizing/depacketizing data, modulating/demodulating signals, implementation of protocols stacks, and the like. More than one network may be involved in a communication session between the illustrated devices. Connection to the network 2650 may require that the computers execute software routines which enable, for example, the seven layers of the OSI model of computer networking or equivalent in a wireless (cellular) phone network Network 2650 may be used to enable relatively long-range communication. In such embodiments, network 2650 may represent the Internet, Transfer Control Protocol (TCP)/Internet Protocol (IP)-based network, one or more cellular networks, a local area network (LAN) or a wide area network (WAN), proprietary and/or enterprise networks, one or more cloud computing services, or combinations thereof. In such embodiments, the network 2650 may be associated with network operator who owns or controls equipment and other elements necessary to provide network-related services, such as one or more APs 2606 or ANs 2610, one or more servers for routing digital data or telephone calls (for example, a core network or backbone network), etc. Implementations, components, and protocols used to communicate via such services may be those known in the art and are omitted herein for the sake of brevity. In some embodiments, network 2650 may be used to enable relatively short-range communication, and may represent a short-range network, such as person-to-person (P2P) or personal area network (PAN) (e.g., IEEE 802.15.4 based protocols including Zig-Bee, IPv6 over Low power Wireless Personal Area Networks (6LoWPAN), WirelessHART, MiWi, Thread, etc.; WiFi-direct; Bluetooth/BLE protocols; ANT protocols; Z-Wave; LTE D2D or ProSe; UPnP; and the like), or could represent any other network or protocols as discussed herein.

Figure 27:
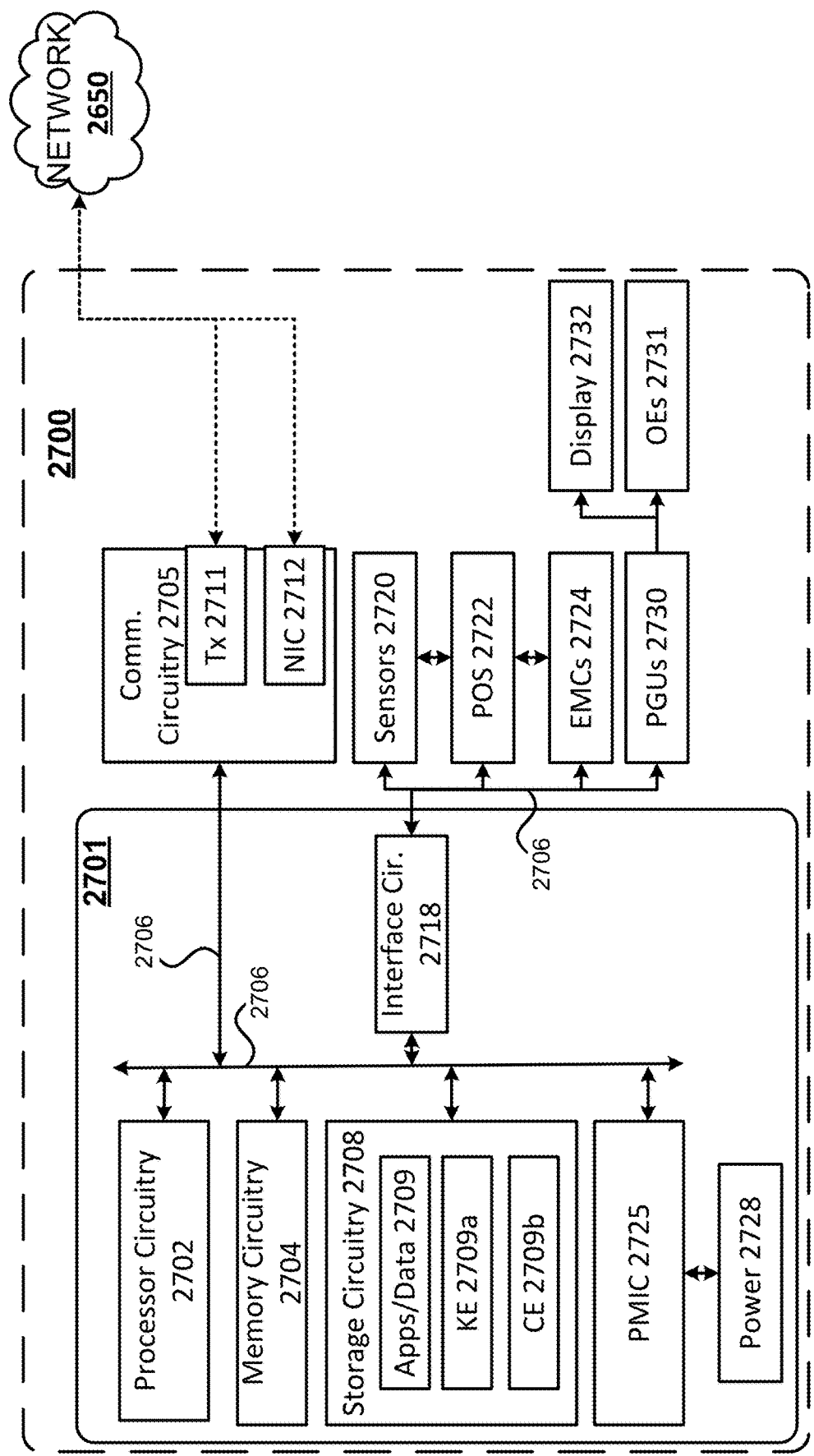
FIG. 27 depicts an example of a computer platform in accordance with various embodiments.

FIG. 27 illustrates an example implementation of a platform 2701 implemented in a computer system 2700, in accordance with various embodiments. The platform 2701 and computer system 2700 may include any combinations of the components as shown, which may be implemented as integrated circuits (ICs) or portions thereof, discrete electronic devices, or other modules, logic, hardware, software, firmware, middleware or a combination thereof adapted in the platform 2701, or as components otherwise incorporated within a chassis of a larger system. The platform 2701 may be an embedded system or any other type of computer device discussed herein. In some embodiments, the platform 2701 may be a separate and dedicated and/or special-purpose computer device designed specifically to carry out the embodiments discussed herein. In some embodiments, the computer system 2700 may correspond to the computer system 2601, application server 2630, or some other computer system.

The platform 2701 may include processor circuitry 2702, which may be one or more processing elements/devices configured to perform basic arithmetical, logical, and input/output operations by carrying out instructions. The processor circuitry 2702 may include one or more central processing units (CPUs) and/or processing cores, and one or more of cache memory, low drop-out voltage regulators (LDOs), interrupt controllers, serial interfaces such as SPI, $I^2C$ or universal programmable serial interface module, real time clock (RTC), timer-counters including interval and watchdog timers, general purpose input/output (I/O or IO), memory card controllers such as Secure Digital (SD/)MultiMediaCard (MMC) or similar, Universal Serial Bus (USB) interfaces, Mobile Industry Processor Interface (MIPI) interfaces, and Joint Test Access Group (JTAG) test access ports. The processor circuitry 2702 may be one or more microprocessors, one or more single-core processors, one or more multi-core processors, one or more graphics processing units (GPUs), one or more multithreaded processors, one or more ultra-low voltage processors, one or more embedded processors, one or more digital signal processors (DSPs), or any other suitable processor or processing/controlling circuit(s), or combinations thereof. As examples, the processor circuitry 2702 may include one or more Intel Pentium®, Core®, or Xeon® processor(s); Advanced Micro Devices (AMD) Ryzen® processor(s), Accelerated Processing Units (APUs), or Epyc® processors; A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc.; an ARM-based design licensed from ARM Holdings, Ltd.; Nvidia® GeForce 10 or Titan X series graphics cards (GPUs) based on the Pascal microarchitecture; and/or the like.

Additionally or alternatively, processor circuitry 2702 may include circuitry such as, but not limited to, one or more field-programmable devices (FPDs), which may include field-programmable gate arrays (FPGAs); programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the processor circuitry 2702 may comprise logic blocks or logic fabric including and other interconnected resources that may be programmed to perform various functions, such as the procedures, methods, functions, etc. of the various embodiments discussed herein. In such embodiments, the circuitry of processor circuitry 2702 may include memory cells (for example, erasable programmable read-only memory (EPROM), electrically erasable programmable read-only memory (EEPROM), flash memory, static memory (for example, static random access memory (SRAM), anti-fuses, etc.) used to store logic blocks, logic fabric, data, etc. in lookup-tables (LUTs) and the like.

In any of the aforementioned embodiments, the processor circuitry 2702 may be implemented as a standalone system/device/package or as part of an existing system/device/package of the computer system 2601. The processor circuitry 2702 may be a part of a system on a chip (SoC) in which the processor circuitry 2702 and other components discussed herein are formed into a single IC or a single package.

In some embodiments, the processor circuitry 2702 may include a sensor hub, which may act as a coprocessor by processing data obtained from the sensors 2720. The sensor hub may include circuitry configured to integrate data obtained from each of the sensors 2720 by performing arithmetical, logical, and input/output operations. In embodiments, the sensor hub may capable of timestamping obtained sensor data, providing sensor data to the processor circuitry 2702 in response to a query for such data, buffering sensor data, continuously streaming sensor data to the processor circuitry 2702 including independent streams for each sensor 2722, reporting sensor data based upon predefined thresholds or conditions/triggers, and/or other like data processing functions.

The memory circuitry 2704 may be circuitry configured to store data or logic for operating the platform 2701. Memory circuitry 2704 may include number of memory devices may be used to provide for a given amount of system memory. As examples, the memory circuitry 2704 can be any suitable type, number and/or combination of volatile memory devices (e.g., random access memory (RAM), dynamic RAM (DRAM), static RAM (SAM), etc.) and/or non-volatile memory devices (e.g., read-only memory (ROM), erasable programmable read-only memory (EPROM), electrically erasable programmable read-only memory (EEPROM), flash memory, antifuses, etc.) that may be configured in any suitable implementation as are known. Where FPDs are used, the processor circuitry 2702 and memory circuitry 2704 (and/or storage device 2708) may comprise logic blocks or logic fabric, memory cells, input/output (I/O) blocks, and other interconnected resources that may be programmed to perform various functions of the example embodiments discussed herein. The memory cells may be used to store data in lookup-tables (LUTs) that are used by the processor circuitry 2702 to implement various logic functions. The memory cells may include any combination of various levels of memory/storage including, but not limited to, EPROM, EEPROM, flash memory, SRAM, anti-fuses, etc.

Data storage circuitry 2708 (with shared or respective controllers) may provide for persistent storage of information such as data/applications 2709, operating systems, etc. The storage circuitry 2708 may be implemented as solid state drives (SSDs); solid state disk drive (SSDD); serial AT attachment (SATA) storage devices (e.g., SATA SSDs); flash drives; flash memory cards, such as SD cards, microSD cards, xD picture cards, and the like, and USB flash drives; three-dimensional cross-point (3D Xpoint) memory devices; on-die memory or registers associated with the processor circuitry 2702; hard disk drives (HDDs); micro HDDs; resistance change memories; phase change memories; holographic memories; or chemical memories; among others. As shown, the storage circuitry 2708 is included in the platform 2701; however, in other embodiments, storage circuitry 2708 may be implemented as one or more separate devices that are mounted in computer system 2601 separate from the other elements of platform 2701.

In some embodiments, the storage circuitry 2708 and/or memory circuitry 2704 may include an operating system (OS) (not shown), which may be a general purpose operating system or an operating system specifically written for and tailored to the platform 2701. The OS may include one or more drivers, libraries, and/or application programming interfaces (APIs), which provide program code and/or software components for applications/data 2709 and/or control system configurations to control and/or obtain/process data from one or more sensors 2720, ECUs 2722, and/or EMCs 2724. In embodiments where the processor circuitry 2702 and memory circuitry 2704 are implemented as hardware accelerators (e.g., FPGA cells) as well as processor cores, the hardware accelerators (e.g., the FPGA cells) may be pre-configured (e.g., with appropriate bit streams, logic blocks/fabric, etc.) with the logic to perform some functions of the embodiments herein (in lieu of employment of programming instructions to be executed by the processor core(s)).

The storage circuitry 2708 may store program code for carrying out various functions of the example embodiments herein. For example, the storage circuitry 2708 may include a kernel engine (KE) 2709*a* (which may be the same or similar to the KE 1115 and/or 2515) and a convolution engine (CE) 2709*b* (which may be the same or similar to CE 1120 and/or 2520). In embodiments, the KE 2709*a* and the CE 2709*b* may include program code for performing some or all of the operations as described previously with regard to FIGS. 1-25 and/or any of the examples discussed infra. The applications/data 2709 may be software modules/components used to perform various functions of the platform 2701 and/or to carry out functions of the example embodiments discussed herein. For example, the applications/data 2709 may comprise image data to be interpolated according to the various embodiments discussed herein. The applications/data 2709 may also include an HTTP client, a web browser program ("browser"), such as a web browser based on the WebKit platform, Microsoft's Internet Explorer browser, Apple's Safari, Google's Chrome, Opera's browser, or Mozilla's Firefox browser, and/or the like, to execute and render web applications allowing a user (for example, a subscriber of on-demand services provided by the remote systems or services) of the system 2700 to access, process and view information, pages, interfaces, and applications available to it from the remote systems or services over the network 2650. In other implementations, each system 2700 may operate a user (or third party) application designed to interact with applications of the application service provider platform allowing a user (for example, a subscriber of on-demand services provided by the remote systems or services) of the system 2700 to access, process and view information, pages and applications available to it from the remote systems or services over the network 2650.

The components of platform 2701 and/or computer system 2601 may communicate with one another over the bus 2706. In various embodiments, bus 2706 may be a controller area network (CAN) bus system, a Time-Trigger Protocol (TTP) system, or a FlexRay system, which may allow various devices (e.g., ECUs 2722, sensors 2720, EMCs 2724, etc.) to communicate with one another using messages or frames. Suitable implementations and general functionality of CAN, TTP, and FlexRay bus systems are known, and are readily implemented by persons having ordinary skill in the art. Additionally or alternatively, the bus 2706 may include any number of technologies, such as a Local Interconnect Network (LIN); industry standard architecture (ISA); extended ISA (EISA); Peripheral Component Interconnect Express (PCI); PCI extended (PCIx); PCI express (PCIe); an Inter-Integrated Circuit (I2C) bus; a Parallel Small Computer System Interface (SPI) bus; point to point interfaces; a power bus; a proprietary bus, for example, used in a SoC based interface; or any number of other technologies.

The communication circuitry 2705 may include circuitry for communicating with a wireless network or wired network. For example, the communication circuitry 2705 may include transceiver (Tx) 2711 and network interface controller (NIC) 2712.

NIC 2712 may be included to provide a wired communication link to the network 2650 and/or other devices. Network connectivity may be provided to/from the system 2700 using a physical connection, which may be electrical (e.g., "copper interconnect"), optical, or the like. The wired communication link may be based on Ethernet, Ethernet-over-USB, Ethernet over Multiprotocol Label Switching (MPLS), DeviceNet, ControlNet, Data Highway+, PROFIBUS, or PROFINET, among many others. An additional NIC 2712 may be included to allow connect to a second network (not shown) or other devices, for example, a first NIC 2712 providing communications to the network 2650 over Ethernet, and a second NIC 2712 providing communications to other devices over another type of network, such as a personal area network (PAN) including a personal computer (PC) device.

The Tx 2711 may include one or more radios to wirelessly communicate with the network 2650 and/or other devices. The Tx 2711 may include hardware devices that enable communication with wired networks and/or other devices using modulated electromagnetic radiation through a solid or non-solid medium. Such hardware devices may include switches, filters, amplifiers, antenna elements, and the like to facilitate the communications over the air (OTA) by generating or otherwise producing radio waves to transmit data to one or more other devices, and converting received signals into usable information, such as digital data, which may be provided to one or more other components of platform 2701.

Communication circuitry 2705 may include one or more processors (e.g., baseband processors, modems, etc.) that are dedicated to a particular wireless communication protocol (e.g., Wi-Fi and/or IEEE 802.11 protocols), a cellular communication protocol (e.g., 5th Generation (5G) communication systems, Long Term Evolution (LTE), WiMAX, Groupe Speciale Mobile Association (GSMA), and the like), a wireless personal area network (WPAN) protocol (e.g., IEEE 802.15.4-802.15.5 protocols, Open Mobile Alliance (OMA) protocols, Bluetooth or Bluetooth low energy (BLE), etc.), and/or a wired communication protocol (e.g., Ethernet, Fiber Distributed Data Interface (FDDI), Point-to-Point (PPP), etc.).

The input/output (I/O) interface circuitry 2718 may include circuitry, such as an external expansion bus (e.g., Universal Serial Bus (USB), FireWire, PCIe, Thunderbolt, etc.), used to connect platform 2701 with external components/devices, such as sensors 2720, electronic control units (ECUs) 2722, electro-mechanical components (EMCs) 2724, and picture generation units (PGUs) 2730. I/O interface circuitry 2718 may include any suitable interface controllers and connectors to interconnect one or more of the processor circuitry 2702, memory circuitry 2704, storage circuitry 2708, communication circuitry 2705, and the other components of platform 2701. The interface controllers may include, but are not limited to, memory controllers, storage controllers (e.g., redundant array of independent disk (RAID) controllers, baseboard management controllers (BMCs), input/output controllers, host controllers, etc. The connectors may include, for example, busses (for example, bus 2706), ports, slots, jumpers, interconnect modules, receptacles, modular connectors, etc.

Sensors 2720 may be any device configured to detect events or environmental changes, convert the detected events into electrical signals and/or digital data, and transmit/send the signals/data to the platform 2701 and/or one or more ECUs 2722. Some of the sensors 2720 may be sensors used for motion and/or object detection. Examples of such sensors 2720 may include, inter alia, charged-coupled devices (CCD), Complementary metal-oxide-semiconductor (CMOS) active pixel sensors (APS), lens-less image capture devices/cameras, thermographic (infrared) cameras, Light Imaging Detection And Ranging (LIDAR) systems, and/or the like. In some implementations, the sensors 2720 may include a lens-less image capture mechanism comprising an array of aperture elements, wherein light passing through the array of aperture elements define the pixels of an image. In embodiments, the motion detection sensors 2720 may be coupled with or associated with light generating devices, for example, one or more infrared projectors to project a grid of infrared light onto a scene or environment 115, where an infrared camera may record reflected infrared light to compute depth information.

Some of the sensors 2720 may be used for position and/or orientation detection, ambient/environmental condition detection, and the like. Examples of such sensors 2720 may include, inter alia, microelectromechanical systems (MEMS) with piezoelectric, piezoresistive and/or capacitive components, which may be used to determine environmental conditions or location information related to the platform 2701 and/or computer system 2601. In embodiments, the MEMS may include 3-axis accelerometers, 3-axis gyroscopes, and/or magnetometers. In some embodiments, the sensors 2720 may also include one or more gravimeters, altimeters, barometers, proximity sensors (e.g., infrared radiation detector(s) and the like), depth sensors, ambient light sensors, thermal sensors (thermometers), ultrasonic transceivers, and/or the like.

The positioning circuitry 2722, which may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 2722 may comprise various hardware elements (e.g., including hardware devices such as switches, filters, amplifiers, antenna elements, and the like to facilitate the communications over-the-air (OTA) communications) to communicate with components of a positioning network, such as navigation satellite constellation nodes.

Nodes or satellites of the navigation satellite constellation(s) ("GNSS nodes") may provide positioning services by continuously transmitting or broadcasting GNSS signals along a line of sight, which may be used by GNSS receivers (e.g., positioning circuitry 2722 and/or positioning circuitry implemented by UEs 101, or the like) to determine their GNSS position. The GNSS signals may include a pseudorandom code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). In some embodiments, the positioning circuitry 2722 may include a Micro-Technology for Positioning, Navigation, and Timing (Micro-PNT) IC that uses a master timing clock to perform position tracking/estimation without GNSS assistance.

The GNSS receivers may measure the time of arrivals (ToAs) of the GNSS signals from the plurality of GNSS nodes according to its own clock. The GNSS receivers may determine ToF values for each received GNSS signal from the ToAs and the ToTs, and then may determine, from the ToFs, a three-dimensional (3D) position and clock deviation. The 3D position may then be converted into a latitude, longitude and altitude. The positioning circuitry 2722 may provide data to processor circuitry 2702 which may include one or more of position data or time data. Processor circuitry 2702 may use the time data to synchronize operations with other devices or components within the computer system 2601.

The EMCs 2724 may be devices that allow the computer system 2601 to change a state, position, orientation, move, and/or control a mechanism or system. In embodiments, platform 2701 may be configured to operate one or more EMCs 2724 by transmitting/sending instructions or control signals to the EMCs 2724 based on detected user interactions or other like events. The EMCs 2724 may include one or more switches; haptic output devices, such as actuators and/or motors (e.g., eccentric rotating mass (ERM) actuators, linear resonant actuator (LRA), piezoelectric actuators, servomechanisms, rotary motors, linear motors, and step motors, etc.), thrusters, projectile ejecting devices (e.g., using spring loaded or compressed air/fluid), power switches, relays (e.g., electromechanical relays (EMRs), solid state relays (SSRs)), propellers, claws, clamps, hooks, and/or other like electro-mechanical components. In embodiments, the EMCs 2724 may comprise speakers, a digital rendering module(s) (e.g., a physical object with a digital rendering module therein), and/or another way to control an acoustic energy emission, an electromagnetic radiation emission, an electric energy application, a magnetic field, and an acceleration or deceleration emitted or experienced by a physical object or an instrumented object.

The computer system 2700 may include one or more picture generation units (PGUs) 2730 and optical elements (OEs) 2731 and/or one or more display devices 2732. The PGUs 2730 may be one or more electronic devices that create/generate digital images to be directed to the display devices 2732 and/or the OEs 2731.

In embodiments where a display device 2732 is used, the PGUs 2730 may generate signals (e.g., based on digital images, video, etc.), which may be sent to the display device 2732. In this example, the display device 2732 may be embedded with the computer system 2700, and the signals may be sent to the display device 2732 over bus 2706. In other embodiments, the display device 2732 may be separate from the computer system 2700. In these embodiments, the signals may be sent to the display device 2732 over a suitable wired connection, such as RCA, a video graphics array (VGA), a digital visual interface (DVI) and/or mini-DVI, a high-definition multimedia interface (HDMI), S-Video, and/or the like. In some embodiments, the signals may wirelessly transmitted to the display device 2732 via a wireless connection using one or more of the wireless communications protocols discussed previously, or one or more remote display protocols, such as wireless gigabit alliance (WiGiG) protocol, remote desktop protocol (RDP), PC-over-IP (PCoIP) protocol, high-definition experience (HDX) protocol, and/or other like remote display protocols. In some embodiments, the display device 2732 may include or couple with a dongle or other like receiving device configured to receive the one or more multimedia signals from the computer system 2700. In the aforementioned embodiments, the display device(s) 2732 may include any suitable type of monitor(s), such as Light Emitting Diode (LED) display devices, organic LED (OLED) display devices, Liquid Crystal Display (LCD) devices, quantum dot display devices, and/or the like.

In embodiments where OEs 2731 are used, the PGUs 2730 may generate light (e.g., based on digital images), which may be directed and/or redirected to an OE 2731 (e.g., a display surface). The digital images may be any type of content stored by the storage circuitry 208, streamed from remote devices via the communication circuitry 2705, and/or based on outputs from various sensors 2720, EMCs 2724, etc. The generated light may be combined or overlapped with external (e.g., natural) light that is also redirected to the same OE 2731. The OE 2731 that combines the generated light with the external light may be referred to as a "combiner element" or "combiner."

In these embodiments, the PGUs 2730 may be or comprise a projector that may project still or moving images onto the surface(s) of OEs 2731 via one or more reflection surfaces (e.g., mirrors) based on a received signal. The projector of each PGU 330 may be an LED projector, a laser diode projector, a LCD projector, a digital light processing (DLP) projector, a liquid crystal on silicon (LCoS) projector, and/or any other like projection device. The projector may comprise a light source and various electronic devices (or electronic system) that may generate the images for display, such as one or more processors/GPUs, one or more memory devices, and other like components. This may be done by converting the image into a signal for controlling the light source to generate/output light of different colors and intensities. The projector may also comprise a combiner (also referred to as "combiner optic" and the like), which may combine different light paths into one light path to define a palette of colors. In some embodiments, the projector may comprise scanning mirrors that copy the image pixel-by-pixel and then project the image for display. In some embodiments, the PGUs 2730 may comprise a relay lens assembly and a combiner element (which may be different than the combiner of the projector). The relay lens assembly may comprise one or more relay lenses, which re-image images from the projector into an intermediate image that then reaches an OE 2731 (e.g., the combiner element) through a reflector.

The combiner element (as well as other OEs 2731) may be a display surface, which may be fully or partially opaque or transparent, that mixes the digital images output by the projector/PGUs 2730 with viewed real-world objects to facilitate augmented reality. One or more of the OEs 2731 may be transmissive optical elements, where the transmitted beam (reference beam) hits the OE 2731 and the diffracted beam(s) go through the OE 2731. One or more OEs 2731 may be reflective optical elements, where the transmitted beam (reference beam) hits the OE 2731 and the diffracted beam(s) reflects off the OE 2731 (e.g., the reference beam and diffracted beams are on the same side of the OE 2731). In embodiments, the OEs 2731 may be a holographic OE, and in some embodiments, the combiner element may be a hologram or holographic image (e.g., ether a transmissive HOE or reflective HOE).

Where HOEs 2731 are used, one or more of the HOEs 2731 may use waveguide holographic techniques to progressively extract a collimated image guided by total internal reflection (TIR) in a waveguide pipe. The waveguide pipe may be a thin sheet of glass or plastic through which the generated light bounces to route the generated light to the viewer/user. In some embodiments, the HOEs 2731 may utilize holographic diffraction grating (e.g., Bragg diffraction grating) to provide the generated light to the waveguide at a critical angle, which travels through the waveguide. The light is steered toward the user/viewer by one or more other HOEs 2731 that utilize holographic diffraction grating. These HOEs 2731 may comprise grooved reflection gratings and/or a plurality of layers of alternating refraction indexes (e.g., comprising liquid crystals, photoresist substrate, etc.); the grooved reflection gratings and/or the refractive index layers may provide constructive and destructive interference and wavelet dispersion.

The power source 2728 may power the platform 2701 and/or the system 2700. In embodiments where the system 2700 is mounted in a fixed location or otherwise relatively non-mobile, the power supply 2728 may be an electrical grid. In some embodiments, power tee circuitry may be included in the system 2700 to provide for electrical power drawn from a network cable to provide both power supply and data connectivity to the system 2700 using a single cable. Where the system 2700 is a mobile device, laptop computer, or the like, the power source 2728 may be a battery. The battery 2724 may be a lithium ion battery, a metal-air battery such as a zinc-air battery, an aluminum-air battery, a lithium-air battery, and the like.

The power management integrated circuitry (PMIC) 2725 (or "battery monitor 2725") may be included in the platform 2701 to track/monitor various parameters of the power source 2728. The PMIC 2725 may comprise an IC, SoC, etc., which may provide power source information/parameters to the processor circuitry 2702 over the bus 2706. The PMIC 2725 may include voltage regulators, surge protectors, power alarm detection circuitry, and one or more backup power sources such as a battery or capacitor. The power alarm detection circuitry may detect one or more of brown out (under-voltage) and surge (over-voltage) conditions, which may be indicated to the processor circuitry 2702 as power source information/parameters. Where the power source 2728 is a battery, the parameters may additionally or alternatively include a state of charge (SoCh) of the battery 2728, state of health (SoH), and the state of function (SoF) of the battery 2728. The PMIC 2725 may also include an analog-to-digital (ADC) convertor that allows the processor circuitry 2702 to directly monitor the voltage of the battery 2725 or the current flow from the battery 2725.

While not shown, various other devices may be present within, or connected to, the platform 2701. For example, I/O devices, such as a touchscreen or keypad may be connected to the platform 2701 via bus 2706 to accept input and display outputs. In another example, one or more of physical or virtual buttons, such as a reset button, one or more indicators such as light emitting diodes (LEDs) or the like, may be included in or connected with platform 2701 and/or the computer system 2601. In another example, the communication circuitry 2705 may include a Universal Integrated Circuit Card (UICC), embedded UICC (eUICC), and/or other elements/components that may be used to communicate over one or more wireless networks.

As used herein, the term "circuitry" refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality.

As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The computer-executable instructions for the disclosed implementations can be realized in any programming language that can be executed on a computer system, server, or like device such as, for example, C, C++, Python, Ruby, Hypertext Markup Language (HTML), Extensible Markup Language (XML), Java Script Object Notion (JSON), Cascading Stylesheets (CSS), JavaServer Pages (JSP), Abstract Syntax Notation One (ASN.1); Java™, JavaScript, ActiveX, VBScript, and any other programming languages as are well known may be used.

As used herein, the term "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like). As used herein, the terms "instantiate," "instantiation," and the like may refer to the creation of an instance, and an "instance" may refer to a concrete occurrence of an object, which may occur, for example, during execution of program code. Additionally, an "application instance" may be a realized software program executed in mobile edge host, which can provide service(s) to serve consumer(s).

As used herein, the term "computer device" may describe any physical hardware device capable of sequentially and automatically carrying out a sequence of arithmetic or logical operations, equipped to record/store data on a machine readable medium, and transmit and receive data from one or more other devices in a communications network. A computer device may be considered synonymous to, and may hereafter be occasionally referred to, as a computer, computing platform, computing device, etc. The term "computer system" may include any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources. As used herein, the term "user equipment" or "UE" may refer to a device, such as a computer device, with radio communication capabilities and may describe a remote user of network resources in a communications network.

Examples of "computer devices", "computer systems", "UEs", etc. may include cellular phones or smart phones, feature phones, tablet personal computers, wearable computing devices, an autonomous sensors, laptop computers, desktop personal computers, video game consoles, digital media players, handheld messaging devices, personal data assistants, an electronic book readers, augmented reality devices, server computer devices (e.g., stand-alone, rack-mounted, blade, etc.), cloud computing services/systems, network elements, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or any other like electronic devices.

As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. As used herein, the term "network resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable. Additionally, a "virtualized resource" may refer to compute, storage, and/or network resources provided by virtualization infrastructure to an application, such as a mobile edge application.

As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computing device of a wired or wireless communication network and be configured to host a virtual machine. Furthermore, the term "network element" may describe equipment that provides radio baseband functions for data and/or voice connectivity between a network and one or more users. The term "network element" may be considered synonymous to and/or referred to as a "base station." As used herein, the term "base station" may be considered synonymous to and/or referred to as a node B, an enhanced or evolved node B (eNB), next generation nodeB (gNB), base transceiver station (BTS), access point (AP), roadside unit (RSU), etc., and may describe equipment that provides the radio baseband functions for data and/or voice connectivity between a network and one or more users. As used herein, the terms "vehicle-to-vehicle" and "V2V" may refer to any communication involving a vehicle as a source or destination of a message. Additionally, the terms "vehicle-to-vehicle" and "V2V" as used herein may also encompass or be equivalent to vehicle-to-infrastructure (V2I) communications, vehicle-to-network (V2N) communications, vehicle-to-pedestrian (V2P) communications, or V2X communications.

As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for transmitting and receiving information.

The various wireless communications discussed herein may be compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g., a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Ra. 8 (Pre-4G) (3rd Generation Partnership Project Release 8 (Pre-4th Generation)), 3GPP Rel. 9 (3rd Generation Partnership Project Release 9), 3GPP Ra. 10 (3rd Generation Partnership Project Release 10), 3GPP Rel. 11 (3rd Generation Partnership Project Release 11), 3GPP Ra. 12 (3rd Generation Partnership Project Release 12), 3GPP Ra. 13 (3rd Generation Partnership Project Release 13), 3GPP Ra. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11 ay, and the like. In addition to the standards listed above, any number of satellite uplink technologies may be used for the uplink transceiver 707-2, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

IV. Examples

Some non-limiting examples are as follows. The following examples pertain to further embodiments, and specifics in the examples may be used anywhere in one or more embodiments discussed previously. Any of the following examples may be combined with any other example (or combination of examples). or any embodiment discussed herein, unless explicitly stated otherwise.

Example 1 may include an apparatus comprising: kernel estimation means for estimating a convolutional kernel based on a first receptive field patch of a first input image frame and a second receptive field patch of a second input image frame; and convolution means for convolving the convolutional kernel over a first pixel patch of the first input image frame and a second pixel patch of the second input image frame to obtain a color of an output pixel of an interpolation frame.

Example 2 may include the apparatus of example 1 and/or some other examples herein, wherein the kernel estimation means is for: accepting, as an input, the first receptive field patch and the second receptive field patch; and outputting the kernel to compute the color for the output pixel that is co-centered at a same location as the first receptive field patch and the second receptive field patch in the interpolation frame.

Example 3 may include the apparatus of example 2 and/or some other examples herein, wherein the first receptive field patch and the second receptive field patch are centered in the input image frame.

Example 4 may include the apparatus of example 3 and/or some other examples herein, wherein the first pixel patch is centered within the first receptive field patch and the second pixel patch is centered within the second receptive field patch.

Example 5 may include the apparatus of example 3 or 4 and/or some other examples herein, wherein the convolution means comprises a plurality of convolutional means and a plurality of down-convolution means.

Example 6 may include the apparatus of example 1 and/or some other examples herein, wherein the kernel estimation means is for estimating two pairs of one dimensional kernels for each pixel in the interpolation frame, wherein each of the two pairs of one dimensional kernels is an estimate of a corresponding two dimensional kernel.

Example 7 may include the apparatus of example 6 and/or some other examples herein, further comprising: contracting means for extracting features from the first and second input frames; and expanding means for performing dense predictions at the resolution of the input frames.

Example 8 may include the apparatus of example 7 and/or some other examples herein, wherein: the contracting means comprises downsampling means for downsampling data of the convolution means, and the expanding means comprises upsampling means for performing transposed convolution, sub-pixel convolution, nearest-neighbor, and bilinear interpolation.

Example 9 may include a computer system comprising: processor circuitry communicatively coupled with memory circuitry, the memory circuitry to store program code of a convolutional neural network, "ConvNet", and the processor circuitry is to operate the ConvNet to: obtain, as an input, a first image frame and a second image frame; estimate a convolutional kernel based on a first receptive field patch of the first image frame and a second receptive field patch of a second image frame; convolve the convolutional kernel over a first pixel patch of the first input image frame and a second pixel patch of the second input image frame to obtain a color of an output pixel of an interpolation frame; and output the interpolation frame with the output pixel having the obtained color.

Example 10 may include the computer system of example 9 and/or some other examples herein, wherein the processor circuitry is to operate the ConvNet to: output of the output pixel in the interpolation frame co-centered at a same location as the first receptive field patch and the second receptive field patch in the first input image and the second input image, respectively.

Example 11 may include the computer system of example 10 and/or some other examples herein, wherein the first receptive field patch and the second receptive field patch are centered in the input image frame, and wherein the first pixel patch is centered within the first receptive field patch and the second pixel patch is centered within the second receptive field patch.

Example 12 may include the computer system of examples 9-11 and/or some other examples herein, wherein the ConvNet comprises: an input layer comprising raw pixel data of a plurality of input image frames, wherein the first image frame and the second image frame are among the plurality of input image frames; a plurality of convolutional layers comprising a corresponding one of a plurality of estimated kernels; a plurality of down-convolutional layers, wherein the down-convolutional layers are disposed between some convolutional layers of the plurality of convolutional layers; and an output layer comprising a feature map comprising a data structure that is representative of the output pixel and the obtained color.

Example 13 may include the computer system of example 9 and/or some other examples herein, wherein the ConvNet comprises: a contracting component comprising a first plurality of convolution layers and a plurality of pooling layers, wherein one or more convolution layers of the first plurality of convolution layers are grouped with a corresponding one of the plurality of pooling layers; an expanding component comprises a second plurality of convolution layers and a plurality of upsampling layers, wherein one or more convolution layers of the second plurality of convolution layers are grouped with a corresponding one of the plurality of upsampling layers; and a plurality of subnetworks, wherein each subnetwork of the plurality of subnetworks comprises a set of convolution layers and an upsampling layer.

Example 14 may include the computer system of example 13 and/or some other examples herein, wherein the processor circuitry is to operate the ConvNet to: operate each subnetwork to estimate a corresponding one dimensional kernel for each pixel in the interpolation frame, each pair of one dimensional kernels comprising a two dimensional kernel.

Example 15 may include the computer system of example 13 and/or some other examples herein, wherein the processor circuitry is to operate the ConvNet to: operate the contracting component to extract features from the first and second image frames; and operate the expanding component to perform dense predictions on the extracted features.

Example 16 may include the computer system of examples 13-15 and/or some other examples herein, wherein the processor circuitry is to operate each of the plurality of upsampling layers to perform a corresponding transposed convolution operation, a sub-pixel convolution operation, a nearest-neighbor operation, or a bilinear interpolation operation.

Example 17 may include the computer system of examples 13-15 and/or some other examples herein, wherein the processor circuitry is to operate each of the plurality of pooling layers to perform a downsampling operation.

Example 18 may include one or more computer-readable media, "CRM", including program code of a convolutional neural network, "ConvNet", wherein execution of the program code by one or more processors is to cause a computer system to: obtain, as an input, a first image frame and a second image frame; estimate a convolutional kernel based on a first receptive field patch of the first image frame and a second receptive field patch of a second image frame; convolve the convolutional kernel over a first pixel patch of the first input image frame and a second pixel patch of the second input image frame to obtain a color of an output pixel of an interpolation frame; and output the interpolation frame with the output pixel having the obtained color.

Example 19 may include the one or more CRM of example 18 and/or some other examples herein, wherein execution of the program code is to cause the computer system to: output of the output pixel in the interpolation frame co-centered at a same location as the first receptive field patch and the second receptive field patch in the first input image and the second input image, respectively.

Example 20 may include the one or more CRM of example 19 and/or some other examples herein, wherein the first receptive field patch and the second receptive field patch are centered in the input image frame, and wherein the first pixel patch is centered within the first receptive field patch and the second pixel patch is centered within the second receptive field patch.

Example 21 may include the one or more CRM of examples 18-20 and/or some other examples herein, wherein the ConvNet comprises: an input layer comprising raw pixel data of a plurality of input image frames, wherein the first image frame and the second image frame are among the plurality of input image frames; a plurality of layers comprising a corresponding one of a plurality of convolutional layers, pooling layers, and/or Batch Normalization layers; a plurality of down-convolutional layers, wherein the down-convolutional layers are disposed between some convolutional layers of the plurality of convolutional layers; and an output layer comprising a feature map comprising kernels that are used to produce the color of the output pixel.

Example 22 may include the one or more CRM of example 18 and/or some other examples herein, wherein the ConvNet comprises: a contracting component comprising a first plurality of convolution layers and a plurality of pooling layers, wherein one or more convolution layers of the first plurality of convolution layers are grouped with a corresponding one of the plurality of pooling layers; an expanding component comprises a second plurality of convolution layers and a plurality of upsampling layers, wherein one or more convolution layers of the second plurality of convolution layers are grouped with a corresponding one of the plurality of upsampling layers; and a plurality of subnetworks, wherein each subnetwork of the plurality of subnetworks comprises a set of convolution layers and an upsampling layer.

Example 23 may include the one or more CRM of example 22 and/or some other examples herein, wherein execution of the program code is to cause the computer system to: operate each subnetwork to estimate a corresponding one dimensional kernel for each pixel in the interpolation frame, each one dimensional kernel being part of a two dimensional kernel pair.

Example 24 may include the one or more CRM of example 22 and/or some other examples herein, wherein execution of the program code is to cause the computer system to: operate the contracting component to extract features from the first and second image frames; and operate the expanding component to perform dense predictions on the extracted features.

Example 25 may include the one or more CRM of example 22 and/or some other examples herein, wherein execution of the program code is to cause the computer system to: operate each of the plurality of upsampling layers to perform a corresponding transposed convolution operation, a sub-pixel convolution operation, a nearest-neighbor operation, or a bilinear interpolation operation; and operate each of the plurality of pooling layers to perform a down-sampling operation.

Example 26 may include method comprising: estimating or causing to estimate a convolutional kernel based on a first receptive field patch of a first input image frame and a second receptive field patch of a second input image frame; and convolving or causing to convolve the convolutional kernel over a first pixel patch of the first input image frame and a second pixel patch of the second input image frame to obtain a color of an output pixel of an interpolation frame.

Example 27 may include the method of example 26 and/or some other examples herein, further comprising: accepting or causing to accept, as an input, the first receptive field patch and the second receptive field patch; and outputting the kernel to compute the color for the output pixel that is co-centered at a same location as the first receptive field patch and the second receptive field patch in the interpolation frame.

Example 28 may include the method of example 26 and/or some other examples herein, wherein the first receptive field patch and the second receptive field patch are centered in the input image frame.

Example 29 may include the method of example 28 and/or some other examples herein, wherein the first pixel patch is centered within the first receptive field patch and the second pixel patch is centered within the second receptive field patch.

Example 30 may include the method of examples 28-29 and/or some other examples herein, wherein the convolving comprises performing or causing to perform a plurality of convolution operations of corresponding convolutional layers; and performing or causing to perform a plurality of down-convolution operations of corresponding down-convolution layers.

Example 31 may include the method of example 26 and/or some other examples herein, further comprising: estimating or causing to estimate two pairs of one dimensional kernels for each pixel in the interpolation frame, wherein each of the two pairs of one dimensional kernels is an estimate of a corresponding two dimensional kernel.

Example 32 may include the method of example 31 and/or some other examples herein, further comprising: extracting or causing to extract features from the first and second input frames; and performing or causing to perform dense predictions at the resolution of the input frames.

Example 33 may include the method of example 32 and/or some other examples herein, wherein extracting the features comprises downsampling or causing to downsample data of convolution layers, and wherein performing the dense predictions comprises performing or causing to perform transposed convolution, sub-pixel convolution, nearest-neighbor, and bilinear interpolation.

Example 34 may include a method comprising: obtaining or causing to obtain, as an input, a first image frame and a second image frame; estimating or causing to estimate a convolutional kernel based on a first receptive field patch of the first image frame and a second receptive field patch of a second image frame; convolving or causing to convolve the convolutional kernel over a first pixel patch of the first input image frame and a second pixel patch of the second input image frame to obtain a color of an output pixel of an interpolation frame; and outputting or causing to output the interpolation frame with the output pixel having the obtained color.

Example 35 may include the method of example 34 and/or some other examples herein, wherein the processor circuitry is to operate the ConvNet to: output of the output pixel in the interpolation frame co-centered at a same location as the first receptive field patch and the second receptive field patch in the first input image and the second input image, respectively.

Example 36 may include the method of example 35 and/or some other examples herein, wherein the first receptive field patch and the second receptive field patch are centered in the input image frame, and wherein the first pixel patch is centered within the first receptive field patch and the second pixel patch is centered within the second receptive field patch.

Example 37 may include the method of examples 34-36 and/or some other examples herein, wherein the ConvNet comprises: an input layer comprising raw pixel data of a plurality of input image frames, wherein the first image frame and the second image frame are among the plurality of input image frames; a plurality of convolutional layers comprising a corresponding one of a plurality of estimated kernels; a plurality of down-convolutional layers, wherein the down-convolutional layers are disposed between some convolutional layers of the plurality of convolutional layers; and an output layer comprising a feature map comprising a data structure that is representative of the output pixel and the obtained color.

Example 38 may include the method of example 34 and/or some other examples herein, wherein the ConvNet comprises: a contracting component comprising a first plurality of convolution layers and a plurality of pooling layers, wherein one or more convolution layers of the first plurality of convolution layers are grouped with a corresponding one of the plurality of pooling layers; an expanding component comprises a second plurality of convolution layers and a plurality of upsampling layers, wherein one or more convolution layers of the second plurality of convolution layers are grouped with a corresponding one of the plurality of upsampling layers; and a plurality of subnetworks, wherein each subnetwork of the plurality of subnetworks comprises a set of convolution layers and an upsampling layer.

Example 39 may include the method of example 38 and/or some other examples herein, further comprising: operating or causing to operate the ConvNet wherein operating the ConvNet comprises: operating or causing to operate each subnetwork to estimate a corresponding one dimensional kernel for each pixel in the interpolation frame, each pair of one dimensional kernels comprising a two dimensional kernel.

Example 40 may include the method of example 38 and/or some other examples herein, further comprising: operating or causing to operate the ConvNet wherein operating the ConvNet comprises: operating or causing to operate the contracting component to extract features from the first and second image frames; and operating or causing to operate the expanding component to perform dense predictions on the extracted features.

Example 41 may include the method of examples 38-40 and/or some other examples herein, further comprising: operating or causing to operate each of the plurality of upsampling layers to perform a corresponding transposed convolution operation, a sub-pixel convolution operation, a nearest-neighbor operation, or a bilinear interpolation operation.

Example 42 may include the method of examples 38-40 and/or some other examples herein, further comprising:

operating or causing to operate each of the plurality of pooling layers to perform a downsampling operation.

Example 43 may include a method comprising: obtaining or causing to obtain, as an input, a first image frame and a second image frame; estimating or causing to estimate a convolutional kernel based on a first receptive field patch of the first image frame and a second receptive field patch of a second image frame; convolving or causing to convolve the convolutional kernel over a first pixel patch of the first input image frame and a second pixel patch of the second input image frame to obtain a color of an output pixel of an interpolation frame; and outputting or causing to output the interpolation frame with the output pixel having the obtained color.

Example 44 may include the method of example 43 and/or some other examples herein, further comprising: outputting or causing to output of the output pixel in the interpolation frame co-centered at a same location as the first receptive field patch and the second receptive field patch in the first input image and the second input image, respectively.

Example 45 may include the method of example 44 and/or some other examples herein, wherein the first receptive field patch and the second receptive field patch are centered in the input image frame, and wherein the first pixel patch is centered within the first receptive field patch and the second pixel patch is centered within the second receptive field patch.

Example 46 may include the method of examples 43-45 and/or some other examples herein, wherein the ConvNet comprises: an input layer comprising raw pixel data of a plurality of input image frames, wherein the first image frame and the second image frame are among the plurality of input image frames; a plurality of layers comprising a corresponding one of a plurality of convolutional layers, pooling layers, and/or Batch Normalization layers; a plurality of down-convolutional layers, wherein the down-convolutional layers are disposed between some convolutional layers of the plurality of convolutional layers; and an output layer comprising a feature map comprising kernels that are used to produce the color of the output pixel.

Example 47 may include the method of example 43 and/or some other examples herein, wherein the ConvNet comprises: a contracting component comprising a first plurality of convolution layers and a plurality of pooling layers, wherein one or more convolution layers of the first plurality of convolution layers are grouped with a corresponding one of the plurality of pooling layers; an expanding component comprises a second plurality of convolution layers and a plurality of upsampling layers, wherein one or more convolution layers of the second plurality of convolution layers are grouped with a corresponding one of the plurality of upsampling layers; and a plurality of subnetworks, wherein each subnetwork of the plurality of subnetworks comprises a set of convolution layers and an upsampling layer.

Example 48 may include the method of example 47 and/or some other examples herein, further comprising: operating or causing to operate each subnetwork to estimate a corresponding one dimensional kernel for each pixel in the interpolation frame, each one dimensional kernel being part of a two dimensional kernel pair.

Example 49 may include the method of example 47 and/or some other examples herein, further comprising: operating or causing to operate the contracting component to extract features from the first and second image frames; and operating or causing to operate the expanding component to perform dense predictions on the extracted features.

Example 50 may include the method of example 47 and/or some other examples herein, further comprising: operating or causing to operate each of the plurality of upsampling layers to perform a corresponding transposed convolution operation, a sub-pixel convolution operation, a nearest-neighbor operation, or a bilinear interpolation operation; and operating or causing to operate each of the plurality of pooling layers to perform a downsampling operation.

Example 51 may include a method comprising: estimating or causing to estimate a spatially-adaptive convolutional kernel; and forming a pixel interpolation as a convolution over corresponding pixel patches in first and second video frames.

Example 52 may include the method of example 51 and/or some other examples herein, wherein the spatially-adaptive convolutional kernel may be estimated by a convolutional neural network.

Example 53 may include an apparatus to: estimate a spatially-adaptive convolutional kernel; and form a pixel interpolation as a convolution over corresponding pixel patches in first and second video frames.

Example 54 may include the apparatus of example 53 and/or some other examples herein, wherein the spatially-adaptive convolutional kernel may be estimated by a deep fully convolutional neural network.

Example 55 may include a method, which may include: estimating first and second pairs of 1D convolution kernels to approximate first and second 2D convolution kernels in first and second video frames, respectively; and forming a pixel interpolation as a convolution over corresponding pixel patches of the first and second 2D convolution kernels.

Example 56 may include the method of example 55 and/or some other examples herein, wherein each pair of 1D convolution kernels includes a 1D horizontal convolution kernel and a 1D vertical convolution kernel.

Example 57 may include apparatus to: estimate simultaneously first and second pairs of 1D convolution kernels to approximate first and second 2D convolution kernels in first and second video frames, respectively; and form a pixel interpolation as a convolution over corresponding pixel patches of the first and second 2D convolution kernels.

Example 58 may include a method which may include: estimating 1D convolution kernels for plural pixels in a frame simultaneously; and synthesizing the full frame simultaneously with respect to the 1D convolution kernels.

Example 59 may include the method of example 58 and/or some other examples herein, wherein estimating 1D convolution kernels for plural pixels in a frame simultaneously may include estimating 1D convolution kernels for all pixels in a frame simultaneously.

Example 60 may include the method of example 58 and/or some other examples herein, and may further include incorporating perceptual loss into the full frame.

Example 61 may include apparatus to: estimate plural 1D convolution kernels for each of plural pixels in a frame simultaneously; and synthesize the full frame simultaneously with respect to the 1D convolution kernels for the plural pixels in the frame.

Example 62 may include the apparatus of example 61 and/or some other examples herein, wherein estimating plural 1D convolution kernels for each of plural pixels in a frame simultaneously may include estimating 1D convolution kernels for all pixels in a frame simultaneously.

Example 63 may include an apparatus comprising means to perform one or more elements of a method described in or related to any of examples 1-62, or any other method or process described herein. Example 64 may include one or more non-transitory computer-readable media comprising instructions to cause an electronic device, upon execution of the instructions by one or more processors of the electronic device, to perform one or more elements of a method described in or related to any of examples 1-62, or any other method or process described herein. Example 65 may include an apparatus comprising logic, modules, or circuitry to perform one or more elements of a method described in or related to any of examples 1-62, or any other method or process described herein. Example 66 may include a method, technique, or process as described in or related to any of examples 1-62, or portions or parts thereof. Example 67 may include an apparatus comprising: one or more processors and one or more computer readable media comprising instructions that, when executed by the one or more processors, cause the one or more processors to perform the method, techniques, or process as described in or related to any of examples 1-62, or portions thereof. Example 68 may include a signal as described in or related to any of examples 1-62, or portions or parts thereof.

Example embodiments described herein may be implemented by computer hardware, software, firmware, middleware, microcode, hardware description languages, or any combination thereof. When implemented in software, firmware, middleware or microcode, the program code or code segments to perform the necessary tasks may be stored in a machine or computer readable medium. A code segment may represent a procedure, a function, a subprogram, a program, a routine, a subroutine, a module, program code, a software package, a class, or any combination of instructions, data structures, program statements, and the like.

Example embodiments may be described as a process depicted as successive operations and/or with a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in a figure. A process may correspond to a method, a function, a procedure, a subroutine, a subprogram, and the like. When a process corresponds to a function, its termination may correspond to a return of the function to the calling function a main function.

The term "memory" may represent one or more hardware devices for storing data, including random access memory (RAM), magnetic RAM, core memory, read only memory (ROM), magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

The invention claimed is:

1. A computer system comprising:
   processor circuitry communicatively coupled with memory circuitry, the memory circuitry to store program code of a convolutional neural network (ConvNet) and the processor circuitry is to operate the ConvNet to:
   obtain, as an input, a first image frame and a second image frame;
   estimate a pair of spatially-adaptive convolutional kernels to generate an individual output pixel based on a first receptive field patch of the first image frame and a second receptive field patch of the second image frame, wherein the estimation of the pair of spatially-adaptive convolutional kernels includes generation of a pair of kernel matrices, the pair of kernel matrices including a first kernel matrix for a first pixel patch of the first image frame and a second kernel matrix for a second pixel patch of the second image frame;
   convolve the pair of spatially-adaptive convolutional kernels over the first pixel patch of the first image frame and the second pixel patch of the second image frame to obtain a color of the individual output pixel; and
   generate and output an interpolation frame with the individual output pixel having the obtained color.

2. The computer system of claim 1, wherein the processor circuitry is to operate the ConvNet to:
   produce the output pixel in the interpolation frame co-centered at same locations as the first receptive field patch in the first input image and the second receptive field patch in the second input image.

3. The computer system of claim 2, wherein the first receptive field patch is centered around a pixel coordinate of the individual output pixel in the first image frame, and the second receptive field patch is centered around the pixel coordinate of the individual output pixel in the second image frame, and wherein the first pixel patch is centered within the first receptive field patch and the second pixel patch is centered within the second receptive field patch.

4. The computer system of claim 1, wherein the ConvNet comprises:
   an input layer comprising raw pixel data of a plurality of input image frames, wherein the first image frame and the second image frame are among the plurality of input image frames;
   a plurality of convolutional layers comprising a corresponding one of a plurality of estimated kernels;
   a plurality of down-convolutional layers instead of one or more max-pooling layers, wherein individual down-convolutional layers of the plurality of down-convolutional layers are disposed between two convolutional layers of the plurality of convolutional layers; and
   an output layer comprising a feature map, wherein the feature map is a data structure that is representative of output pixels and corresponding obtained colors of the output pixels.

5. The computer system of claim 1, wherein the ConvNet comprises:
   a contracting component comprising a first plurality of convolution layers and a plurality of pooling layers, wherein one or more convolution layers of the first plurality of convolution layers are grouped with a corresponding one of the plurality of pooling layers;
   an expanding component comprises a second plurality of convolution layers and a plurality of upsampling layers, wherein one or more convolution layers of the second plurality of convolution layers are grouped with a corresponding one of the plurality of upsampling layers; and a plurality of subnetworks, wherein each subnetwork of the plurality of subnetworks comprises a set of convolution layers and an upsampling layer.

6. The computer system of claim 5, wherein the processor circuitry is to operate the ConvNet to:
operate each subnetwork to estimate a corresponding one dimensional kernel for each pixel in the interpolation frame, wherein each of the corresponding one dimensional kernels is part of a pair of one dimensional kernels, and each pair of one dimensional kernels is used to compute a two dimensional kernel.

7. The computer system of claim 5, wherein the processor circuitry is to operate the ConvNet to:
operate the contracting component to extract features from the first and second image frames; and
operate the expanding component to perform dense predictions on the extracted features.

8. The computer system of claim 5, wherein the processor circuitry is to:
operate each of the plurality of upsampling layers to perform a corresponding transposed convolution operation, a sub-pixel convolution operation, a nearest-neighbor operation, or a bilinear interpolation operation; and
operate each of the plurality of pooling layers to perform a downsampling operation.

9. The computer system of claim 1, wherein:
each of the first kernel matrix and the second kernel matrix include a set of non-zero matrix values,
locations of the non-zero matrix values indicate a motion, and
the non-zero values are interpolation coefficients to combine pixel colors of the first and second pixel patches to generate the interpolation frame.

10. One or more non-transitory computer-readable media (NTCRM) including instructions of a convolutional neural network (ConvNet) wherein execution of the instructions by one or more processors is to cause a computer system to:
obtain, as an input, a first image frame and a second image frame;
estimate a spatially-adaptive convolutional kernel based on a first receptive field patch of the first image frame and a second receptive field patch of the second image frame, wherein, to estimate of the pair of spatially-adaptive convolutional kernels, execution of the instructions is to cause the computer system to generate a pair of kernel matrices, the pair of kernel matrices including a first kernel matrix for a first pixel patch of the first image frame and a second kernel matrix for a second pixel patch of the second image frame;
convolve the pair of spatially-adaptive convolutional kernels over the first pixel patch of the first image frame and the second pixel patch of the second image frame to obtain a color of an output pixel for an interpolation frame; and
generate and output the interpolation frame with the output pixel having the obtained color.

11. The one or more NTCRM of claim 10, wherein execution of the instructions is to cause the computer system to:
output of the output pixel in the interpolation frame co-centered at a same location as the first receptive field patch and the second receptive field patch in the first input image and the second input image, respectively.

12. The one or more NTCRM of claim 11, wherein the first receptive field patch and the second receptive field patch are centered in the input image frame, and wherein the first pixel patch is centered within the first receptive field patch and the second pixel patch is centered within the second receptive field patch.

13. The one or more NTCRM of claim 10, wherein the ConvNet comprises:
an input layer comprising raw pixel data of a plurality of input image frames, wherein the first image frame and the second image frame are among the plurality of input image frames;
a plurality of layers comprising a corresponding one of a plurality of convolutional layers, pooling layers, and/or Batch Normalization layers;
a plurality of down-convolutional layers instead of one or more max-pooling layers, wherein the down-convolutional layers are disposed between some convolutional layers of the plurality of convolutional layers; and
an output layer comprising a feature map comprising kernels that are used to produce the color of the output pixel.

14. The one or more NTCRM of claim 10, wherein the ConvNet comprises:
a contracting component comprising a first plurality of convolution layers and a plurality of pooling layers, wherein one or more convolution layers of the first plurality of convolution layers are grouped with a corresponding one of the plurality of pooling layers;
an expanding component comprises a second plurality of convolution layers and a plurality of upsampling layers, wherein one or more convolution layers of the second plurality of convolution layers are grouped with a corresponding one of the plurality of upsampling layers; and
a plurality of subnetworks, wherein each subnetwork of the plurality of subnetworks comprises a set of convolution layers and an upsampling layer.

15. The one or more NTCRM of claim 14, wherein execution of the instructions is to cause the computer system to:
operate each subnetwork to estimate a corresponding one dimensional kernel for each pixel in the interpolation frame, each one dimensional kernel being part of a pair of one dimensional kernels, and each pair of one dimensional kernels is used to compute a two dimensional kernel.

16. The one or more NTCRM of claim 14, wherein execution of the instructions is to cause the computer system to:
operate the contracting component to extract features from the first and second image frames;
operate the expanding component to perform dense predictions on the extracted features;
operate each of the plurality of upsampling layers to perform a corresponding transposed convolution operation, a sub-pixel convolution operation, a nearest-neighbor operation, or a bilinear interpolation operation; and
operate each of the plurality of pooling layers to perform a downsampling operation.

17. The one or more NTCRM of claim 10, wherein:
each of the first kernel matrix and the second kernel matrix include a set of non-zero matrix values;
locations of the non-zero matrix values indicate a motion; and
the non-zero values are interpolation coefficients to combine pixel colors of the first and second pixel patches to generate the interpolation frame.

18. A method of frame interpolation, comprising:
estimating a pair of spatially-adaptive convolutional kernels based on a first receptive field patch of a first input image frame and a second receptive field patch of a second input image frame, wherein the estimating includes generating a pair of kernel matrices including a first kernel matrix for the first receptive field patch and a second kernel matrix for the second receptive field patch, and wherein each of the first kernel matrix and the second kernel matrix include a set of non-zero matrix values, wherein locations of the non-zero matrix values indicate a motion, and the non-zero values are interpolation coefficients that combine pixel colors of the first receptive field patch and the second receptive field patch to generate an interpolation frame;
convolving the pair of spatially-adaptive convolutional kernels over the first receptive field patch and the second receptive field patch to obtain a color of an output pixel of the interpolation frame; and
generating and outputting the interpolation frame including the output pixel with the obtained color.

19. The method of claim 18, further comprising:
accepting, as an input, the first receptive field patch and the second receptive field patch, wherein the first pixel patch is centered within the first receptive field patch and the second pixel patch is centered within the second receptive field patch;
performing a plurality of convolution operations of corresponding convolutional layers;
performing or causing to perform a plurality of down-convolution operations of corresponding down-convolution layers; and
outputting two pairs of one dimensional kernels to compute the color for the output pixel that are co-centered at a same location as the first receptive field patch in the first input frame and the second receptive field patch in the second input frame, wherein at least one of the two pairs of one dimensional kernels includes the convolved kernel and another convolved kernel, and each of the two pairs of one dimensional kernels is a two dimensional kernel.

20. The method of claim 18, further comprising:
extracting features from the first and second input frames, wherein extracting the features comprises downsampling data of convolution layers; and
performing dense predictions at the resolution of the input frames, wherein performing the dense predictions comprises performing transposed convolution, sub-pixel convolution, nearest-neighbor, and bilinear interpolation, and
wherein the estimating comprises estimating two pairs of one dimensional kernels for each pixel in the interpolation frame, wherein each of the two pairs of one dimensional kernels is an estimate of a corresponding two dimensional kernel.

21. A computer system comprising:
processor circuitry communicatively coupled with memory circuitry, the memory circuitry to store program code of a convolutional neural network (ConvNet), wherein the ConvNet comprises:
a contracting component comprising a first plurality of convolution layers and a plurality of pooling layers, wherein one or more convolution layers of the first plurality of convolution layers are grouped with a corresponding one of the plurality of pooling layers;
an expanding component comprising a second plurality of convolution layers and a plurality of upsampling layers, wherein one or more convolution layers of the second plurality of convolution layers are grouped with a corresponding one of the plurality of upsampling layers, and
a plurality of subnetworks, wherein each subnetwork of the plurality of subnetworks comprises a set of convolution layers and an upsampling layer; and
the processor circuitry is to operate the ConvNet to:
obtain, as an input, a first image frame and a second image frame;
estimate a convolutional kernel based on a first receptive field patch of the first image frame and a second receptive field patch of the second image frame;
convolve the convolutional kernel over a first pixel patch of the first input image frame and a second pixel patch of the second input image frame to obtain a color of an output pixel of an interpolation frame; and
output the interpolation frame with the output pixel having the obtained color.

22. The computer system of claim 21, wherein the processor circuitry is to operate the ConvNet to:
output the output pixel in the interpolation frame co-centered at a same location as the first receptive field patch and the second receptive field patch in the first input image and the second input image, respectively.

23. The computer system of claim 22, wherein the first receptive field patch and the second receptive field patch are centered in the input image frame, and wherein the first pixel patch is centered within the first receptive field patch and the second pixel patch is centered within the second receptive field patch.

24. The computer system of claim 21, wherein the ConvNet further comprises:
an input layer comprising raw pixel data of a plurality of input image frames, wherein the first image frame and the second image frame are among the plurality of input image frames; and
an output layer comprising a feature map comprising a data structure that is representative of the output pixel and the obtained color.

25. The computer system of claim 21, wherein the processor circuitry is to operate the ConvNet to:
operate each subnetwork to estimate a corresponding one dimensional kernel for each pixel in the interpolation frame, wherein each of the corresponding one dimensional kernels is part of a pair of one dimensional kernels, and each pair of one dimensional kernels is used to compute a two dimensional kernel.

26. The computer system of claim 21, wherein the processor circuitry is to operate the ConvNet to:
operate the contracting component to extract features from the first and second image frames; and
operate the expanding component to perform dense predictions on the extracted features.

27. The computer system of claim 21, wherein the processor circuitry is to operate each of the plurality of upsampling layers to perform a corresponding transposed convolution operation, a sub-pixel convolution operation, a nearest-neighbor operation, or a bilinear interpolation operation.

28. The computer system of claim 21, wherein the processor circuitry is to operate each of the plurality of pooling layers to perform a downsampling operation.

* * * * *